US006276130B1

(12) United States Patent
Ito et al.

(10) Patent No.: US 6,276,130 B1
(45) Date of Patent: Aug. 21, 2001

(54) INTERNAL COMBUSTION ENGINE

(75) Inventors: Takekazu Ito, Shizuoka-ken; Shizuo Sasaki; Kouji Yoshizaki, both of Numazu, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/496,348

(22) Filed: Feb. 2, 2000

(30) Foreign Application Priority Data

Feb. 2, 1999 (JP) .................................................. 11-024751
Dec. 16, 1999 (JP) .................................................. 11-357691

(51) Int. Cl.[7] .................................................. F02M 25/06
(52) U.S. Cl. .................................. 60/278; 60/280; 60/286; 60/301
(58) Field of Search ............................ 60/278, 280, 285, 60/286, 301, 297

(56) References Cited

U.S. PATENT DOCUMENTS

| 4,719,751 | | 1/1988 | Kume et al. . | |
|---|---|---|---|---|
| 5,201,173 | * | 4/1993 | Fujimoto et al. | 60/278 |
| 5,692,464 | | 12/1997 | Kimura . | |
| 5,743,243 | | 4/1998 | Yanagihara . | |
| 5,775,099 | | 7/1998 | Ito et al. . | |
| 5,850,735 | * | 12/1998 | Araki et al. | 60/286 |
| 5,884,476 | * | 3/1999 | Hirota et al. | 60/285 |
| 5,890,360 | * | 4/1999 | Sasaki et al. | 60/278 |
| 5,937,639 | * | 8/1999 | Sasaki et al. | 60/278 |
| 5,974,791 | * | 11/1999 | Hirota et al. | 60/276 |
| 6,017,100 | * | 1/2000 | Mizuno et al. | 123/295 |
| 6,092,368 | * | 7/2000 | Ishii et al. | 60/277 |
| 6,129,075 | * | 10/2000 | Murata et al. | 123/568.21 |
| 6,131,388 | * | 10/2000 | Sasaki et al. | 60/278 |
| 6,142,119 | * | 11/2000 | Abe et al. | 123/435 |

FOREIGN PATENT DOCUMENTS

| 195 43 219 C1 | 12/1996 | (DE) . |
|---|---|---|
| 0 803 645 A1 | 10/1997 | (EP) . |
| 0 879 946 A2 | 11/1998 | (EP) . |
| 0 891 806 A2 | 1/1999 | (EP) . |
| 0 952 321 A2 | 10/1999 | (EP) . |
| 60-216018 | 10/1985 | (JP) . |
| 7-332071 | 12/1995 | (JP) . |
| 9-287528 | 11/1997 | (JP) . |
| 10-274031 | 10/1998 | (JP) . |
| WO 98/10177 | 3/1998 | (WO) . |
| WO 98/13128 | 4/1998 | (WO) . |
| WO98/44245 | 10/1998 | (WO) . |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

An engine where first combustion where the amount of the EGR gas in the combustion chamber is larger than the amount of EGR where the amount of production of soot peaks and a second combustion where the amount of EGR gas in the combustion chamber is smaller than the amount of EGR gas where the amount of production of soot peaks are selectively switched between and where an $NO_x$ absorbent is placed in the exhaust passage of the engine. When $SO_x$ should be released from the $NO_x$ absorbent, the first combustion is performed under a rich air-fuel ratio, while when the second combustion is performed, auxiliary fuel is injected during the first part of the suction stroke or the expansion stroke and the injection timing of the main fuel is delayed by a large extent.

21 Claims, 44 Drawing Sheets

Fig.1
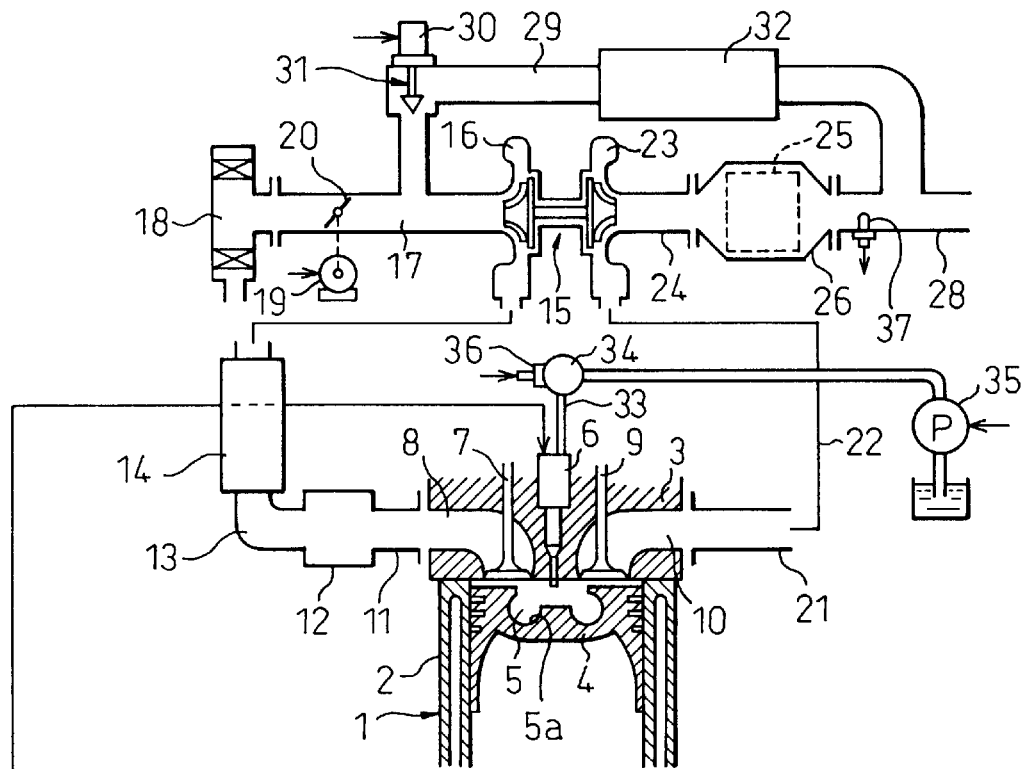
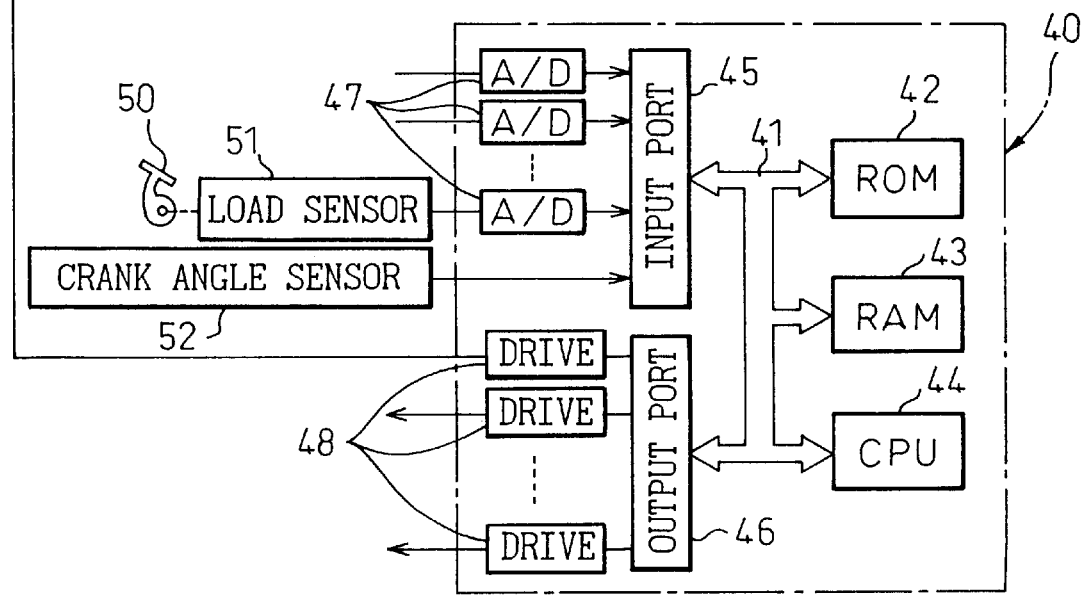

Fig.5
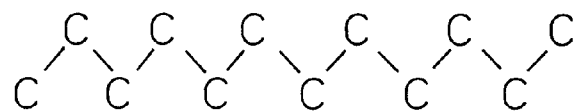
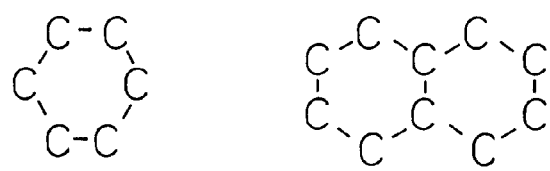
Fig.6
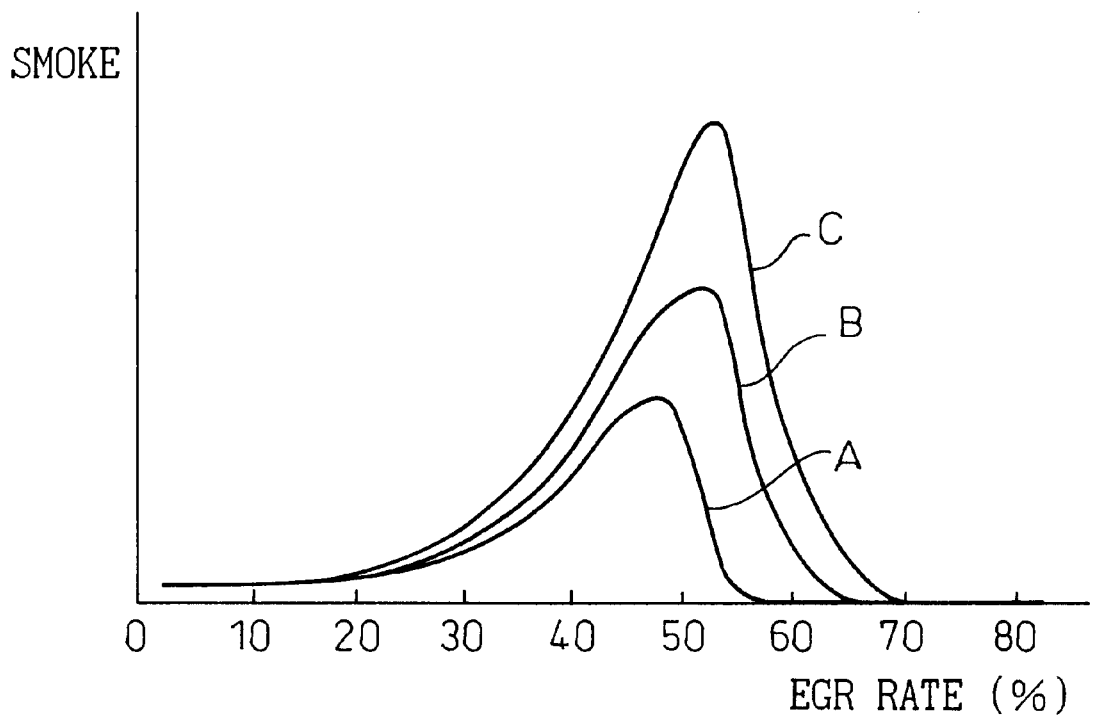

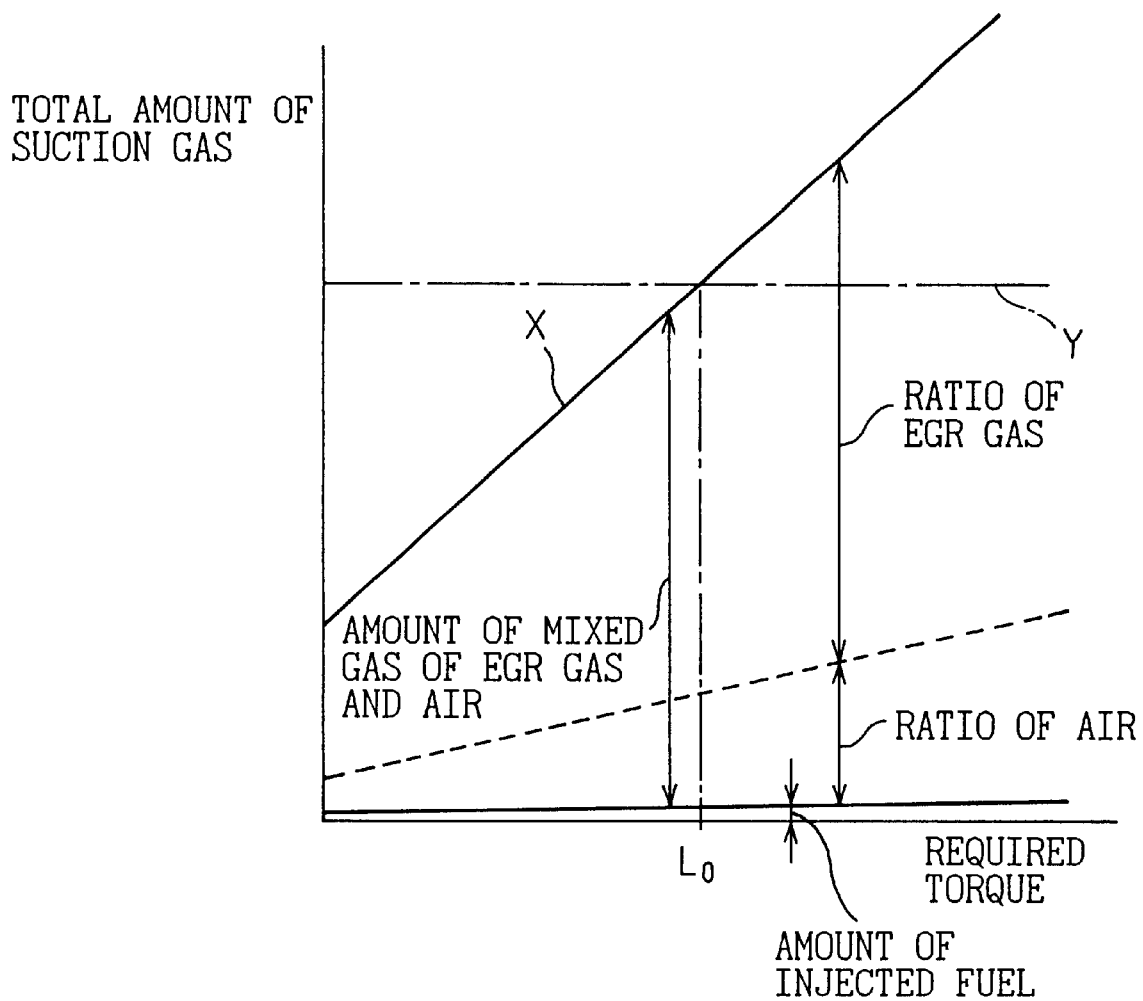

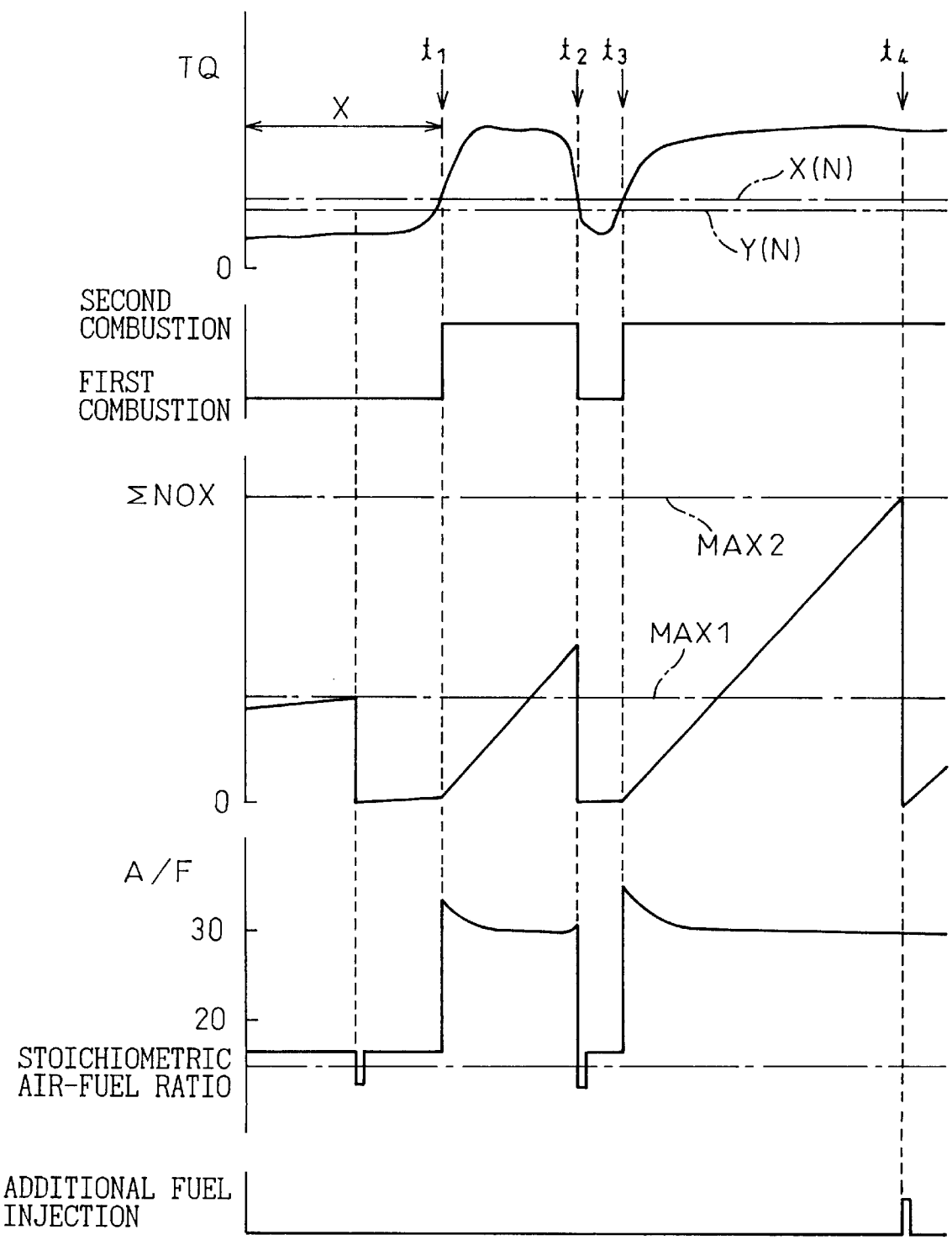

TQ | $\Delta\theta S_{11}$ $\Delta\theta S_{12}$ ---------- $\Delta\theta S_{1n}$
$\Delta\theta S_{21}$ ⋮
⋮
$\Delta\theta S_{m1}$ ---------- $\Delta\theta S_{mn}$
— N

Fig.40B $TQ$ | $\theta S_{11}$  $\theta S_{12}$ ---------- $\theta S_{1n}$
$\theta S_{21}$
⋮                              ⋮
$\theta S_{m1}$ ---------------- $\theta S_{mn}$
                                              $N$

INTERNAL COMBUSTION ENGINE

BACKGROUND OF THE INVENTION

1. Field of the Invention

The present invention relates to an internal combustion engine.

2. Description of the Related Art

In the past, in an internal combustion engine, for example, a diesel engine, the production of $NO_x$ has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of $NO_x$ produced falls and therefore the higher the EGR rate, the lower the amount of $NO_x$ produced.

In this way, in the past, it was known that the higher the EGR rate, the lower the amount of $NO_x$ produced can become. If the EGR rate is increased, however, the amount of soot produced, that is, the smoke starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit. The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set within a range not exceeding that maximum allowable limit so that the amount of $NO_x$ and smoke produced would become as small as possible. Even if the EGR rate is set in this way so that the amount of $NO_x$ and smoke produced becomes as small as possible, however, there are limits to the reduction of the amount of production of $NO_x$ and smoke. In practice, therefore, a considerable amount of NO and smoke continues being produced.

In the process of studying the combustion in diesel engines, however, it was discovered that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced. Further, it was found that the amount of $NO_x$ produced at this time was extremely small. Further studies were engaged in later based on this discovery to determine the reasons why soot was not produced and as a result a new system of combustion able to simultaneously reduce the soot and $NO_x$ more than ever before was constructed. This new system of combustion will be explained in detail later, but briefly it is based on the idea of stopping the growth of hydrocarbons into soot at an intermediate stage before the hydrocarbons grow.

That is, what was found from repeated experiments and research was that the growth of hydrocarbons stops at an intermediate stage before becoming soot when the temperature of the fuel and the gas around the fuel at the time of combustion in the combustion chamber is lower than a certain temperature and the hydrocarbons grow to soot all at once when the temperature of the fuel and the gas around the fuel becomes higher than a certain temperature. In this case, the temperature of the fuel and the gas around the fuel is greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperature of the fuel and the gas around the fuel.

Therefore, if the temperature of the fuel and the gas around the fuel at the time of combustion in the combustion chamber is suppressed to no more than a temperature at which the growth of the hydrocarbons stops midway, soot is no longer produced. The temperature of the fuel and the gas around the fuel at the time of combustion in the combustion chamber can be suppressed to no more than a temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

In an internal combustion engine using this new system of combustion, however, not only oxidation catalysts, but various other types of after-treatment devices are used to clean the exhaust gas. In this case, among these after-treatment devices, there are after-treatment devices which require that the temperature of the after-treatment device be maintained at a high temperature over a long period of time. Therefore, when using such an after-treatment device, it is necessary to maintain the temperature of the after-treatment device at a high temperature for a long time.

On the other hand, as explained later, if this new combustion is performed, the temperature of the exhaust gas becomes higher than with the conventionally performed combustion and therefore if this new combustion is used, it becomes possible to maintain the after-treatment device at a high temperature for a long period. This new combustion, however, can only be used when the engine load is relatively low. When the engine load becomes high, the conventionally performed combustion has to be used. When using the conventionally performed combustion, however, the temperature of the exhaust gas is low and therefore there is the problem that when switching from the new combustion to the conventionally performed combustion, the after-treatment device cannot be maintained at a high temperature for a long period since the temperature of the exhaust gas falls.

SUMMARY OF THE INVENTION

An object of the present invention is to provide an internal combustion engine capable of maintaining an after-treatment device at a high temperature when the after-treatment device should be maintained at a high temperature.

According to the present invention, there is provided an internal combustion engine in which an amount of production of soot gradually increases and then peaks when an amount of inert gas in a combustion chamber increases and in which a further increase of the amount of inert gas in the combustion chamber results in a temperature of fuel and surrounding gas in the combustion chamber becoming lower than a temperature of production of soot and therefore almost no production of soot any longer, the engine comprising: an after-treatment device arranged in an exhaust passage of the engine for removing harmful components in exhaust gas; switching means for selectively switching between a first combustion where the amount of the inert gas in the combustion chamber is larger than the amount of inert gas where the amount of production of soot peaks and a second combustion where the amount of inert gas in the combustion chamber is smaller than the amount of inert gas where the amount of production of soot peaks; judging means for judging if a temperature of the after-treatment device should be raised; and temperature control means for controlling the temperature of the after-treatment device when it is judged that the temperature of the after-treatment device should be raised so that the temperature of the after-treatment device becomes more than a predetermined temperature when second combustion is being performed.

BRIEF DESCRIPTION OF THE DRAWINGS

The present invention may be more fully understood from the description of the preferred embodiments of the invention set forth below together with the accompanying drawings, in which:

FIG. 1 is an overall view of a compression ignition type internal combustion engine;

FIG. 5 is a view of a fuel molecule;

FIG. 6 is a view of the relationship between the amount of generation of smoke and the EGR rate;

FIG. 7 is a view of the relationship between the amount of injected fuel and the amount of mixed gas;

FIG. 19 is a view for explaining control for releasing $NO_x$;

FIGS. 31A, 31B, and 31C are views of maps of the amount of injection etc.;

FIGS. 32A and 32B are views of maps of the degrees of opening of the throttle valve etc.;

FIGS. 40A and 40B are views of maps of the degrees of opening of a throttle valve etc.:

DESCRIPTION OF THE PREFERRED EMBODIMENTS

Figure 2A:
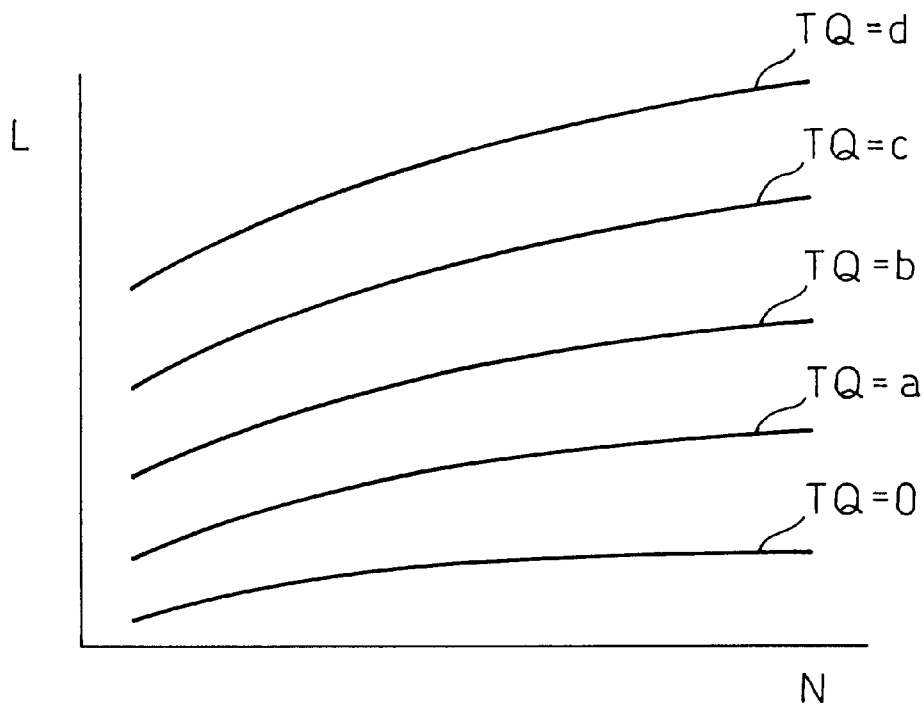
FIGS. 2A and 2B are views of a required torque.

FIG. 1 is a view of the case of application of the present invention to a four-stroke compression ignition type internal combustion engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 and intercooler 14 to a supercharger, for example, the outlet of a compressor 16 of an exhaust turbocharger 15. The inlet of the compressor 16 is connected through an air intake pipe 17 to an air cleaner 18. A throttle valve 20 driven by a step motor 19 is arranged in the air intake pipe 17.

On the other hand, the exhaust port 10 is connected through an exhaust manifold 21 and exhaust tube 22 to the inlet of an exhaust turbine 23 of the exhaust turbocharger 15. The outlet of the exhaust turbine 23 is connected through an exhaust pipe to a casing 26 housing an $NO_x$ absorbent 25.

The exhaust pipe 28 connected to the outlet of the casing 26, and the air intake pipe 17 downstream of the throttle valve 20 are connected to each other through an EGR passage 29. In the EGR passage 29 is arranged an EGR control valve 31 driven by a step motor 30. Further, in the EGR passage 29 is arranged an intercooler 32 for cooling the EGR gas flowing through the EGR passage 29. In the embodiment shown in FIG. 1, the engine cooling water is led into the intercooler 32 and that engine cooling water used to cool the EGR gas.

On the other hand, each fuel injector 6 is connected through a fuel supply line 33 to a fuel reservoir, that is, a common rail 34. Fuel is supplied to the common rail 34 from an electrically controlled variable discharge fuel pump 35. Fuel supplied in the common rail 35 is supplied through the fuel supply lines 33 to the fuel injectors 6. A fuel pressure sensor 36 for detecting the fuel pressure in the common rail 34 is attached to the common rail 34. The amount of discharge of the fuel pump 35 is controlled based on the output signal of the fuel pressure sensor 36 so that the fuel pressure in the common rail 34 becomes the target fuel pressure.

The electronic control unit 40 is comprised of a digital computer and is provided with a ROM (read only memory) 42, a RAM (random access memory) 43, a CPU (microprocessor) 44, an input port 45, and an output port 46 connected with each other by a bidirectional bus 41. The output signal of the fuel pressure sensor 36 is input through a corresponding AD converter 47 to the input port 45. In the exhaust pipe downstream of the $NO_x$ absorbent 25 is arranged a temperature sensor 37. The output signal of the temperature sensor 37 is input through a corresponding AD converter 47 to the input port 45. The accelerator pedal 50 has connected to it a load sensor 51 for generating an output voltage proportional to the amount of depression L of the accelerator pedal 50. The output voltage of the load sensor 51 is input through a corresponding AD converter 47 to the input port 45. Further, the input port 45 has connected to it a crank angle sensor 52 for generating an output pulse each time the crankshaft rotates by for example 30°. On the other hand, the output port 46 has connected to it through a corresponding drive circuit 48 the fuel injectors 6, the throttle valve control step motor 19, the EGR control valve control step motor 30, and the fuel pump 35.

Figure 2B:
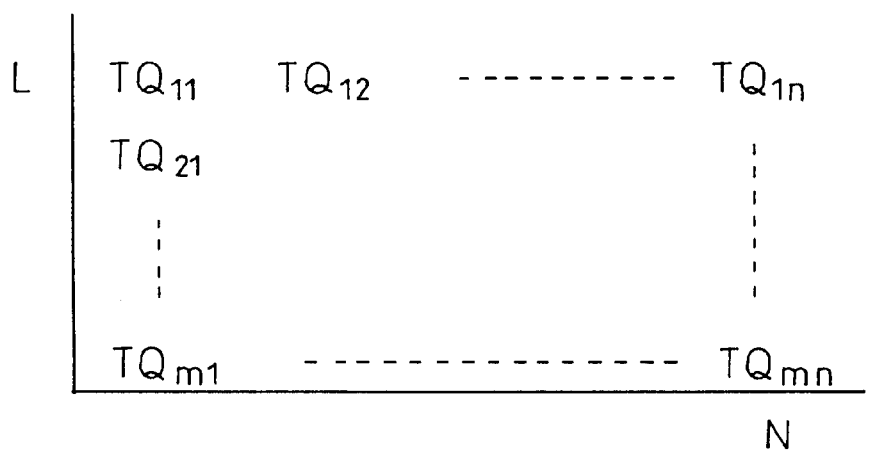

FIG. 2A shows the relationship between the required torque TQ, the amount of depression L of the accelerator pedal 50, and the engine rotational speed N. Note that in FIG. 2A, the curves show equivalent torque curves. The curve shown by TQ=0 shows that the torque is zero, while the remaining curves have gradually higher required torques in the order of TQ=a, TQ=b, TQ=c, and TQ=d. The required torques TQ shown in FIG. 2A are stored in the ROM 42 in advance in the form of a map as a function of the amount of depression L of the accelerator pedal 50 and the engine rotational speed N as shown in FIG. 2B. In this embodiment according to the present invention, the required torque TQ is first calculated in accordance with the amount of depression L of the accelerator pedal 50 and the engine rotational speed N from the map shown in FIG. 2B and then the amount of fuel injection etc. are calculated based on the required torque TQ.

Figure 3:
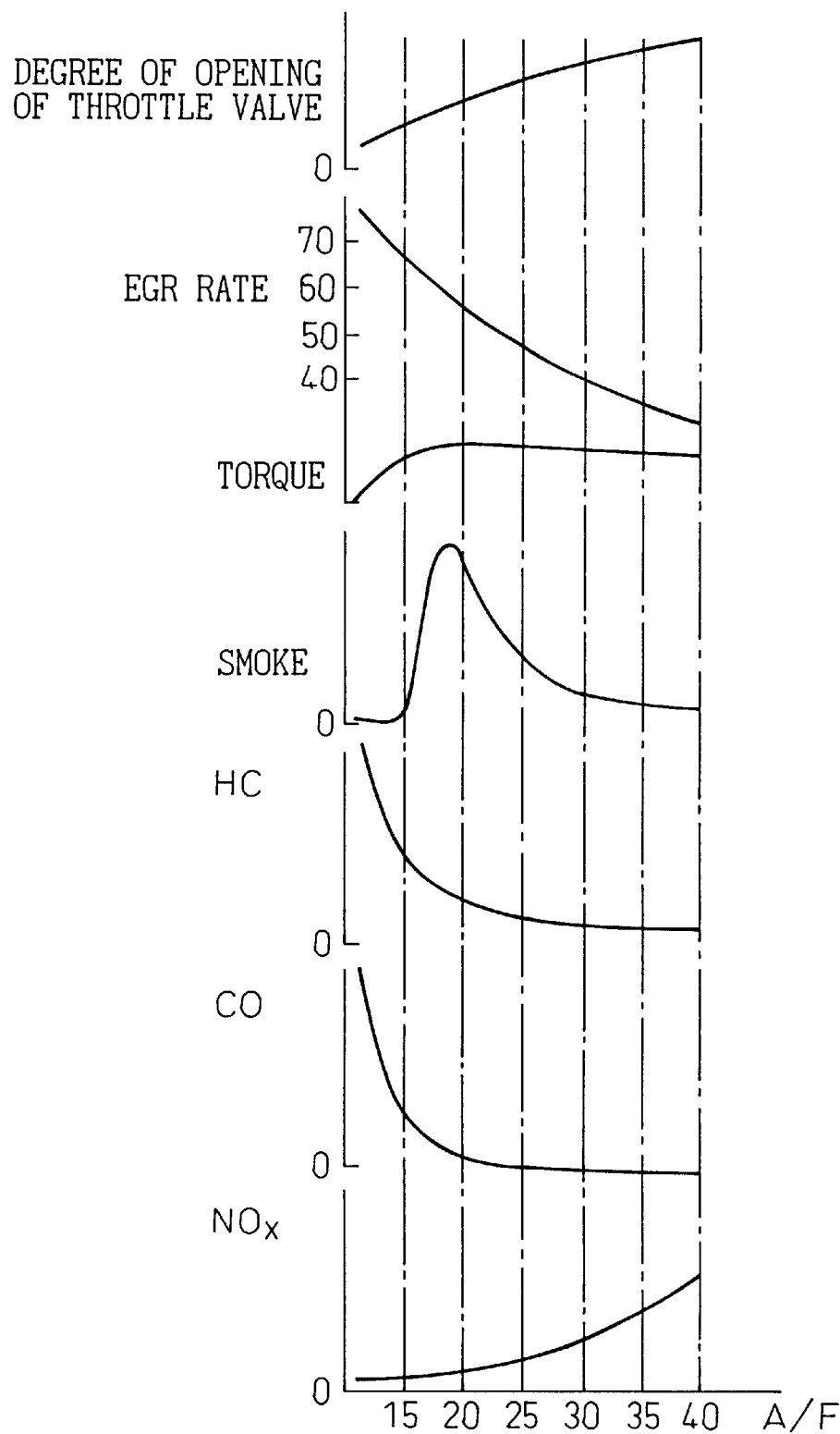
FIG. 3 is a view of the amount of generation of smoke and $NO_x$.

FIG. 3 shows an example of an experiment showing the changes in the output torque and the amount of smoke when changing the air fuel ratio A/F (abscissa in FIG. 3) by changing the degree of opening of the throttle valve 20 and the EGR rate at the time of engine low load operation and the changes in the amount of emission of smoke, HC, CO, and $NO_x$. As will be understood from FIG. 3, in this experiment, the EGR rate becomes larger the smaller the air fuel ratio A/F. When below the stoichiometric air fuel ratio (14.6), the EGR rate becomes over 65 percent.

As shown in FIG. 3, if increasing the EGR rate to reduce the air fuel ratio A/F, when the EGR rate becomes close to 40 percent and the air fuel ratio A/F becomes 30 or so, the amount of smoke produced starts to increase. Next, when the EGR rate is further raised and the air fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air fuel ratio A/F becomes close to 15.0, the smoke produced becomes substantially zero. That is, almost no soot is produced any longer. At this time, the output torque of the engine falls somewhat and the amount of $NO_x$ produced becomes considerably lower. On the other hand, at this time, the amounts of HC and CO produced start to increase.

Figure 4A:
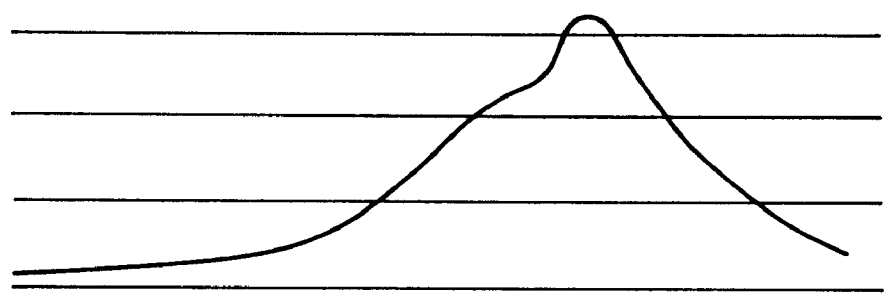
FIGS. 4A and 4B are views of the combustion pressure.
Figure 4B:
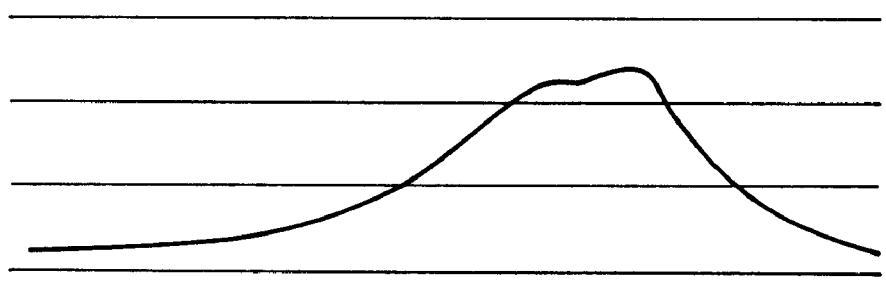

FIG. 4A shows the changes in compression pressure in the combustion chamber 5 near an air fuel ratio A/F of 21 when the amount of smoke produced is the greatest. FIG. 4B shows the changes in compression pressure in the combustion chamber 5 near an air fuel ratio A/F of 18 when the amount of smoke produced is substantially zero. As will be understood from a comparison of FIG. 4A and FIG. 4B, the combustion pressure is lower in the case shown in FIG. 4B where the amount of smoke produced is substantially zero than the case shown in FIG. 4A where the amount of smoke produced is large.

The following may be said from the results of the experiment shown in FIG. 3 and FIGS. 4A and 4B. That is, first, when the air fuel ratio A/F is less than 15.0 and the amount of smoke produced is substantially zero, the amount of $NO_x$ produced falls considerably as shown in FIG. 3. The fact that the amount of $NO_x$ produced falls means that the combustion temperature in the combustion chamber 5 falls. Therefore, it can be said that when almost no soot is produced, the combustion temperature in the combustion chamber 5 becomes low. The same thing may be said from FIG. 4B. That is, in the state shown in FIG. 4B where almost no soot is produced, the combustion pressure becomes low, therefore the combustion temperature in the combustion chamber 5 becomes low at this time.

Second, when the amount of smoke produced, that is, the amount of soot produced, becomes substantially zero, as shown in FIG. 3, the amounts of emission of HC and CO increase. This means that the hydrocarbons are exhausted without growing into soot. That is, the linear hydrocarbons and aromatic hydrocarbons contained in the fuel and shown in FIG. 5 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 5 grow to soot through the soot precursor. Therefore, as explained above, when the amount of production of soot becomes substantially zero, the amount of exhaust of HC and CO increases as shown in FIG. 3, but the HC at this time is a soot precursor or a state of hydrocarbons before that.

Summarizing these considerations based on the results of the experiments shown in FIG. 3 and FIGS. 4A and 4B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the gas around the fuel in the combustion chamber 5 is below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air fuel ratio, and the compression ratio, so it cannot be said what degree it is, but this certain temperature is deeply related with the amount of production of $NO_x$. Therefore, this certain temperature can be defined to a certain degree from the amount of production of $NO_x$. That is, the greater the EGR rate, the lower the temperature of the fuel and the gas surrounding it at the time of combustion and the lower the amount of $NO_x$ produced. At this time, when the amount of $NO_x$ produced becomes around 10 ppm or less, almost no soot is produced any more. Therefore, the above certain temperature substantially matches the temperature when the amount of $NO_x$ produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough to absorb an amount of heat sufficient for lowering the temperature is required. Therefore, if the amount of fuel increases, the amount of inert gas required increases along with the same. Note that in this case, the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

FIG. 6 shows the relationship between the EGR rate and smoke when using EGR gas as the inert gas and changing the degree of cooling of the EGR gas. That is, the curve A in FIG. 6 shows the case of force cooling the EGR gas and maintaining the temperature of the EGR gas at about 90° C., curve B shows the case of cooling the EGR gas by a compact cooling apparatus, and curve C shows the case of not force cooling the EGR gas.

When force cooling the EGR gas as shown by the curve A in FIG. 6, the amount of soot produced peaks when the EGR rate is a little under 50 percent. In this case, if the EGR rate is made about 55 percent or higher, almost no soot is produced any longer.

On the other hand, when the EGR gas is slightly cooled as shown by curve B in FIG. 6, the amount of soot produced peaks when the EGR rate is slightly higher than 50 percent. In this case, if the EGR rate is made above about 65 percent, almost no soot is produced any longer.

Further, when the EGR gas is not force cooled as shown by curve C in FIG. 6, the amount of soot produced peaks near an EGR rate near 55 percent. In this case, if the EGR rate is made over about 70 percent, almost no soot is produced any longer.

Note that FIG. 6 shows the amount of smoke produced when the engine load is relatively high. When the engine load becomes small, the EGR rate at which the amount of soot produced peaks falls somewhat and the lower limit of the EGR rate at which almost no soot is produced any longer falls somewhat. In this way, the lower limit of the EGR rate at which almost no soot is produced any longer changes in accordance with the degree of cooling of the EGR gas or the engine load.

FIG. 7 shows the amount of mixed gas of EGR gas and air, the ratio of air in the mixed gas, and the ratio of EGR gas in the mixed gas required for making the temperature of the fuel and the gas around it at the time of combustion a temperature lower than the temperature at which soot is produced in the case of use of EGR gas as an inert gas. Note that in FIG. 7, the ordinate shows the total amount of suction gas taken into the combustion chamber 5. The broken line Y shows the total amount of suction gas able to be taken into the combustion chamber 5 when supercharging is not being performed. Further, the abscissa shows the required torque.

Referring to FIG. 7, the ratio of air, that is, the amount of air in the mixed gas, shows the amount of air necessary for causing the injected fuel to completely burn. That is, in the case shown in FIG. 7, the ratio of the amount of air and the amount of injected fuel becomes the stoichiometric air fuel ratio. On the other hand, in FIG. 7, the ratio of EGR gas, that is, the amount of EGR gas in the mixed gas, shows the minimum amount of EGR gas required for making the temperature of the fuel and the gas around it a temperature lower than the temperature at which soot is produced. This amount of EGR gas is, expressed in terms of the EGR rate, at least 55 percent—in the embodiment shown in FIG. 7, at least 70 percent. That is, if the total amount of suction gas taken into the combustion chamber 5 is made the solid line X in FIG. 7 and the ratio between the amount of air and amount of EGR gas in the total amount of suction gas X is made the ratio shown in FIG. 7, the temperature of the fuel and the gas around it becomes a temperature lower than the temperature at which soot is produced and therefore no soot at all is produced any longer. Further, the amount of $NO_x$ produced at this time is around 10 ppm or less and therefore the amount of $NO_x$ produced becomes extremely small.

If the amount of fuel injected increases, the amount of heat generated at the time of combustion increases, so to maintain the temperature of the fuel and the gas around it at a temperature lower than the temperature at which soot is produced, the amount of heat absorbed by the EGR gas must be increased. Therefore, as shown in FIG. 7, the amount of EGR gas has to be increased the greater the amount of injected fuel. That is, the amount of EGR gas has to be increased as the required torque becomes higher.

When supercharging is not performed, however, the upper limit of the total amount X of suction gas sucked into the combustion chamber 5 is Y. Therefore, in the region where the required torque is larger than $L_0$ in FIG. 7, it is not possible to maintain the air-fuel ratio at the stoichiometric air-fuel ratio so long as the ratio of the EGR gas is not reduced along with the increase of the required torque. In other words, when supercharging is not being performed, when trying to maintain the air-fuel ratio at the stoichiometric air-fuel ratio at the region where the required torque is larger than $L_0$, the EGR rate falls along with the increase of the required torque, therefore in the region where the required torque is larger than $L_0$, the temperature of the fuel and its surrounding gas can no longer be maintained at a temperature lower than the temperature where soot is produced.

However, as shown in FIG. 1, if EGR gas is recirculated at the entrance side of the supercharger through the EGR passage 29, that is, in the air intake pipe 17 of the exhaust turbocharger 15, it is possible to maintain the EGR rate at over 55 percent, for example, at 70 percent, in the region where the required torque is larger than $L_0$ and therefore it is possible to maintain the temperature of the fuel and its surrounding gas at a temperature lower than the temperature where soot is produced. That is, if EGR gas is recirculated so that the EGR rate in the air intake pipe 17 becomes for example 70 percent, the EGR rate of the suction gas raised in pressure by the compressor 16 of the exhaust turbocharger 15 also becomes 70 percent and therefore it is possible to maintain the temperature of the fuel and its surrounding gas at a temperature lower than the temperature where soot is produced up to the limit to which the pressure can be raised by the compressor 16. Therefore, it becomes possible to enlarge the operating region of the engine where low temperature combustion can be performed.

Note that in this case, when making the EGR rate more than 55 percent in the region where the required torque is larger than $L_0$, the EGR control valve 31 is fully opened and the throttle valve 20 is closed somewhat.

As explained above, FIG. 7 shows the case of combustion of fuel at the stoichiometric air fuel ratio. Even if the amount of air is made smaller than the amount of air shown in FIG. 7, however, that is, even if the air fuel ratio is made rich, it is possible to obstruct the production of soot and make the amount of $NO_x$ produced around 10 ppm or less. Further, even if the amount of air is made greater than the amount of air shown in FIG. 7, that is, the mean value of the air fuel ratio is made a lean of 17 to 18, it is possible to obstruct the production of soot and make the amount of $NO_x$ produced around 10 ppm or less.

That is, when the air fuel ratio is made rich, the fuel becomes in excess, but since the combustion temperature is suppressed to a low temperature, the excess fuel does not grow into soot and therefore soot is not produced. Further, at this time, only an extremely small amount of $NO_x$ is produced. On the other hand, when the mean air fuel ratio is lean or when the air fuel ratio is the stoichiometric air fuel ratio, a small amount of soot is produced if the combustion temperature becomes higher, but in the present invention, since the combustion temperature is suppressed to a low temperature, no soot at all is produced. Further, only an extremely small amount of $NO_x$ is produced.

In this way, when low temperature combustion is being performed, regardless of the air fuel ratio, that is, whether the air fuel ratio is rich or the stoichiometric air fuel ratio or the mean air fuel ratio is lean, no soot is produced and the amount of $NO_x$ produced becomes extremely small. Therefore, considering the improvement of the fuel consumption rate, it may be said to be preferable to make the mean air fuel ratio lean.

Note that the temperature of the fuel and its surrounding as at the time of combustion in the combustion chamber can only be suppressed to not more than a temperature where the growth of hydrocarbons stops midway during engine medium or low load operation where the amount of heat generated by the combustion is relatively small. Therefore, in this embodiment of the present invention, at the time of medium or low load operation of the engine, the temperature of the fuel and its surrounding gas at the time of combustion is suppressed to not more than a temperature at which the growth of the hydrocarbons stops midway and first combustion, that is, low temperature combustion, is performed, while at the time of high load operation of the engine, second combustion, that is, the conventionally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 8A:
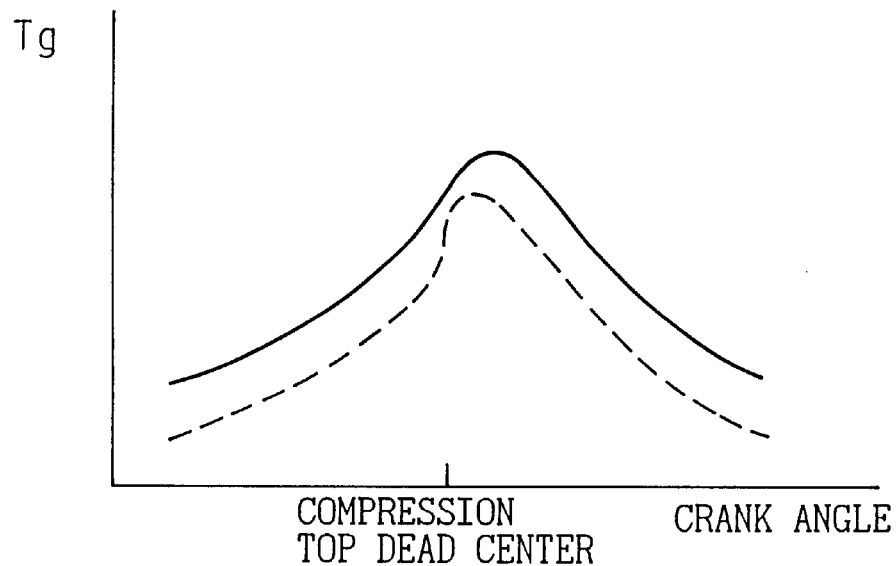
FIGS. 8A and 8B are views of changes in a mean gas temperature Tg in a combustion chamber and a gas temperature Tf of the fuel and its surrounding gas.
Figure 8B:
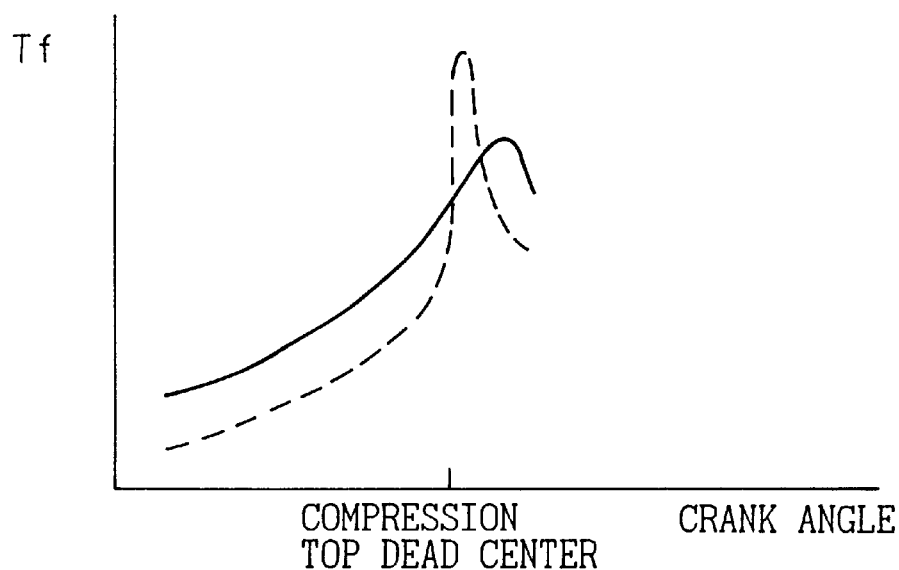

The solid line in FIG. 8A shows the relationship between the mean gas temperature Tg in the combustion chamber 5 when the first combustion is performed and the crank angle, while the broken line in FIG. 8A shows the relationship between the mean gas temperature Tg in the combustion chamber 5 when the second combustion is performed and the crank angle. Further, the solid line in FIG. 8B shows the relationship between the temperature Tf of the fuel and its surrounding gas when the first combustion is performed and the crank angle, while the broken line in FIG. 8B shows the relationship between the temperature Tf of the fuel and its surrounding gas when the second combustion is performed and the crank angle.

When the first combustion, that is, low temperature combustion, is being performed, the amount of EGR gas is larger than when the second combustion, that is, the conventionally ordinarily performed combustion, is being performed, therefore the mean gas temperature Tg at the time of the first combustion shown by the solid line becomes higher than the mean gas temperature Tg at the time of the second combustion shown by the broken line before top dead center of the compression stroke, that is, during the compression stroke, as shown in FIG. 8A. Note that at this time, as shown in FIG. 8B, the temperature Tf of the fuel and its surrounding gas becomes a temperature substantially the same as the mean gas temperature Tg.

Next, combustion is started near top dead center of the compression stroke. In this case, when first combustion is being performed, as shown by the solid line in FIG. 8B, the temperature Tf of the fuel and its surrounding gas does not become that high. As opposed to this, when second combustion is being performed, as shown by the broken line in FIG. 8B, the temperature Tf of the fuel and its surrounding gas becomes extremely high. In this way, when second combustion is performed, the temperature Tf of the fuel and its surrounding gas becomes considerably higher than the case where first combustion is performed, but the temperature of the other gas, which constitutes the majority, becomes lower in the case where second combustion is performed compared with when first combustion is performed. Therefore, as shown in FIG. 8A, the mean gas temperature Tg in the combustion chamber 5 near top dead center of the compression stroke becomes higher when first combustion is being performed than when second combustion is being performed. As a result, as shown in FIG. 8A, the mean gas temperature Tg in the combustion chamber 5 after the combustion is completed, that is, in the second half of the expansion stroke, in other words the temperature of the burned gas in the combustion chamber 5, becomes higher when the first combustion is performed than when the second combustion is performed.

In this way, when the first combustion, that is, the low temperature combustion, is performed, the temperature Tf of the fuel and its surrounding gas becomes considerably lower than when the second combustion is performed, but the burned gas in the combustion chamber 5 conversely becomes higher than when the second combustion is performed, therefore the temperature of the exhaust gas exhausted from the combustion chamber 5 also becomes higher than when the second combustion is being performed.

Figure 9:
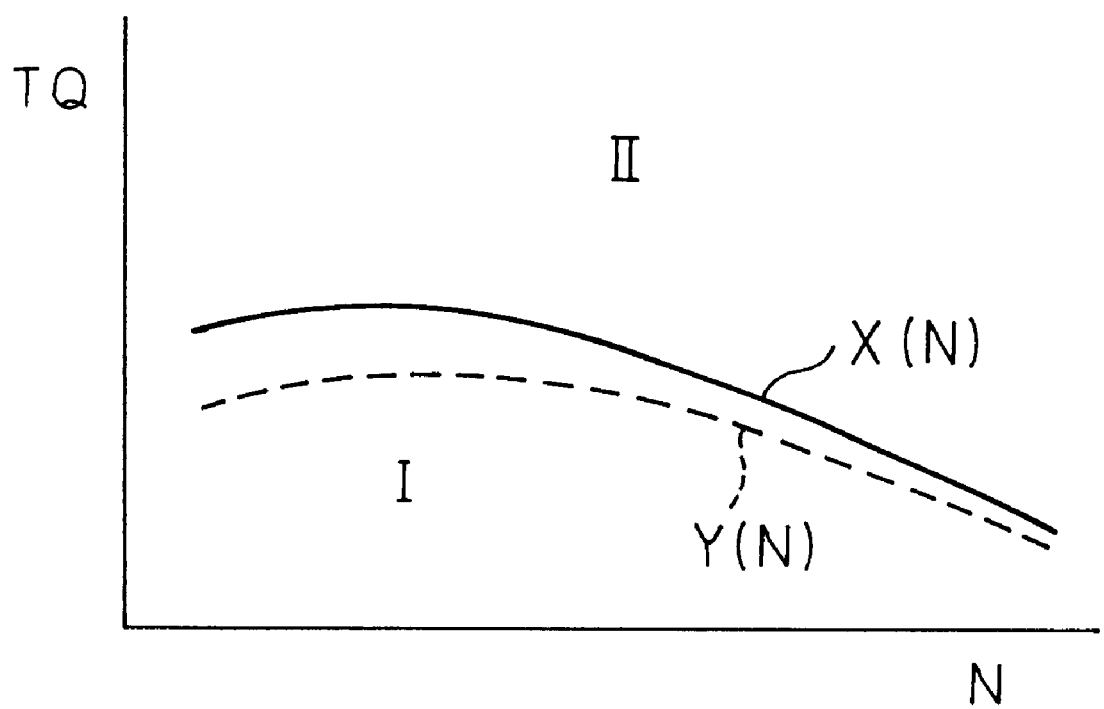
FIG. 9 is a view of a first operating region I and a second operating region II.

FIG. 9 shows a first operating region I where the first combustion, that is, the low temperature combustion, is performed and a second operating region II where the second combustion, that is, the combustion by the conventional combustion method, is performed. Note that in FIG. 9, the ordinate TQ shows the required torque and the abscissa N shows the engine rotational speed. Further, in FIG. 9, X(N) shows a first boundary between the first operating region I and the second operating region II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, when the engine operating state is in the first operating region I where the low temperature combustion is being performed, if the required load L exceeds the first boundary X(N), which is a function of the engine rotational speed N, it is judged that the operating region has shifted to the second operating region II and combustion by the conventional combustion method is switched to. Next, when the required load L becomes lower than the second boundary Y(N), which is a function of the engine rotational speed N, it is judged that the operating region has shifted to the first operating region I and the low temperature combustion is again performed.

Two boundaries were provided, that is, the first boundary X(N) and the second boundary Y(N) at the lower load side of the first boundary X(N), in this way for the following two reasons. The first reason is that at the high load side of the second operating region II, the combustion temperature is relatively high and at this time, even if the required torque TQ becomes lower than the first boundary X(N), low temperature combustion cannot be performed immediately. That is, low temperature combustion cannot be started immediately unless the required torque TQ is considerably low, that is, lower than the second boundary Y(N). The second reason is to provide hysteresis with respect to the change in operating regions between the first operating region I and the second operating region II.

Next, an explanation will be made of control of the operation in the first operating region I and the second operating region II referring to FIG. 10.

Figure 10:
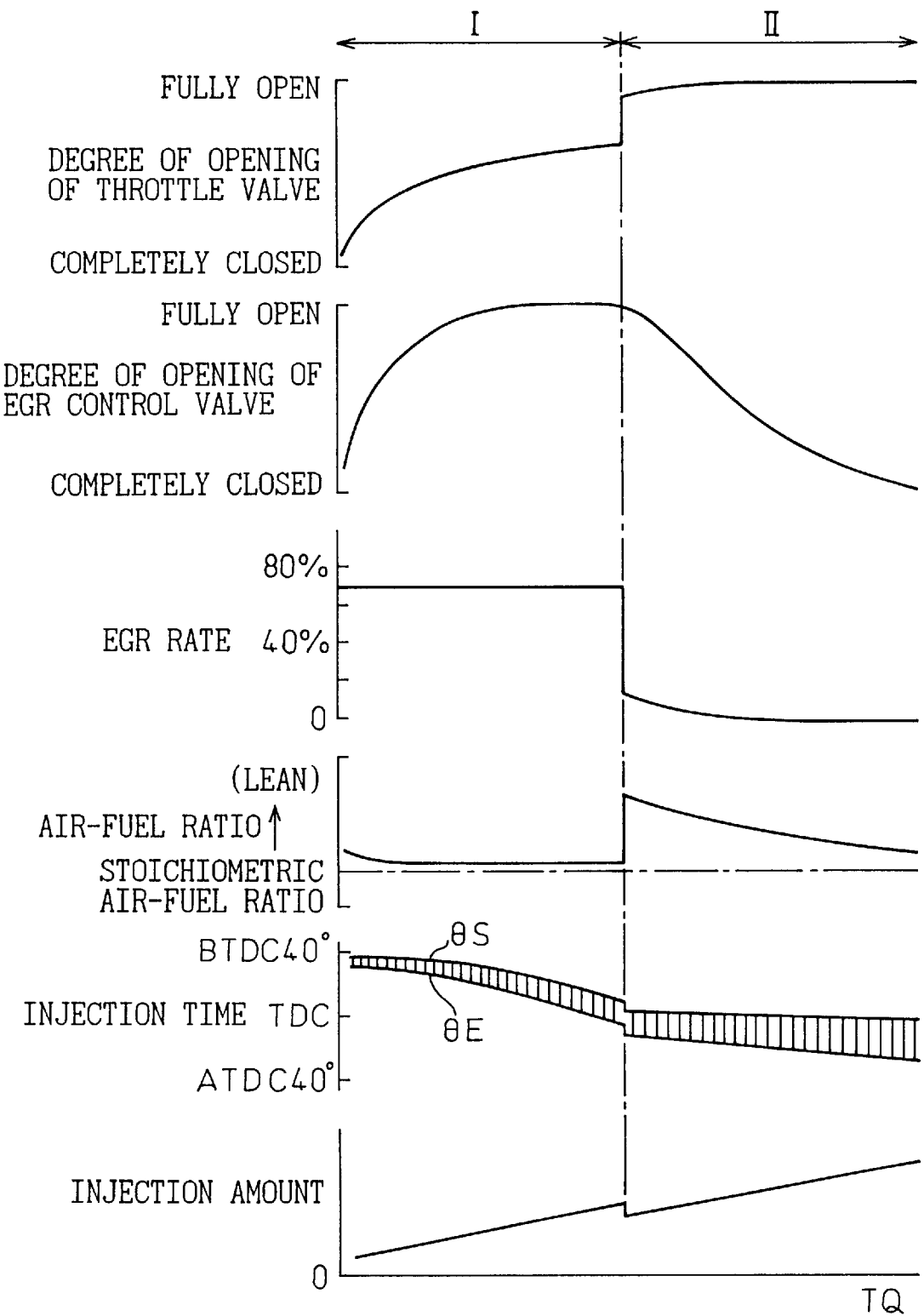
FIG. 10 is a view of a degree of opening of a throttle valve etc.

FIG. 10 shows the degree of opening of the throttle valve 20, the degree of opening of the EGR control valve 31, the EGR rate, the air-fuel ratio, the injection timing, and the amount of injection with respect to the required torque TQ. As shown in FIG. 10, in the first operating region I with the low required torque TQ, the degree of opening of the throttle valve 20 is gradually increased from the fully closed state to the ⅔ opened state as the required torque TQ becomes higher, while the degree of opening of the EGR control valve 31 is gradually increased from close to the fully closed state to the fully opened state as the required torque TQ becomes higher. Further, in the example shown in FIG. 10, in the first operating region I, the EGR rate is made about 70 percent and the air-fuel ratio is made a slightly lean air-fuel ratio.

In other words, in the first operating region I, the degree of opening of the throttle valve 20 and the degree of opening of the EGR control valve 31 are controlled so that the EGR rate becomes about 70 percent and the air-fuel ratio becomes a slightly lean air-fuel ratio. Further, in the first operating region I, the fuel is injected before top dead center of the compression stroke TDC. In this case, the injection start timing θS becomes later the higher the required torque TQ. The injection end timing θE also becomes later the later the injection start timing θS.

Note that during idling operation, the throttle valve 20 is made to close to close to the fully closed state. At this time, the EGR control valve 31 is also made to close to close to the fully closed state. If the throttle valve 20 is closes to close to the fully closed state, the pressure in the combustion chamber 5 at the start of compression will become low, so the compression pressure will become small. If the compression pressure becomes small, the amount of compression work by the pistons 4 becomes small, so the vibration of the engine body 1 becomes smaller. That is, during idling operation, the throttle valve 20 is closed to close to the fully closed state to suppress vibration in the engine body 1.

On the other hand, if the engine operating state changes from the first operating region I to the second operating region II, the degree of opening of the throttle valve 20 is increased in a step-like manner from the ⅔ opened state to the fully opened state. At this time, in the example shown in FIG. 10, the EGR rate is reduced in a step-like manner from about 70 percent to less than 40 percent and the air-fuel ratio is increased in a step-like manner. That is, the range of EGR rates where a large amount of smoke is produced (FIG. 6) is jumped over, so there is no longer a large amount of smoke produced when the engine operating state changes from the first operating region I to the second operating region II.

In the second operating region II, the second combustion, that is, the conventionally performed combustion, is performed. In this combustion method, some soot and $NO_x$ are produced, but the heat efficiency is higher than with the low temperature combustion, so if the engine operating state changes from the first operating region I to the second operating region II, the amount of injection is reduced in a step-like manner as shown in FIG. 10. In the second operating region II, the throttle valve 20 is held in the fully opened state except for a certain part and the degree of opening of the EGR control valve 31 is gradually made smaller the higher the required torque TQ. Therefore, in the operating region II, the EGR rate becomes lower the higher the required torque TQ and the air-fuel ratio becomes smaller the higher the required torque TQ. Even if the required torque TQ becomes high, however, the air-fuel ratio is made a lean air-fuel ratio. Further, in the second operating region II, the injection start timing θS is made before top dead center of the compression stroke TDC.

Figure 11:
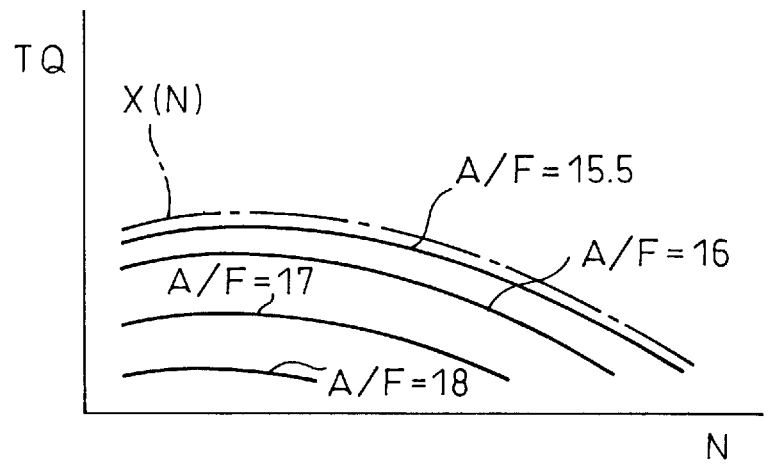
FIG. 11 is a view of an air-flow ratio in the first operating region I.

FIG. 11 shows the air-fuel ratio A/F in the first operating region I. In FIG. 11, the curves shown by A/F=15.5, A/F=15, A/F=17, and A/F=18 show when the air-fuel ratio is 15.5, 16, 17, and 18, respectively. The air-fuel ratios between the curves are determined by proportional distribution. As shown in FIG. 11, in the first operating region I, the air-fuel ratio becomes lean. Further, in the first operating region I, the air-fuel ratio A/F is made lean the lower the required torque TQ becomes.

That is, the lower the required torque TQ becomes, the smaller the amount of heat generated by the combustion. Therefore, even if reducing the EGR rate the lower the required torque TQ becomes, low temperature combustion becomes possible. If the EGR rate is reduced, the air-fuel ratio becomes larger and therefore, as shown in FIG. 11, the air-fuel ratio A/F is made larger the lower the required torque TQ. The larger the air-fuel ratio A/F becomes, the more the fuel consumption efficiency is improved. Therefore, to make the air-fuel ratio as lean as possible, in this embodiment of the present invention, the air-fuel ratio A/F is made larger the lower the required torque TQ becomes.

Figure 12A:
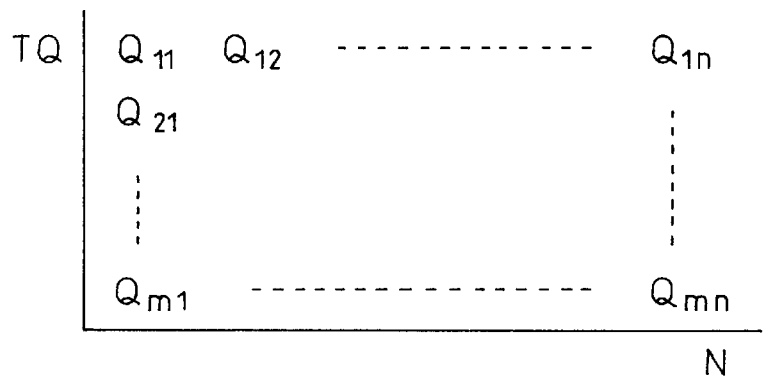
FIGS. 12A and 12B are maps of the amount of injection etc.
Figure 12B:
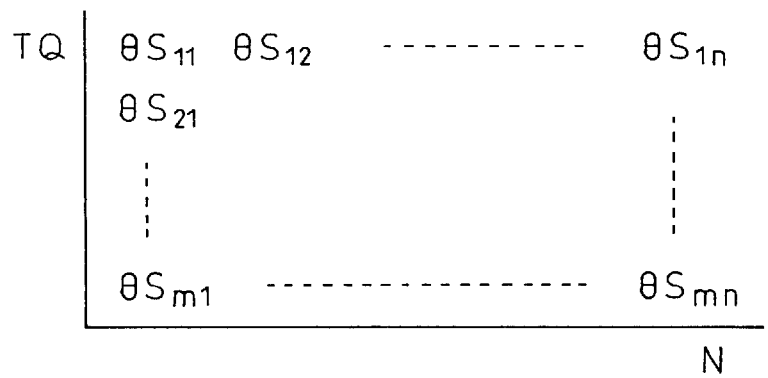

The amount of injection Q in the first operating region I is stored in advance in the ROM 42 in the form of a map as a function of the required torque TQ and the engine rotational speed N as shown in FIG. 12A. The injection start timing θS in the first operating region I is stored in advance in the ROM 42 as a function of the required torque TQ and the engine rotational speed N as shown in FIG. 12B.

Figure 13A:
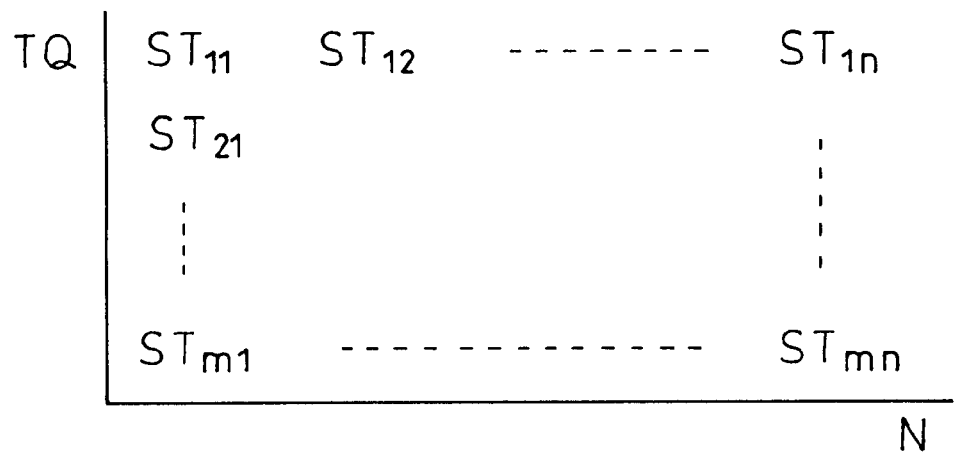
FIGS. 13A and 13B are views of maps of the target degrees of opening of a throttle valve etc.
Figure 13B:
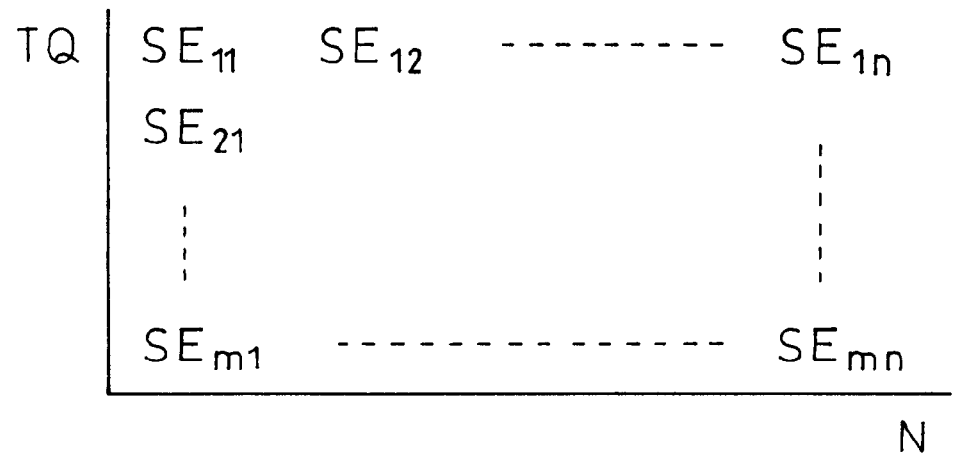

Further, the target degree of opening ST of the throttle valve 20 required for making the air-fuel ratio the target air-fuel ratio shown in FIG. 11 is stored in advance in the ROM 42 in the form of a map as a function of the required torque TQ and the engine rotational speed N as shown in FIG. 13A, while the target degree of opening SE of the EGR control valve 31 required for making the air-fuel ratio the target air-fuel ratio shown in FIG. 11 is stored in advance in the ROM 42 in the form of a map as a function of the required torque TQ and the engine rotational speed N as shown in FIG. 13B.

Figure 14:
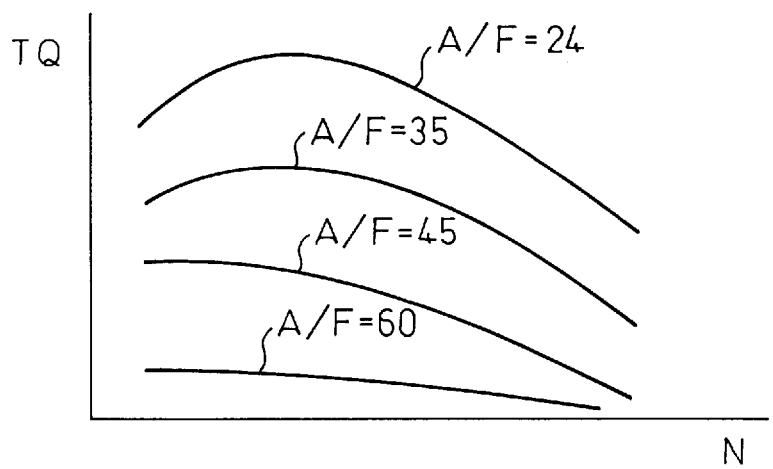
FIG. 14 is a view of the air-flow ratio in second combustion.

FIG. 14 shows the target air-fuel ratio when second combustion, that is, ordinary combustion by the conventional method of combustion, is performed. Note than in FIG. 14, the curves shown by A/F=24, A/F=35, A/F=45, and A/F=60 show the target air-fuel ratios 24, 35, 45, and 60.

Figure 15A:
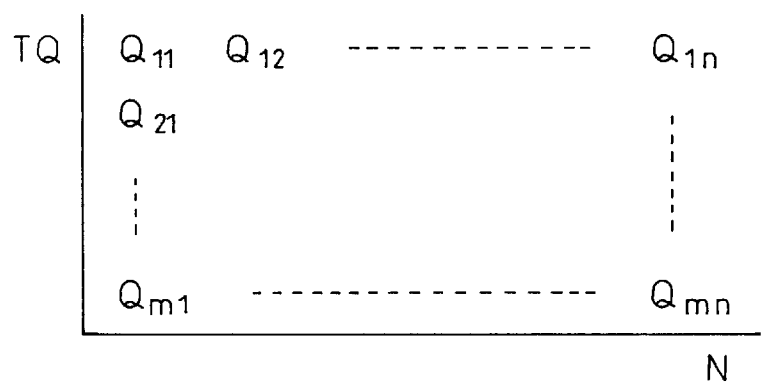
FIGS. 15A and 15B are views of maps of the amount of injection etc.
Figure 15B:
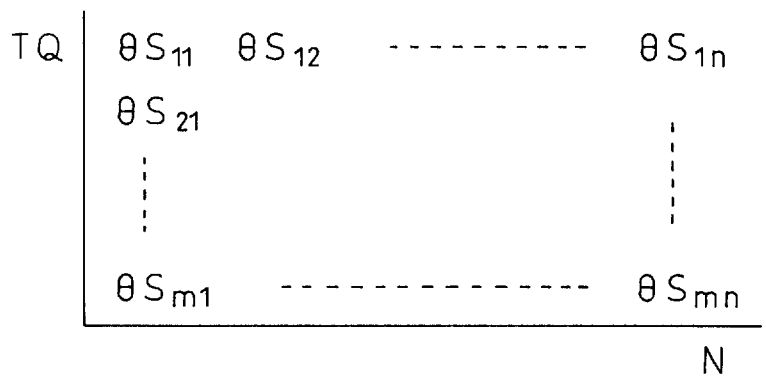

The amount of injection Q when the second combustion is performed is stored in advance in the ROM 42 in the form of a map as a function of the required torque TQ and the engine rotational speed N as shown in FIG. 15A, while the injection start timing θS when the second combustion is performed is stored in advance in the ROM 42 in the form of a map as a function of the required torque TQ and the engine rotational speed N as shown in FIG. 15B.

Figure 16A:
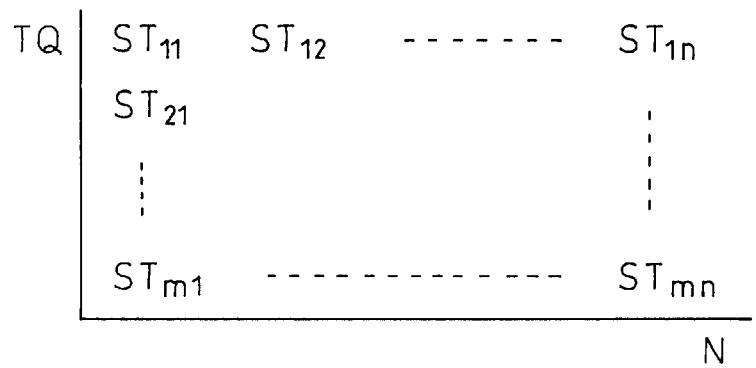
FIGS. 16A and 16B are views of maps of the target degrees of opening of a throttle valve etc.
Figure 16B:
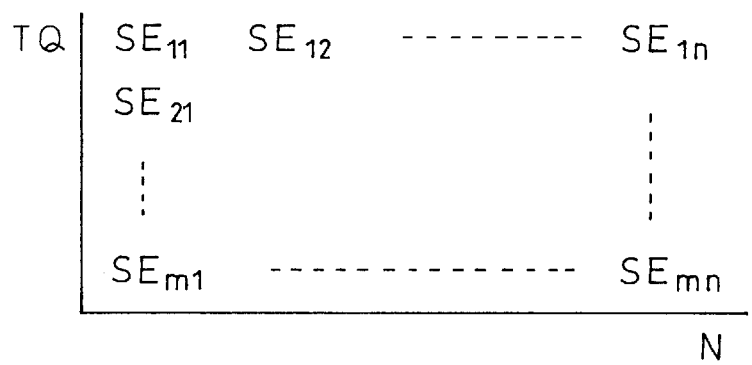

Further, the target degree of opening ST of the throttle valve 20 required for making the air-fuel ratio the target air-fuel ratio shown in FIG. 14 is stored in advance in the ROM 42 in the form of a map as a function of the required torque TQ and the engine rotational speed N as shown in FIG. 16A, while the target degree of opening SE of the EGR control valve 31 required for making the air-fuel ratio the target air-fuel ratio shown in FIG. 14 is stored in advance in the ROM 42 in the form of a map as a function of the required torque TQ and the engine rotational speed N as shown in FIG. 16B.

The $NO_x$ absorbent 25 housed in the casing 26 is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal. If the ratio of the air and fuel (hydrocarbons) supplied into the engine intake passage, combustion chamber 5, and exhaust passage upstream of the $NO_x$ absorbent 25 is referred to as the air fuel ratio of the exhaust gas flowing into the $NO_x$ absorbent 25, then the $NO_x$ absorbent 25 performs an $NO_x$ absorption and release action in which it absorbs $NO_x$ when the air-fuel ratio of the inflowing exhaust gas is lean while releases the absorbed $NO_x$ when the air-fuel ratio of the inflowing exhaust gas becomes the stoichiometric air-fuel ratio or rich.

If this $NO_x$ absorbent 25 is placed in the engine exhaust passage, the $NO_x$ absorbent 25 will in actuality perform an $NO_x$ absorption and release action, but there are portions of the detailed mechanism of this absorption and release action which are still not clear. This absorption and release action, however, is considered to be performed by the mechanism shown in FIGS. 17A and 17B. Next, this mechanism will be explained taking as an example the case of carrying platinum Pt and barium Ba on the carrier, but the same mechanism applies even if using another precious metal and alkali metal, alkali earth, or rare earth.

Figure 17A:
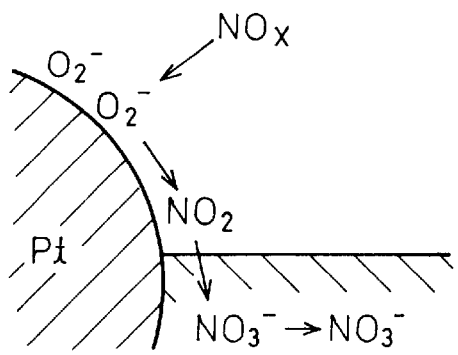
FIGS. 17A and 17B are views for explaining an action of absorbing and releasing $NO_x$.

In the compression ignition type internal combustion engine shown in FIG. 1, combustion is performed when the air-fuel ratio in the combustion chamber 5 is in a lean state. When combustion is performed with the air-fuel ratio in a lean state in this way, the concentration of oxygen in the exhaust gas is high. At this time, as shown in FIG. 17A, the oxygen $O_2$ deposits on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO+O_2 \rightarrow 2NO_2$). Next, part of the produced $NO_2$ is oxidized on the platinum Pt and absorbed in the absorbent and diffuses inside the absorbent in the form of nitrate ions $NO_3^-$ as shown in FIG. 17A while bonding with the barium oxide BaO. The $NO_x$ is absorbed in the $NO_x$ absorbent 25 in this way. So long as the concentration of oxygen in the inflowing exhaust gas is high, $NO_2$ is produced on the surface of the platinum Pt. So long as the $NO_x$ absorption capability of the absorbent does not become saturated, the $NO_2$ is absorbed in the absorbent and nitrate ions $NO_3^-$ are produced.

Figure 17B:
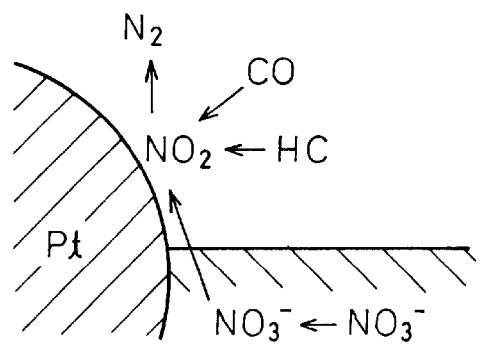

On the other hand, when the air-fuel ratio of the inflowing exhaust gas is made rich, the concentration of oxygen in the inflowing exhaust gas falls and as a result the amount of production of $NO_2$ on the surface of the platinum Pt falls. If the amount of production of $NO_2$ falls, the reaction proceeds in the reverse direction ($NO_3^- \rightarrow NO_2$) and therefore the nitrate ions $NO_3^-$ in the absorbent are released from the absorbent in the form of $NO_2$. At this time, the $NO_x$ released from the $NO_x$ absorbent 25 reacts with the large amount of unburnt hydrocarbons and carbon monoxide contained in the inflowing exhaust gas to be reduced as shown in FIG. 17B. In this way, when there is no longer any $NO_2$ present on the surface of the platinum PT, $NO_2$ is successively released from the absorbent. Therefore, if the air-fuel ratio of the inflowing exhaust gas is made rich, the $NO_x$ will be released from the $NO_x$ absorbent 25 in a short time and, further, the released $NO_x$ will be reduced, so no $NO_x$ will be discharged into the atmosphere.

Note that in this case, even if the air-fuel ratio of the inflowing exhaust gas is made the stoichiometric air-fuel ratio, $NO_x$ will be released from the $NO_x$ absorbent 25. When the air-fuel ratio of the inflowing exhaust gas is made the stoichiometric air-fuel ratio, however, the $NO_x$ will be released from the $NO_x$ absorbent 25 only gradually, so a somewhat long time will be required for having all of the $NO_x$ absorbed in the $NO_x$ absorbent 25 be released.

Figure 18A:
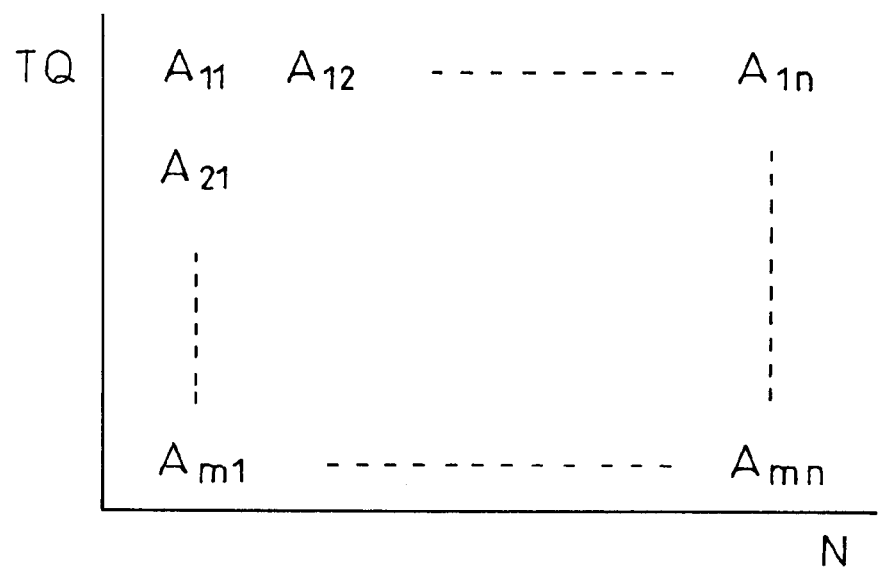
FIGS. 18A and 18B are views of maps of an amount of $NO_x$ absorption per unit time.

There are, however, limits to the $NO_x$ absorption capability of the $NO_x$ absorbent 25. It is necessary to release the $NO_x$ from the $NO_x$ absorbent 25 before the $NO_x$ absorption capability of the $NO_x$ absorbent 25 becomes saturated. Therefore, it is necessary to estimate the amount of $NO_x$ absorbed in the $NO_x$ absorbent 25. Therefore, in this embodiment of the present invention, the amount of $NO_x$ absorption A per unit time when the first combustion is being performed is found in advance in the form of the map shown in FIG. 18A as a function of the required torque TQ and the engine rotational speed N, while the amount of $NO_x$ absorption B per unit time when the second combustion is being performed is found in advance in the form of the map shown in FIG. 18B as a function of the required torque TQ and the engine rotational speed N. The amount $\Sigma NOX$ of $NO_x$ absorbed in the $NO_x$ absorbent 25 is estimated by cumulative addition of these amounts of $NO_x$ absorption A and B per unit time.

In this embodiment according to the present invention, when the amount $\Sigma NOX$ of $NO_x$ absorption exceeds a predetermined maximum allowable value, the $NO_x$ is made to be released from the $NO_x$ absorbent 25. This will be explained next referring to FIG. 19.

Referring to FIG. 19, in this embodiment of the present invention, two maximum allowable values, that is, the maximum allowable value MAX1 and the maximum allowable value MAX2, are set. The maximum allowable value MAX1 is made about 30 percent of the maximum amount of $NO_x$ which the $NO_x$ absorbent 25 can absorb, while the maximum allowable value MAX2 is made about 80 percent of the maximum amount of $NO_x$ which the $NO_x$ absorbent 25 can absorb. When the first combustion is being performed and the amount $\Sigma NOX$ of absorption of $NO_x$ exceeds the maximum allowable value MAX1, the air-fuel ratio is made rich for releasing the $NO_x$ from the $NO_x$ absorbent 25, when the second combustion is being performed and the amount $\Sigma NOX$ of absorption of $NO_x$ exceeds the maximum allowable value MAX1 and the second combustion is switched to the first combustion, the air-fuel ratio is made rich to release the $NO_x$ from the $NO_x$ absorbent 25, while when the second combustion is being performed and the amount $\Sigma NOX$ of the absorption of $NO_x$ exceeds the maximum average value MAX2, additional fuel, that is, the auxiliary fuel, is injected during the expansion stroke or exhaust stroke to release the $NO_x$ from the $NO_x$ absorbent 25.

That is, in FIG. 19, the period X shows the case where the required torque TQ is lower than the first boundary X(N) and the first combustion is being performed. At this time, the air-fuel ratio becomes a lean air-fuel ratio just slightly leaner than the stoichiometric air-fuel ratio. When the first combustion is being performed, the amount of production of $NO_x$ is extremely small, therefore at this time, as shown in FIG. 19, the amount $\Sigma NOX$ of absorption of $NO_x$ rises extremely slowly. When the first combustion is being performed and the amount $\Sigma NOX$ of the absorption of $NO_x$ exceeds the maximum average value MAX1, the air-fuel ratio A/F is made temporarily rich, whereby the $NO_x$ is released from the $NO_x$ absorbent 25. At this time, the amount $\Sigma NOX$ of the absorption of $NO_x$ is made zero.

As explained above, when the first combustion is being performed, whether the air-fuel ratio is lean or the stoichiometric air-fuel ratio or rich, no soot is produced, therefore when the first combustion is being performed, even if the air-fuel ratio A/F is made rich so as to release the $NO_x$ from the $NO_x$ absorbent 25, no soot will ever be produced.

Next, at the time $t_1$, if the required torque TQ exceeds the first boundary X(N), the first combustion is switched to the second combustion. As shown in FIG. 19, when the second combustion is being performed, the air-fuel ratio A/F becomes considerably lean. When the second combustion is being performed, the amount of production of $NO_x$ is greater than when the first combustion is being performed, therefore when the second combustion is being performed, the amount $\Sigma NOX$ of the absorption of $NO_x$ rises relatively rapidly.

When the second combustion is being performed, if the air-fuel ratio A/F is made rich without changing the injection timing etc., a large amount of soot is produced, therefore, when the second combustion is being performed, the air-fuel ratio A/F cannot be made rich without changing the injection timing etc. Therefore, as shown in FIG. 19, when the second combustion is being performed, even if the amount $\Sigma NOX$ of the absorption of $NO_x$ exceeds the maximum average value MAX1, the air-fuel ratio A/F is not made rich so as to release the $NO_x$ from the $NO_x$ absorbent 25. In this case, when, as at the time $t_2$ in FIG. 19, the required torque TQ becomes lower then the second boundary Y(N) and the second combustion is switched to the first combustion, the air-fuel ratio A/F is made temporarily rich to release the $NO_x$ from the $NO_x$ absorbent 25.

Next, assume that at the time $t_3$ of FIG. 19, the first combustion is switched to the second combustion and the second combustion is continued for a while. Assume that the amount $\Sigma NOX$ of the absorption of $NO_x$ exceeds the maximum average value MAX1 at this time, then exceeds the maximum average value MAX2 at the time $t_4$. When this is so, auxiliary fuel is injected during the expansion stroke or the first part of the exhaust stroke to release the $NO_x$ from the $NO_x$ absorbent 25 and the air-fuel ratio of the exhaust gas flowing into the $NO_x$ absorbent 25 is made rich.

The auxiliary fuel injected during the expansion stroke or the first part of the exhaust stroke does not contribute much at all to the production of output in the engine, so it is preferable to reduce the opportunities for injection of the auxiliary fuel as much as possible. Therefore, when the second combustion is being performed and the amount $\Sigma NOX$ of the absorption of $NO_x$ exceeds the maximum average value MAX1 and the second combustion is switched to the first combustion, the air-fuel ratio A/F is temporarily made rich. The auxiliary fuel is injected only in the special case where the amount $\Sigma NOX$ of the absorption of $NO_x$ exceeds the maximum average value MAX2.

Note that as explained above, the $NO_x$ absorbent 25 carries on its carrier a precious metal such as platinum. Therefore, the $NO_x$ absorbent 25 has an oxidation function. Accordingly, when low temperature combustion is being performed, the large amount of unburned hydrocarbons exhausted from the combustion chamber 5 is oxidized by the $NO_x$ absorbent 25.

However, exhaust gas contains $SO_x$ and the $NO_x$ absorbent 25 absorbs not only $NO_x$, but also $SO_x$. The mechanism of absorption of $SO_x$ into the $NO_x$ absorbent 25 is believed to be the same as the mechanism of absorption of $NO_x$.

That is, in the same way as explained with respect to the mechanism of absorption of $NO_x$, giving an explanation taking as an example the case of carrying on the carrier platinum PT and barium Ba, as explained above, when the air-fuel ratio of the inflowing exhaust gas is lean, oxygen $O_2$ deposits on the surface of the platinum Pt in the form of $O_2^-$ or $O^{2-}$. On the other hand, the $SO_2$ in the inflowing exhaust gas reacts with the $O_2^-$ or $O^{2-}$ on the surface of the platinum Pt to become $SO_3$. Next, part of the produced $SO_3$ is oxidized on the platinum Pt and absorbed in the absorbent and diffuses inside the absorbent in the form of sulfate ions $SO_4^2$ while bonding with the barium oxide BaO to produce the stable sulfate $BaSO_4$.

This sulfate $BaSO_4$, however, is stable and hard to decompose. Even if the air-fuel ratio of the inflowing exhaust gas is made rich for release of the $NO_x$ from the $N_x$ absorbent 25 as explained above, the sulfate $BaSO_4$ does not decompose and remains as it is. Therefore, along with the passage of time, the sulfate $BaSO_4$ in the $NO_x$ absorbent 25 increases and therefore along with time the amount of $NO_x$ which the $NO_x$ absorbent 25 can absorb falls.

The sulfate $BaSO_4$, however, decomposes when the temperature of the $NO_x$ absorbent 25 exceeds a certain temperature determined by the $NO_x$ absorbent 25, for example, about 600° C. If the air-fuel ratio of the exhaust gas flowing into the $NO_x$ absorbent 25 at this time is made the stoichiometric air-fuel ratio or rich, the $SO_x$ will be released from the $N_x$ absorbent 25. Making the $SO_x$ be released from the $NO_x$ absorbent 25, however, requires a considerably long time compared with the case of releasing the $NO_x$ from the $NO_x$ absorbent 25. Giving one example, it is possible to release all of the $NO_x$ from the $NO_x$ absorbent 25 by making the air-fuel ratio of the exhaust gas rich for a short time of less than one second, but releasing all of the $SO_x$ from the $NO_x$ absorbent 25 requires the temperature of the $NO_x$ absorbent 25 to be maintained at not less than about 600° C. and to keep the air-fuel ratio of the exhaust gas rich for about 10 minutes. That is, in order to make all of the $SO_4$ be released from the $NO_x$ absorbent 25, it is necessary to maintain the $NO_x$ absorbent 25 at a high temperature for a long period.

As explained above, however, when the first combustion, that is, the low temperature combustion, is being performed, the temperature of the exhaust gas becomes high, therefore the temperature of the $NO_x$ absorbent 25 also becomes high. Further, at this time, the large amount of unburned hydrocarbons exhausted from the combustion chamber 5 is oxidized by the $NO_x$ absorbent 25. The heat of the oxidation reaction causes the temperature of the $NO_x$ absorbent 25 to become further higher. As a result, when the low temperature combustion is being performed, the temperature of the $NO_x$ absorbent 25 becomes more than 600 C. In this case, if the air-fuel ratio is made rich, the temperature of the $NO_x$ absorbent 25 becomes even higher.

On the other hand, as explained above, when the second combustion is being performed, the temperature of the exhaust gas becomes lower. Therefore, if the first combustion is switched to the second combustion, the temperature of the $NO_x$ absorbent 25 falls to a temperature considerably lower than 600° C. On the other hand, if the second combustion is switched to the first combustion, the temperature of the $NO_x$ absorbent 25 gradually increases and becomes over 600° C., but time is required for the temperature of the $NO_x$ absorbent 25 to become over 600° C. Therefore, when the first combustion and the second combustion are frequently switched between, the temperature of the $NO_x$ absorbent 25 almost never becomes over 600° C. any longer.

In actual operating conditions, the first combustion and the second combustion are often frequently switched between. Therefore, even at the time of an operating state where the first combustion and the second combustion are frequently switched between in this way, it is necessary to be able to maintain the $NO_x$ absorbent 25 at a high temperature to enable release of $SO_x$. Therefore, when second combustion is being performed, the temperature of the $NO_x$ absorbent 25 must be maintained at over 600° C.

Further, when second combustion is being performed, if the amount of $NO_x$ which can be absorbed by the $NO_x$ absorbent 25 falls, it is preferable to be able to release the $SO_x$ from the $NO_x$ absorbent 25 immediately when the second combustion is switched to the first combustion. Accordingly, it is preferable to raise the temperature of the $NO_x$ absorbent 25 to over 600° C. when the second combustion is being performed.

In this way, when the action of releasing $SO_x$ from the $NO_x$ absorbent 25 has been started, it is necessary to maintain the temperature of the $NO_x$ absorbent 25 at over 600° C. when the second combustion is being performed. When the amount of $NO_x$ which can be absorbed by the $NO_x$ absorbent 25 falls when the second combustion is being performed, it is preferable to raise the temperature of the $NO_x$ absorbent 25 to over 600° C. Therefore, next, an explanation will be given of the method of maintaining the temperature of the $NO_x$ absorbent 25 at over 600° C. when the second combustion is being performed and the method of raising the temperature of the $NO_x$ absorbent 25 to over 600° C.

In this embodiment of the present invention, to maintain the temperature of the $NO_x$ absorbent 25 over 600° C. when the second combustion is being performed and raise the temperature of the $NO_x$ absorbent to over 600° C., use is made of a combination of two methods: the method of raising the temperature of the exhaust gas and the method of increasing the amount of unburned hydrocarbons in the exhaust gas. In this case, in this embodiment of the present invention, the injection timing of the main fuel is delayed so as to raise the temperature of the exhaust gas and auxiliary fuel is injected in addition to the main fuel so as to increase the amount of the unburned hydrocarbons in the exhaust gas. Various injection patterns different in at least one of the amount of retardation of the injection timing of the main fuel and the injection timing of the auxiliary fuel are used.

That is, in this embodiment of the present invention, roughly classified, four injection patterns are used, that is, a first pattern of delaying the injection timing of the main fuel without injecting auxiliary fuel, a second pattern of injecting auxiliary fuel before injecting the main fuel and delaying the injection timing of the main fuel, a third pattern of injecting auxiliary fuel before injecting the main fuel and after injecting the main fuel and delaying the injection timing of the main fuel, and a fourth pattern of injecting auxiliary fuel after injecting the main fuel and delaying the injection timing of the main fuel.

Figure 20:
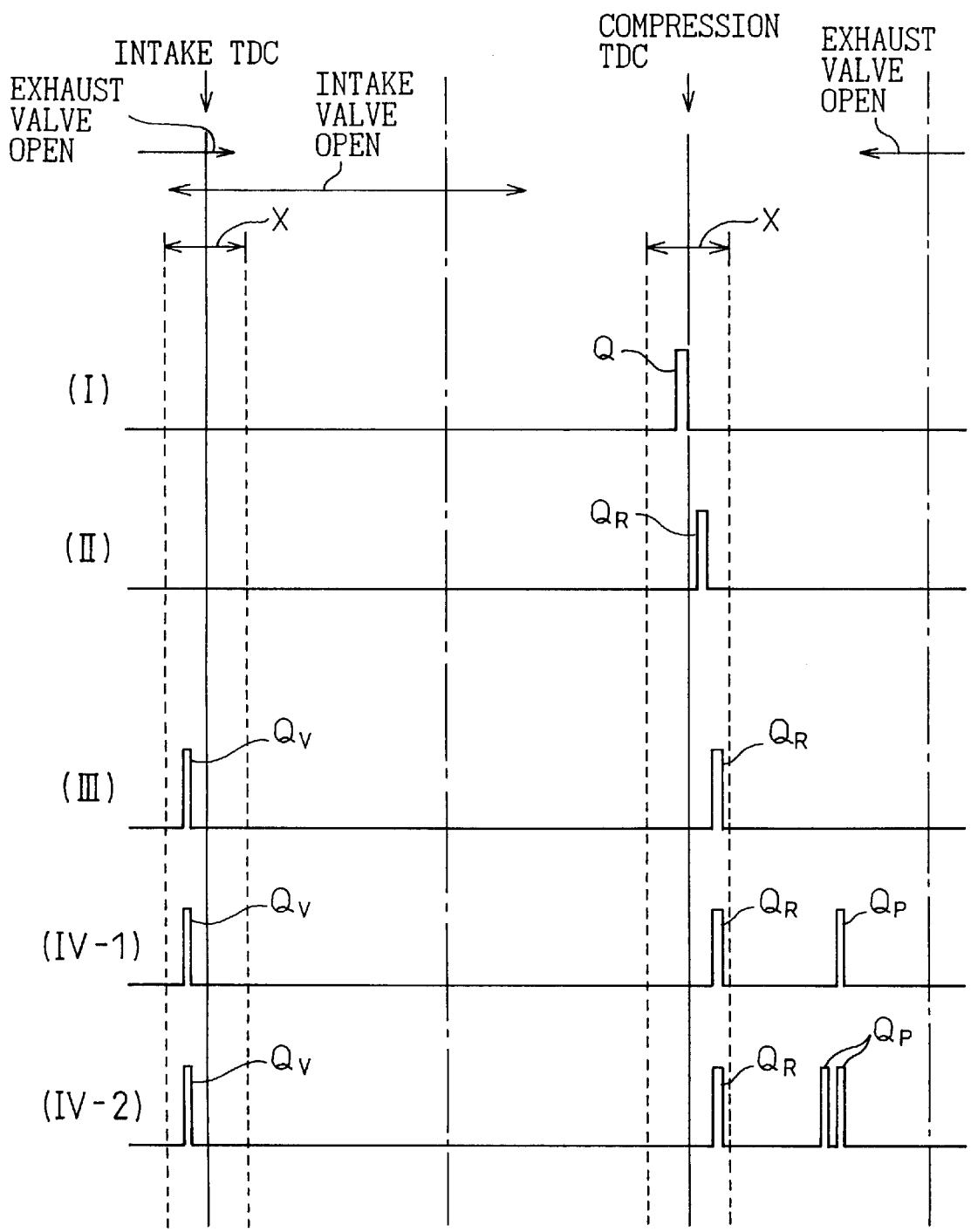
FIGS. 20 to 22 are views of injection timings.
Figure 21:
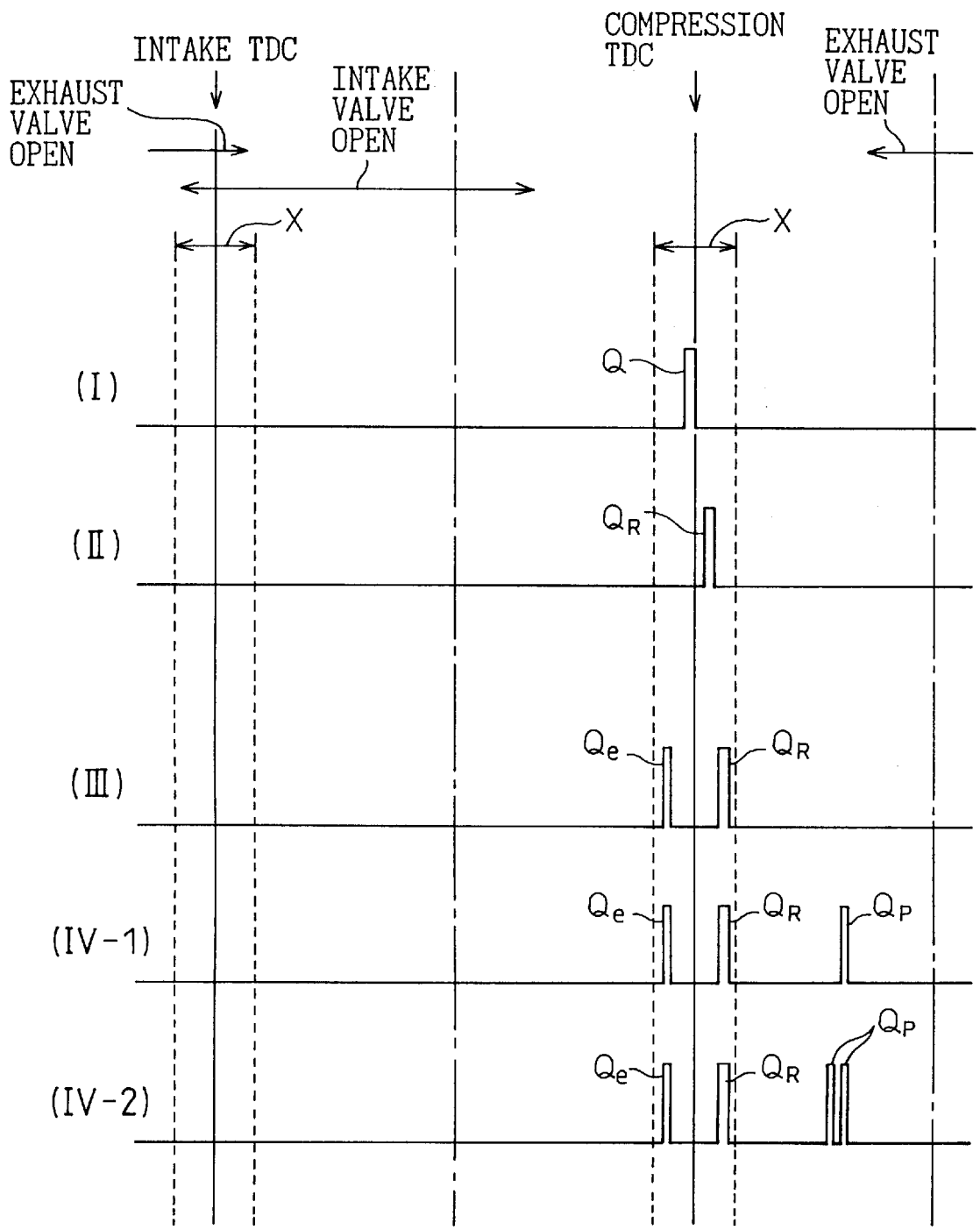
Figure 22:
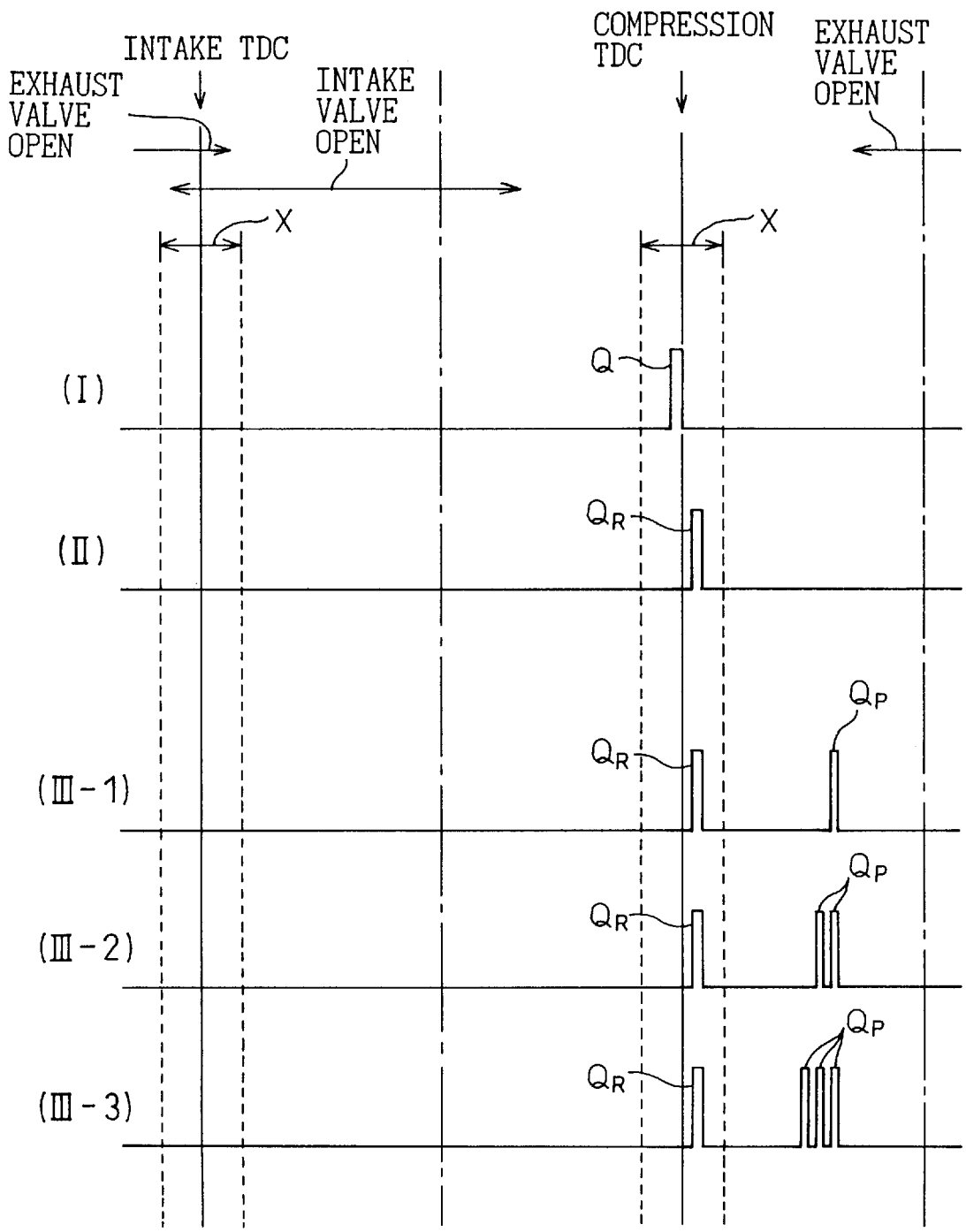
Figure 23:
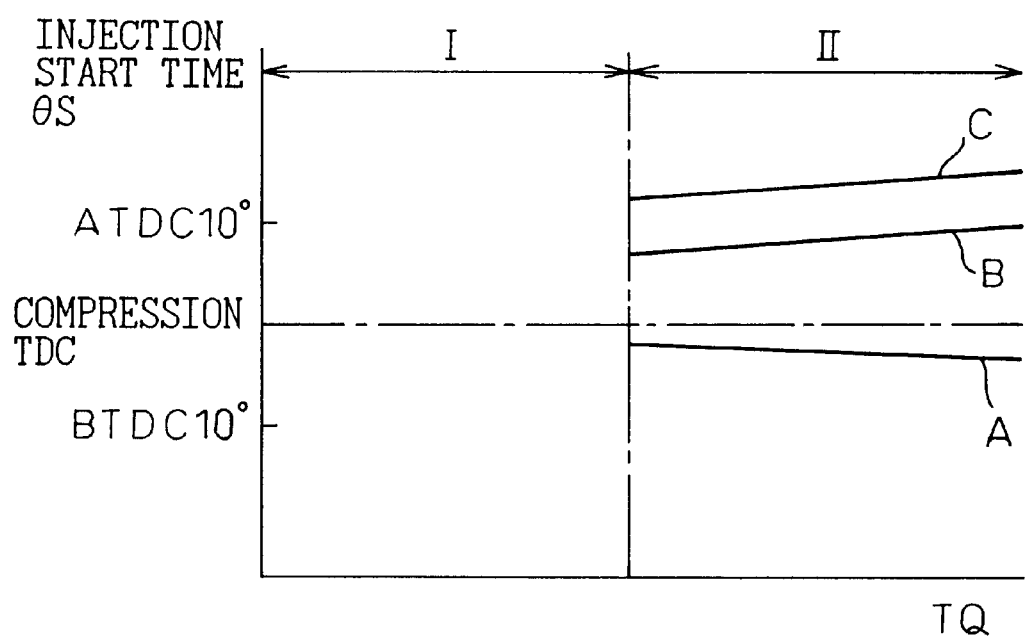
FIG. 23 is a view of an injection start timing.

Next, an explanation will be given of these four injection patterns with reference to FIG. 20 to FIG. 23. FIG. 20 to FIG. 23 show the injection timings of the main fuel and the injection timings of the auxiliary fuel. The abscissas show the crank angle. Further, FIG. 20 to FIG. 22 show the opening timings of the intake valve 7, the opening timings of the exhaust valve 9, and the injection timing X in which fuel injected from a fuel injector 6 can be supplied into a cavity 5a (FIG. 1) formed at the top face of the piston 4. On the other hand, FIG. 23 shows the injection start timing θC of the main fuel. The abscissa in FIG. 23 shows the required torque TQ.

In FIG. 20 to FIG. 22, (I) shows the injection timing at the time of ordinary second combustion. As will be understood from FIG. 20, FIG. 21, and FIG. 22, auxiliary fuel is not injected at this time. Only main fuel Q is injected. The injection start timing θS of the main fuel Q at this time is shown by A in FIG. 23. As will be understood from FIG. 23, the injection start timing θS of the main fuel at this time is made before top dead center of the compression stroke.

On the other hand, (II) shows the first injection pattern. As explained above, in the first injection pattern, only the main fuel $Q_R$ is injected, without injection of the auxiliary fuel. Further, at this time, the injection timing of the main fuel $Q_R$ is delayed compared with the time of ordinary second combustion. The B in FIG. 23 shows the injection start timing θS of the main fuel $Q_R$ at this time. As shown in FIG. 23, the injection start timing θS of the main fuel $Q_R$ at this time is delayed until after top dead center of the compression stroke and is delayed more the higher the required torque TQ.

Once past top dead center of the compression stroke, the pressure in the combustion chamber 5 gradually falls and the temperature in the combustion chamber 5 also gradually falls. Since the pressure in the combustion chamber 5 gradually falls after the top dead center of the compression stroke in this way, if the injection start timing θS of the main fuel $Q_R$ is delayed until after top dead center of the compression stroke, the injected fuel will be made to widely diffuse inside the combustion chamber 5 and will be ignited after being widely diffused. That is, the fuel will be burned in a state with sufficient air present around it. As a result, soot will not be produced much. Further, at the time of ignition, the pressure and temperature in the combustion chamber 5 become low, therefore the combustion temperature will not rise that much. Accordingly, not that much $NO_x$ will be produced either.

On the other hand, if the injection start timing θS of the main fuel $Q_R$ is delayed in this way, the combustion time will become longer and therefore the temperature of the exhaust gas will rise. If the temperature of the exhaust gas rises, the temperature of the exhaust gas after-treatment device, in the embodiment shown in FIG. 1, the temperature of the $NO_x$ absorbent 25, will be made to rise. In this case, the more the injection start timing θS of the main fuel $Q_R$ is delayed, the higher the temperature of the exhaust gas and therefore, from the viewpoint of raising the temperature of the $NO_x$ absorbent 25, it is preferable to delay the injection start timing θS of the main fuel $Q_R$ as much as possible. If the injection start timing θS of the main fuel $Q_R$ is delayed too much, however, misfires will occur. Therefore, in the first injection pattern, the injection start timing OS of the main fuel $Q_R$ is set to a timing as much delayed as possible while still in a range where no misfires occur.

(III) in FIG. 20 shows a first example of the second injection pattern. In this example, auxiliary fuel $Q_v$ is injected near top dead center of the suction stroke. Compared with the case of the first injection pattern shown by (II) in FIG. 20, the injection start timing θS of the main fuel $Q_R$ is further delayed. The C of FIG. 23 shows the injection start timing θS of the main fuel at this time. As shown in FIG. 23, the injection start timing θS of the main fuel $Q_R$ at this time is delayed further from the case of the first injection pattern shown by (II) in FIG. 20. Further, at this time as well, the injection start timing θS of the main fuel $Q_R$ is delayed more the higher the required torque TQ.

In the vicinity of the top dead center of the suction stroke, almost no suction air has been fed into the combustion chamber 5 and, thus, the unburned gas is maintained at a high temperature. Accordingly, if the auxiliary fuel $Q_v$ is injected near top dead center of the suction stroke, the auxiliary fuel $Q_v$ is instantaneously vaporized. If the auxiliary fuel $Q_v$ is vaporized, the heat of compression during the compression stroke causes the production of aldehydes, ketones, peroxides, carbon monoxide, and other intermediate products from the auxiliary fuel $Q_v$. These intermediate products cause the reaction of the main fuel $Q_R$ to be accelerated. Therefore, in this case, even if the injection start timing θS of the main fuel $Q_R$ is delayed by a large extent, good combustion can be obtained without causing misfires. On the other hand, since the injection start timing θS of the main fuel $Q_R$ can be delayed by a large extent in this way, the temperature of the exhaust gas becomes considerably high and therefore the temperature of the $NO_x$ absorbent 25 can be raised to a higher level.

Further, in the example shown by (III) in FIG. 20, when the exhaust valve 9 opens, auxiliary fuel $Q_v$ is injected, so part of the auxiliary fuel $Q_v$ is exhausted into the exhaust port 10 in the form of unburned hydrocarbons. The unburned hydrocarbons, if reaching the $NO_x$ absorbent 25, are oxidized by the excess oxygen in the exhaust gas. The heat of the oxidation reaction occurring at this time causes the temperature of the $NO_x$ absorbent 25 to rise rapidly to a further higher level. That is, in this example, the dual actions of the action of raising the temperature of the exhaust gas and the action of increasing the unburned hydrocarbons in the exhaust gas result in the temperature of the $NO_x$ absorbent 25 being raised.

Further, in the example shown by (III) in FIG. 20, auxiliary fuel $Q_v$ is injected at the injection timing X where the injected fuel is supplied into the cavity 5a of the piston 4. Therefore, it is possible to prevent the auxiliary fuel $Q_v$ from depositing on the inner wall of the cylinder bore. As a result, it is possible to prevent the lubrication oil from being diluted by the injected fuel.

Figure 24:
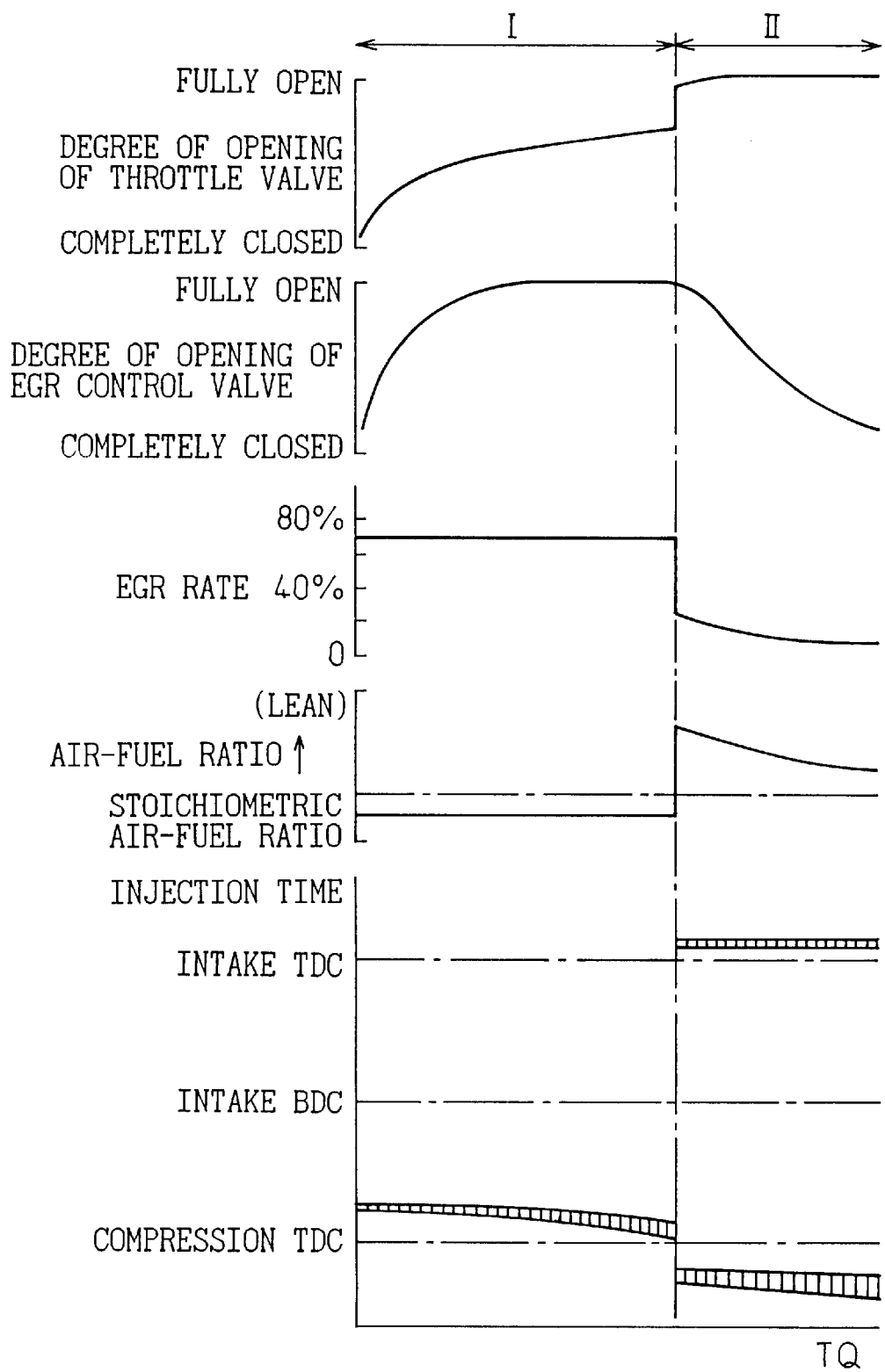
FIG. 24 is a view of the degree of opening of a throttle valve etc.

FIG. 24 shows the operational control when injection is performed by the first example of the second injection pattern shown by (III) in FIG. 20 in the second operating region. As will be understood from a comparison of FIG. 24 and FIG. 10, the EGR rate in the second operating region II in the case shown in FIG. 24 is made somewhat larger than the EGR rate in the case shown in FIG. 10, that is, the ordinary second operating region.

On the other hand, (III) in FIG. 21 shows a second example of the second injection pattern. In this second example, the auxiliary fuel $Q_e$ is injected at the end of the compression stroke. Compared with the case of the first pattern shown by (II) in FIG. 21, the injection start timing θS of the main fuel $Q_R$ is further delayed. The injection start timing θS of the main fuel $Q_R$ at this time is shown by C in FIG. 23. In this case as well, aldehydes, ketones, peroxides, carbon monoxide, and other intermediate products are produced from the auxiliary fuel $Q_e$ and these intermediate products cause the reaction of the main fuel $Q_R$ to be accelerated. Therefore, in this case as well, even if the injection start timing θS of the main fuel $Q_R$ is delayed by a large extent, good combustion can be secured without causing misfires.

In the second example as well, since the auxiliary fuel $Q_e$ is injected at the injection timing X where the injected fuel is supplied into the cavity 5a of the piston 4, it is possible to prevent the auxiliary fuel $Q_e$ from depositing on the inner wall of the cylinder bore.

Note that in the second example, unlike the first example shown by (III) in FIG. 20, fuel is not injected to positively increase the amount of unburned hydrocarbons in the exhaust gas. That is, the second example is aimed at raising the temperature of the exhaust gas by delaying the injection start timing θS of the main fuel $Q_R$ further from the case of the first injection pattern shown by (II) in FIG. 21. Therefore, compared with the case of the first injection pattern shown by (II) in FIG. 21, the second example has a more powerful action of raising the temperature of the $NO_x$ absorbent 25, but compared with the first example, the second example has a weaker action of raising the temperature of the $NO_x$ absorbent 25.

(IV-1) and (IV-2) in FIG. 20 show a first example of the third injection pattern. In the first example, the auxiliary fuel $Q_v$ and main fuel $Q_R$ are injected at the same timings as the second injection pattern shown by (III) in FIG. 20 and auxiliary fuel $Q_p$ is further injected during the expansion stroke or exhaust stroke after injection of the main fuel $Q_R$. In the example shown in FIG. 20, the auxiliary fuel $Q_p$ is injected during the expansion stroke just before the exhaust valve 9 opens.

The auxiliary fuel $Q_p$ is not burned in the combustion chamber 5, therefore if the auxiliary fuel $Q_p$ is injected, the auxiliary fuel $Q_p$ is exhausted into the exhaust port 10 in the form of unburned hydrocarbons. Therefore, if the auxiliary fuel $Q_p$ is injected, the amount of unburned hydrocarbons in the exhaust gas is increased and therefore the heat of oxidation reaction of the unburned hydrocarbons causes the temperature of the $NO_x$ absorbent 25 to rapidly rise. Compared with the case of making the temperature of the exhaust gas rise to raise the temperature of the $NO_x$ absorbent 25, increasing the amount of unburned hydrocarbons in the exhaust gas and using the heat of oxidation reaction to raise the temperature of the $NO_x$ absorbent 25 enables the temperature of the $NO_x$ absorbent 25 to be raised far more rapidly, so compared with the case of using the second injection pattern shown by (III) in FIG. 20, use of the third injection pattern shown by (IV-1) and (IV-2) in FIG. 20 enables the temperature of the $NO_x$ absorbent 25 to be raised far more rapidly. The auxiliary fuel $Q_p$, however, does not contribute to the production of output in the engine, so if the auxiliary fuel $Q_p$ is injected, the amount of fuel consumption is increased.

When making the temperature of the $NO_x$ absorbent 25 rise more rapidly, as shown by (IV-2) in FIG. 20, the number of injections of the auxiliary fuel $Q_p$ may be increased. That is, if injecting a large amount of auxiliary fuel $Q_p$, the penetration force of the injected fuel becomes greater, so part of the auxiliary fuel $Q_p$ ends up depositing on the inner wall of the cylinder bore. As opposed to this, if the amount of injection of the auxiliary fuel $Q_p$ is reduced, the penetration force of the injected fuel becomes smaller, so the auxiliary fuel $Q_p$ will no longer deposit on the inner wall of the cylinder bore. Therefore, when increasing the amount of injection of the auxiliary fuel $Q_p$, as shown by (IV-2) in FIG. 20, small amounts of the auxiliary fuel $Q_p$ are injected at intervals over several times.

(IV-1) and (IV-2) of FIG. 21 show a second example of the third injection pattern. In the second example, the auxiliary fuel $Q_e$ and the main fuel $Q_R$ are injected at the same timings as the second injection pattern shown by (III) in FIG. 21 and further auxiliary fuel $Q_p$ is injected during the expansion stroke or exhaust stroke after the injection of the main fuel $Q_R$. In the example shown in FIG. 21, the auxiliary fuel $Q_p$ is injected during the expansion stroke right before the exhaust valve 9 opens.

In the second example as well, when making the temperature of the $NO_x$ absorbent 25 rise more rapidly, as shown by (IV-2) in FIG. 21, the number of injections of the auxiliary fuel $Q_p$ may be increased.

(III-1), (III-2), and (III-3) of FIG. 22 show the fourth injection pattern. In this fourth injection pattern, the main fuel $Q_R$ is injected at the same timing as the first injection pattern shown by (II) of FIG. 22 and further auxiliary fuel $Q_p$ is injected during the expansion stroke or exhaust stroke after injection of the main fuel $Q_R$. In the example shown in FIG. 22, the auxiliary fuel $Q_p$ is injected during the expansion stroke right before the exhaust valve 9 opens.

In the fourth injection pattern as well, when making the temperature of the $NO_x$ absorbent 25 rise more rapidly, as shown by (III-2) and (III-3) in FIG. 22, the number of injections of the auxiliary fuel $Q_p$ may be increased.

If the injection pattern is changed in this way, one or both of the temperature of the exhaust gas or the amount of the unburned hydrocarbons in the exhaust gas change, therefore the temperature of the $NO_x$ absorbent 25 changes. Further, even with the same injection pattern, if the number of injections of the auxiliary fuel $Q_p$ after top dead center of the compression stroke is changed, the amount of unburned hydrocarbons in the exhaust gas changes and therefore the temperature of the $N_x$ absorbent 25 changes. Accordingly, by changing the injection pattern or changing the number of injections of the auxiliary fuel $Q_p$ after top dead center of the compression stroke, it is possible to control the temperature of the $NO_x$ absorbent 25 to the optimal temperature.

Next, as one example, an explanation will be given of the case of using the first injection pattern shown by (II) in FIG. 20, the second injection pattern shown by (III) in FIG. 20, and the third injection pattern shown by (IV-1) and (IV-2) in FIG. 20 when maintaining the temperature of the $NO_x$ absorbent 25 at the target temperature, for example, 650° C.

Figure 25:
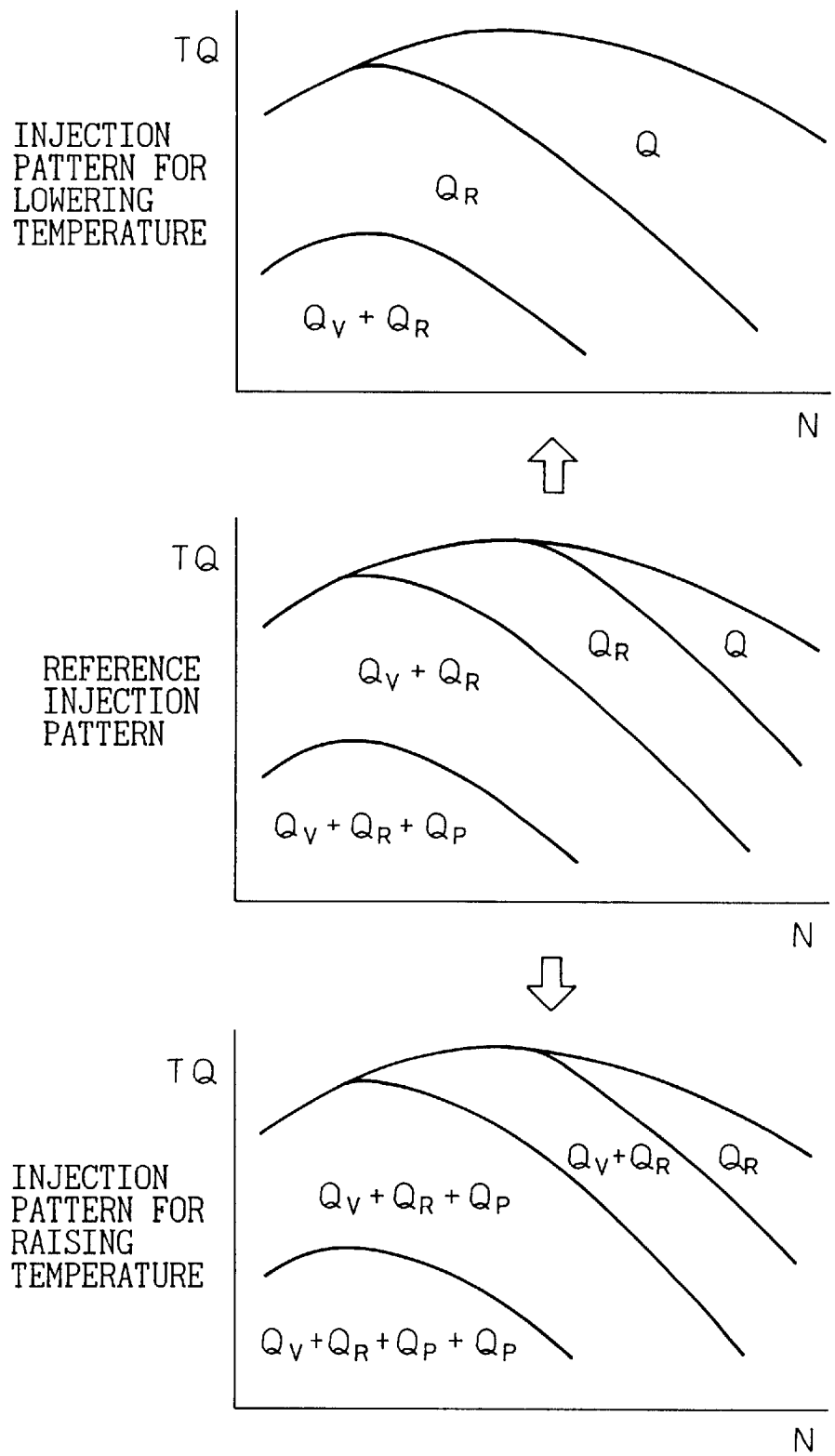
FIG. 25 is a view of injection patterns.

FIG. 25 shows the relationship between the injection pattern used when maintaining the temperature of the $NO_x$ absorbent 25 at the target temperature, the required torque TQ, and the engine rotational speed N. That is, the region shown by Q in FIG. 25 shows the operating region where the injection Q of ordinary second combustion shown by (I) in FIG. 20 is performed, the region shown by $Q_R$ shows the operating region where injection is performed by the first injection pattern $Q_R$ shown by (II) in FIG. 20, the region shown by $Q_V+Q_R$ shows the operating region where injection is performed by the second injection pattern $Q_V+Q_R$ shown by (III) in FIG. 20, the region shown by $Q_V+Q_R+Q_P$ shows the operating region where injection is performed by the third injection pattern $Q_V+Q_R+Q_P$ shown by (IV-1) in FIG. 20, and the region shown by $Q_V+Q_R+Q_P+Q_P$ shows the operating region where injection is performed by the third injection pattern $Q_V+Q_R+Q_P+Q_P$ shown by (IV-2) in FIG. 20.

In FIG. 25, the figure shown at the center shows the optimal reference injection pattern, found from experiments, for maintaining the temperature of the $NO_x$ absorbent 25 at the target temperature. In this reference injection pattern, injection Q where ordinary second combustion is performed is performed in the limited operating region where the required torque TQ is high and the engine rotational speed N is high, in the operating region at the low load side of this operating region, injection is performed by the first injection pattern $Q_R$, in the operating region at the further lower load side of this operating region, injection is performed by the second injection pattern $Q_V+Q_R$, and in the operating region at the still further lower load side of this operating region, injection is performed by the third injection pattern $Q_V+Q_R+Q_P$.

If injection is performed by this reference injection pattern, normally the temperature of the $NO_x$ absorbent 25 is maintained close to the target temperature. In actuality, however, even if injecting fuel by the reference injection pattern, the temperature of the $NO_x$ absorbent 25 becomes too high or becomes too low compared with the target temperature in some cases. Therefore, in this embodiment of the present invention, when the temperature of the $NO_x$ absorbent 25 becomes too high compared with the target temperature, the injection pattern is switched from the reference injection pattern to the injection pattern for lowering the temperature shown in FIG. 25, while when the temperature of the $NO_x$ absorbent 25 becomes too low compared with the target temperature, the injection pattern is switched from the reference injection pattern to the injection pattern for raising the temperature shown in FIG. 25.

When the injection pattern is switched from the reference injection pattern to the injection pattern for lowering the temperature, the first injection pattern $Q_R$ is switched to the injection Q where ordinary second combustion is performed, the second injection pattern $Q_V+Q_R$ is switched to the first injection pattern $Q_R$, and the third injection pattern $Q_V+Q_R+Q_P$ is switched to the second injection pattern $Q_V+Q_R$, therefore the temperature of the $NO_x$ absorbent 25 falls.

As opposed to this, when the injection pattern is switched from the reference injection pattern to the injection pattern for raising the temperature, the injection Q where the ordinary second combustion is performed is switched to the first injection pattern $Q_R$, the first injection pattern $Q_R$ is switched to the second injection pattern $Q_V+Q_R$, the second injection pattern $Q_V+Q_R$ is switched to the third injection pattern $Q_V+Q_R+Q_P$, and the third injection pattern $Q_V+Q_R+Q_P$ is switched to the third injection pattern $Q_V+Q_R+Q_P+Q_P$, therefore the temperature of the $NO_x$ absorbent 25 rises.

In this embodiment of the present invention, when $SO_x$ is to be released from the $NO_x$ absorbent 25 in this way, the temperature of the $NO_x$ absorbent 25 is maintained at the target temperature. At this time, however, the air-fuel ratio becomes lean at the second operating region II, therefore there is no action of releasing $SO_x$ from the $NO_x$ absorbent 25 at the second operating region II.

On the other hand, as shown in FIG. 24, in the first operating region I, the EGR rate is made about 70 percent, therefore low temperature combustion is performed at this time. Accordingly, as mentioned above, the temperature of the $NO_x$ absorbent 25 is maintained at over 600° C. Further, as shown in FIG. 24, in the first operating region I, the air-fuel ratio is made rich, therefore when the operating state of the engine becomes the first operating region I, $SO_x$ is released from the $NO_x$ absorbent 25.

Figure 26:
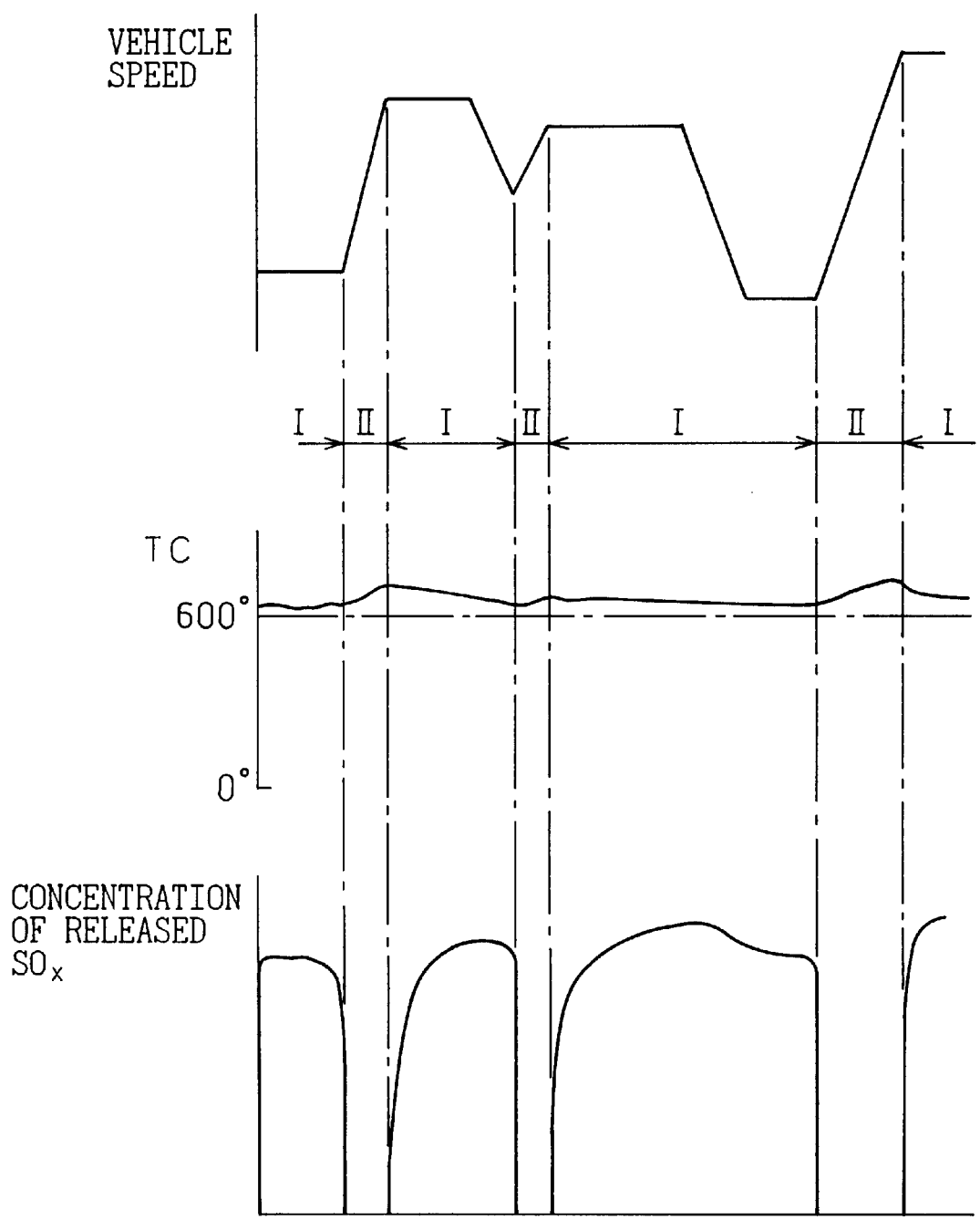
FIG. 26 is a time charts for explaining the action of releasing $SO_x$.

FIG. 26 shows the vehicle speed, the temperature TC of the $NO_x$ absorbent 25, and the concentration of $SO_x$ released from the $NO_x$ absorbent 25. As shown in FIG. 26, at the time of acceleration where the amount of depression L of the accelerator pedal 50 is large, the second operating region II is entered. At the time of cruising and deceleration where the amount of depression L of the accelerator pedal 50 is relatively small, the first operating region I is entered. As shown in FIG. 26, even if repeating the first operating region I and the second operating region II, the temperature TC of the $NO_x$ absorbent 25 is maintained over 600° C. Therefore, $SO_x$ is released from the $NO_x$ absorbent 25 every time the operating state of the engine becomes the first operating region I where combustion is performed under a rich air-fuel ratio.

Next, an explanation will be given of the method of raising the temperature of the $NO_x$ absorbent 25 to over 600° C. when the second combustion is being performed. In this case as well, the injection patterns shown in FIG. 20 to FIG. 22 are selectively used. Below, as one example, an explanation will be given of the case of use of the first injection pattern shown by (II) in FIG. 20, the second injection pattern shown by (III) in FIG. 20, and the third injection pattern shown by (IV-1) or (IV-2) in FIG. 20 when raising the temperature of the $NO_x$ absorbent 25 to the target temperature, for example, 650° C.

Figure 27:
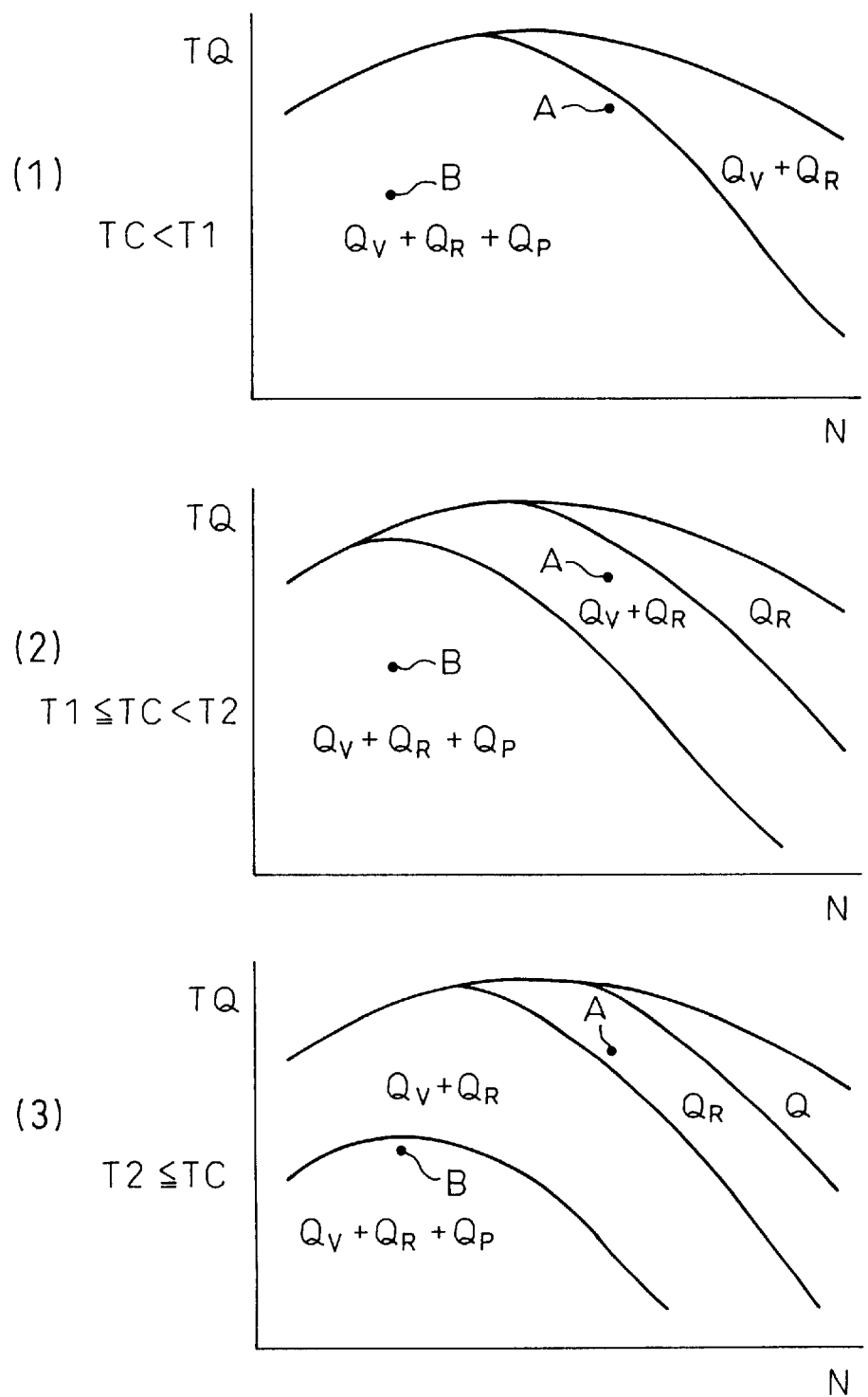
FIG. 27 is a view of injection patterns.

FIG. 27 shows the relationship between the injection patterns used when raising the temperature of the $NO_x$ absorbent 25, the required torque TQ, and the engine rotational speed N. That is, the region shown by Q in FIG. 27 shows the operating region where ordinary injection Q shown by (I) in FIG. 20 is performed, the region shown by $Q_R$ shows the operating region where injection is performed by the first injection pattern $Q_R$ shown by (II) in FIG. 20, the region shown by $Q_V+Q_R$ shows the operating region where injection is performed by the second injection pattern $Q_V+Q_R$ shown by (III) in FIG. 20, the region shown by $Q_V+Q_R+Q_P$ shows the operating region where injection is performed by the third injection pattern $Q_V+Q_R+Q_P$ shown by (IV-1) or (IV-2) in FIG. 20.

Further, (1) in FIG. 27 shows when the temperature TC of the exhaust gas after-treatment device, in this embodiment, the temperature TC of the $NO_x$ absorbent 25, is lower than a predetermined first temperature T1, for example 300° C., (2) in FIG. 27 shows when the temperature TC of the $NO_x$ absorbent 25 is higher than the first temperature T1 and lower than a predetermined second temperature T2, for example, 500° C., and (3) in FIG. 27 shows when the temperature TC of the $NO_x$ absorbent 25 is higher than the second temperature T2.

When the temperature TC of the $NO_x$ absorbent 25 is lower than the first temperature T1, as shown by (1) in FIG. 27, injection is performed by the second injection pattern $Q_V+Q_R$ in only the limited operating region where the required torque TQ is high and the engine rotational speed N is high, while injection is performed by the third injection pattern $Q_V+Q_R+Q_P$ in the greater portion of the other operating region.

On the other hand, when the temperature TC of the $NO_x$ absorbent 25 is T1≦TC<T2, as shown by (2) in FIG. 27, injection is performed by the first injection pattern $Q_R$ in the limited operating region where the required torque TQ is high and the engine rotational speed N is high, injection is performed by the second injection pattern $Q_V+Q_R$ in the operating region at the low load side of this operating region, and injection is performed by the third injection pattern $Q_V+Q_R+Q_P$ in the operating region at the further lower load side of this operating region.

On the other hand, when the temperature TC of the $NO_x$ absorbent 25 is T2≦TC, as shown by (3) in FIG. 27, injection of an ordinary operation is performed in the limited operating region where the required torque TQ is high and the engine rotational speed N is high, injection is performed by the first injection pattern $Q_R$ in the operating region at the low load side of this operating region, injection is performed by the second injection pattern $Q_V+Q_R$ in the operating region at the further lower load side of this operating region, and injection is performed by the third injection pattern $Q_V+Q_R+Q_P$ in the operating region at the further lower load side of this operating region.

That is, as the temperature TC of the $NO_x$ absorbent 25 becomes higher, the operating region where injection is performed by the first injection pattern $Q_R$ and the operating region where injection is performed by the second injection pattern $Q_V+Q_R$ shift to the low load side.

Figure 28A:
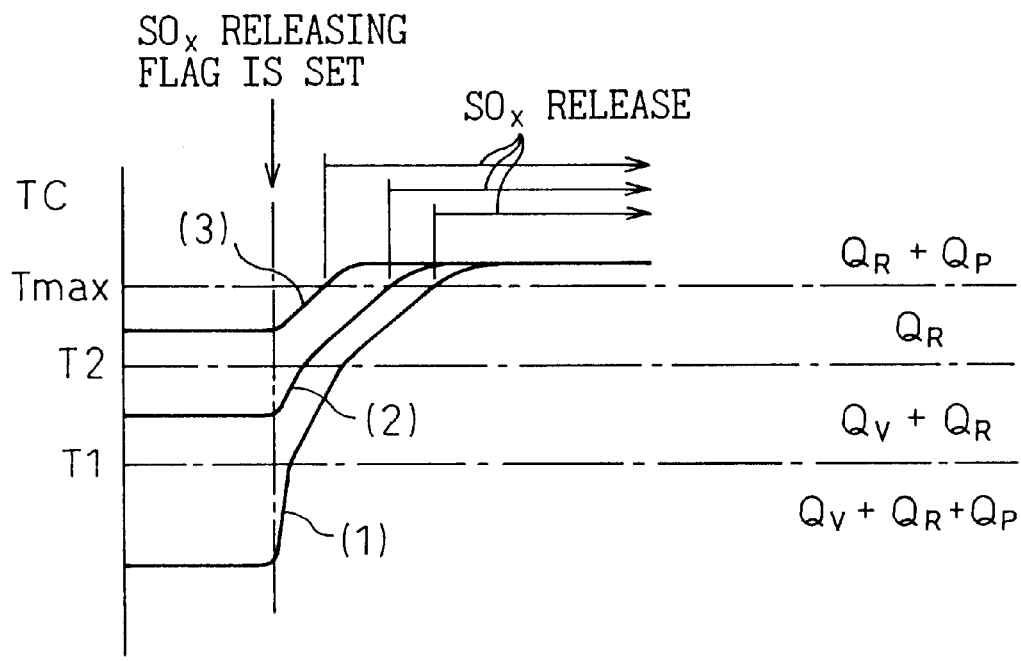
FIGS. 28A and 28B are time charts showing changes in the temperature of an $NO_x$ absorbent.

FIG. 28A shows the change in the temperature TC of the $NO_x$ absorbent 25 and the change in the injection pattern when assuming the action of raising the temperature of the $NO_x$ absorbent 25 is started and the same required torque TQ and engine rotational speed N are maintained after that as well in the case of the required torque TQ and the engine rotational speed N shown by the point A in FIG. 27. Note that the solid line (1) in FIG. 28A, shows the case where the action of raising the temperature of the $NO_x$ absorbent 25 was started when TC<T1 as shown by (1) in FIG. 27, the solid line (2) in FIG. 28A shows the case where the action of raising the temperature of the $NO_x$ absorbent 25 was started when T1≦TC<T2 as shown by (2) in FIG. 27, and the solid line (3) in FIG. 28A shows the case where the action of raising the temperature of the $NO_x$ absorbent 25 was started when T2≦TC as shown by (3) in FIG. 27.

Further, in FIG. 28A, the action of raising the temperature of the $NO_x$ absorbent 25 is started when an $SO_x$ releasing flag showing that $SO_x$ should be released from the $NO_x$ absorbent 25 is set. The action of releasing the $SO_x$ from the $NO_x$ absorbent 25 is started when the temperature TC of the $NO_x$ absorbent 25 passes a target temperature $T_{max}$ where the $SO_x$ can be released and the first combustion is being performed.

If the action of raising the temperature of the $NO_x$ absorbent 25 is started when TC<T1, first, injection is performed by the third injection pattern $Q_V+Q_R+Q_P$, then when TC≧T1, injection is performed by the second injection pattern $Q_V+Q_R$, then, when TC≧T2, injection is performed by the first injection pattern $Q_R$. In this case, the temperature raising rate of the $NO_x$ absorbent 25 due to the third injection pattern $Q_V+Q_R+Q_P$ is the highest, the temperature raising rate of the $NO_x$ absorbent 25 due to the second injection pattern $Q_V+Q_R$ is the next highest, and the temperature raising rate of the $NO_x$ absorbent 25 due to the first injection pattern $Q_R$ is the lowest.

Therefore, if the action of raising the temperature of the $NO_x$ absorbent 25 is started when TC<T1, as shown by the solid line (1) of FIG. 28A, the temperature TC of the $NO_x$ absorbent 25 rapidly rises, then, when the temperature TC of the $NO_x$ absorbent 25 passes T1, the temperature raising rate of the $NO_x$ absorbent 25 falls a bit, then, when the temperature TC of the $NO_x$ absorbent 25 passes T2, the temperature raising rate of the $NO_x$ absorbent 25 becomes further lower.

On the other hand, if the action of raising the temperature of the $NO_x$ absorbent 25 is started when T1≦TC<T2, first, injection is performed by the second injection pattern $Q_V+Q_R$, then, when TC≦T2, injection is performed by the first injection pattern $Q_R$. Therefore, at this time, as shown by the solid line (2) in FIG. 28A, first the temperature TC of the $NO_x$ absorbent 25 rises relatively slowly, then, when the temperature TC of the $NO_x$ absorbent 25 passes T2, the temperature raising rate of the $NO_x$ absorbent 25 becomes lower.

On the other hand, if the action of raising the temperature of the $NO_x$ absorbent 25 is started when T2 TC, injection is performed by the first injection pattern $Q_R$, therefore, at this time, as shown by the solid line (3) in FIG. 28A, the temperature TC of the $NO_x$ absorbent 25 slowly rises.

Figure 28B:
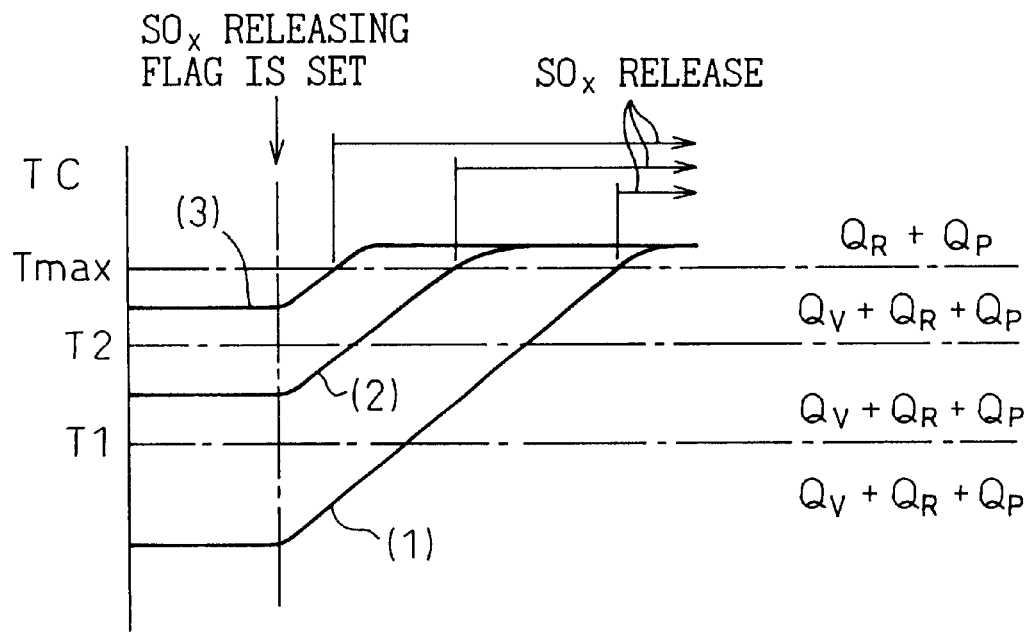

FIG. 28B shows the change in the temperature TC of the $NO_x$ absorbent 25 and the change in the injection patterns when assuming the action of raising the temperature of the $NO_x$ absorbent 25 is started and the same required torque TQ and engine rotational speed N are maintained after that as well in the case of the required torque TQ and the engine rotational speed N shown by the point B in FIG. 27. Note that the solid line (1) in FIG. 28B shows the case where the action of raising the temperature of the $NO_x$ absorbent 25 was started when TC<T1 as shown by (1) in FIG. 27, the solid line (2) in FIG. 28B shows the case where the action of raising the temperature of the $NO_x$ absorbent 25 was started when T1≦TC<T2 as shown by (2) in FIG. 27, and the solid line (3) in FIG. 28B shows the case where the action of raising the temperature of the $NO_x$ absorbent 25 was started when T2≦TC as shown by (3) in FIG. 27.

When maintaining the required torque TQ and the engine rotational speed N shown by the point B in FIG. 27, as will be understood from FIG. 27, whether TC<T1, T1≦TC<T2, or T2≦TC, injection is performed by the third injection pattern $Q_V+Q_R+Q_P$, therefore as shown by the solid lines (1), (2), and (3) in FIG. 28B, the temperature raising rate of the $NO_x$ absorbent 25 becomes about the same regardless of the temperature TC of the $NO_x$ absorbent 25.

That is, as shown by the solid line (1) of FIG. 28A, if the action of raising the temperature of the $NO_x$ absorbent 25 is started when TC<T1, that is, if the action of raising the temperature of the $NO_x$ absorbent 25 is started when there is a large difference between the temperature TC of the $NO_x$ absorbent 25 and the target temperature $T_{max}$, injection is performed by the third injection pattern $Q_V+Q_R+Q_P$ so as to raise the temperature TC of the $NO_x$ absorbent 25 to the target temperature $T_{max}$ as fast as possible. When performing injection by this third injection pattern $Q_V+Q_R+Q_P$, however, the temperature TC of the $NO_x$ absorbent 25 will rapidly rise, so it will be difficult to control the temperature TC of the $NO_x$ absorbent 25 and consequently if just this third injection pattern $Q_V+Q_R+Q_P$ is used, the temperature TC of the $NO_x$ absorbent 25 will end up greatly exceeding the target temperature $T_{max}$ and therefore there will be the risk of thermal degradation of the $NO_x$ absorbent 25. Further, if the third injection pattern $Q_V+Q_R+Q_P$ continues to be used, the amount of fuel consumption will increase.

Therefore, when TC≧T1, in order to prevent thermal deterioration of the $NO_x$ absorbent 25 and reduce the amount of fuel consumption, the third injection pattern $Q_V+Q_R+Q_P$ is switched to the second injection pattern $Q_V+Q_R$, then, when the temperature TC of the $NO_x$ absorbent 25 approaches the target temperature $T_{max}$, that is, when $TC \geq T2$, the second injection pattern $Q_V+Q_R$ is switched to the first injection pattern $Q_R$. If the first injection pattern $Q_R$ is used, the temperature raising rate of the $NO_x$ absorbent 25 becomes smaller and therefore the control of the temperature TC of the $NO_x$ absorbent 25 becomes easy. Accordingly, it is possible to prevent thermal deterioration of the $NO_x$ absorbent 25 and possible to reduce the amount of fuel consumption.

Further, in the case shown by the solid line (2) in FIG. 28A, the temperature TC of the $NO_x$ absorbent 25 is first made to rise relatively quickly, then to prevent thermal deterioration of the $NO_x$ absorbent 25 and reduce the amount of fuel consumption, the second injection pattern $Q_V+Q_R$ is switched to the first injection pattern $Q_R$. Further, as shown by the solid line (3) in FIG. 28A, when the action of raising the temperature of the $NO_x$ absorbent 25 is started when $TC \geq T2$, injection is performed by the first injection pattern $Q_R$ from the start so as to prevent thermal deterioration of the $NO_x$ absorbent 25 and reduce the amount of fuel consumption.

On the other hand, when the required torque TQ is low as shown by the point B in FIG. 27, the amount of fuel injection is small and therefore even if the injection timing of the main fuel is delayed, the temperature of the exhaust gas will not become that high. Therefore, at this time, to make the temperature of the $NO_x$ absorbent 25 rise as fast as possible, injection is performed by the third injection pattern $Q_V+Q_R+Q_P$ regardless of the temperature TC of the $NO_x$ absorbent 25. When the temperature of the exhaust gas is not that high in this way, however, even if injection is performed by the third injection pattern $Q_V+Q_R+Q_P$, as shown by the solid lines (1), (2), and (3) of FIG. 28B, the temperature raising rate of the $NO_x$ absorbent 25 will not become that high. Therefore, at this time, even if injection is performed by the third injection pattern $Q_V+Q_R+Q_P$, the temperature TC of the $NO_x$ absorbent 25 can be easily controlled and consequently there is no risk of the temperature TC of the $NO_x$ absorbent 25 becoming extremely high and of thermal deterioration of the $NO_x$ absorbent 25.

In this way, when raising the temperature TC of the $NO_x$ absorbent 25, the optimal injection pattern for the temperature TC of the $NO_x$ absorbent 25, the required torque TQ, and the engine rotational speed N is used. Note that the injection patterns shown in FIG. 27 are just examples and it is possible to use a fourth injection pattern $Q_R+Q_P$ in accordance with need.

Figure 29:
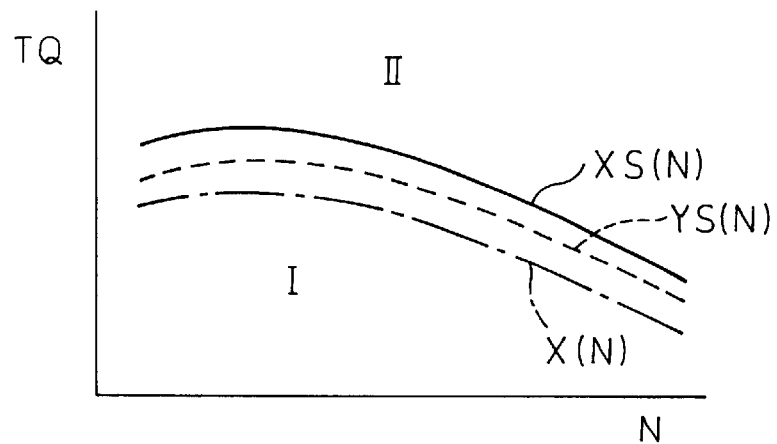
FIG. 29 is a view of the first operating region I and the second operating region II.

FIG. 29 shows a first operating region I where the first combustion, that is, the low temperature combustion, is performed and a second operating region II where the second combustion is performed when $SO_x$ is to be released from the $NO_x$ absorbent 25. Note that in FIG. 29, the ordinate TQ shows the required torque and the abscissa N shows the engine rotational speed. Further, in FIG. 29, XS(N) shows a first boundary between the first operating region I and the second operating region II, and YS(N) shows a second boundary between the first operating region I and the second operating region II. The change of operating regions from the first operating region I to the second operating region II is judged based on the first boundary XS(N), while the change of operating regions from the second operating region II to the first operating region I is judged based on the second boundary YS(N).

Further, FIG. 29 also describes the first boundary X(N) shown in FIG. 9. As will be understood from FIG. 29, the first boundary XS(N) and the second boundary YS(N) for when $SO_x$ is to be released from the $NO_x$ absorbent 25 are positioned at the high load side of the first boundary X(N) and the second boundary Y(N) at the time of ordinary operation shown in FIG. 9. That is, when $SO_x$ is to be released from the $NO_x$ absorbent 25, the air-fuel ratio is made rich in the first operating region I. When the air-fuel ratio is made rich, the range where low temperature combustion is possible expands to the high load side compared with when the air-fuel ratio is lean. Therefore, as explained above, XS(N) and YS(N) are positioned at the high load side of X(N) and Y(N).

Figure 30A:
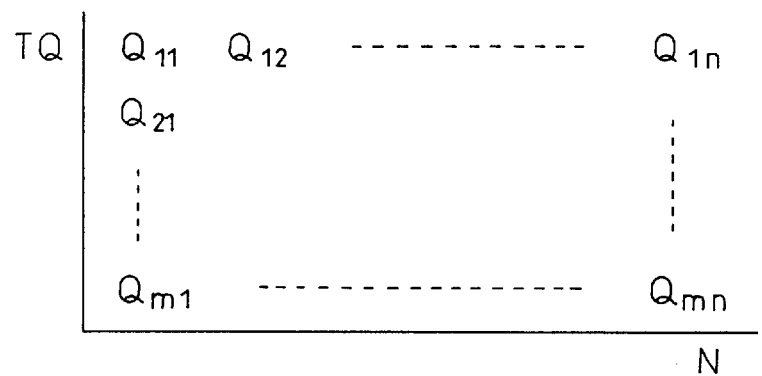
FIGS. 30A and 30B are views of maps of the amount of injection etc.
Figure 30B:
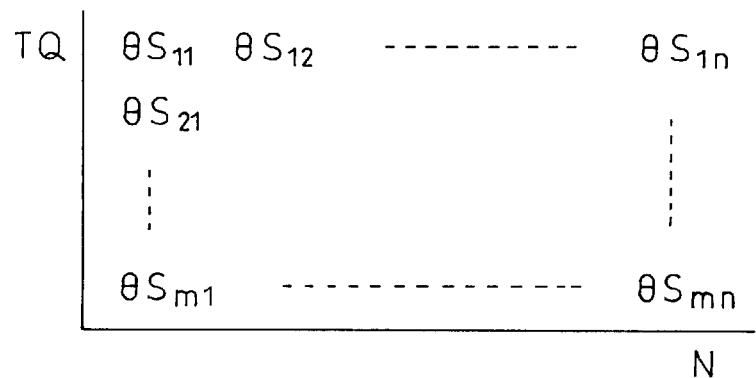

The amount of injection Q in the first operating region of FIG. 29, as shown in FIG. 30A, is stored in advance in the ROM 42 in the form of a map as a function of the required torque TQ and the engine rotational speed N, while the injection start timing $\theta S$ in the first operating region of FIG. 29, as shown in FIG. 30B, is stored in advance in the ROM 42 in the form of a map as a function of the required torque TQ and the engine rotational speed N.

Note that the target degree of opening ST of the throttle valve 20 and the target degree of opening SE of the EGR control valve 31 in the first operating region I of FIG. 29 are calculated from the maps shown in FIG. 13A and FIG. 13B.

The amounts of injection of the main fuel Q and $Q_R$ of the injection patterns in the second operating region II of FIG. 29 are stored in advance in the ROM 42 in the form of maps as functions of the required torque TQ and the engine rotational speed N as shown in FIG. 31A, while the amounts of injection of the auxiliary fuel $Q_V$ and $Q_P$ of the injection patterns in the second operating region II of FIG. 29 are stored in advance in the ROM 42 in the form of maps, as shown in FIG. 31B, as functions of the required torque TQ and the engine rotational speed N. Further, the amount of retardation $\Delta \theta S$ of the injection timing of the main fuel $Q_R$ of the injection patterns in the second operating region II of FIG. 29 is stored in advance in the ROM 42 in the form of a map as functions of the required torque TQ and the engine rotational speed N as shown in FIG. 31C.

Further, the target degree of opening ST of the throttle valve 20 in the second operating region II of FIG. 29 is stored in advance in the ROM 42 in the form of a map as a function of the required torque TQ and the engine rotational speed N as shown in FIG. 32A, while the target degree of opening SE of the EGR control valve 31 in the second operating region II of FIG. 29 is stored in advance in the ROM 42 in the form of a map as a function of the required torque TQ and the engine rotational speed N as shown in FIG. 32B.

Next, an explanation will be made of the processing routine for the $NO_x$ releasing flag which is set when $NO_x$ is to be released from the $NO_x$ absorbent 25 and the $SO_x$ releasing flag which is set when $SO_x$ is to be released from the $NO_x$ absorbent 25 while referring to FIG. 33. Note that this routine is executed by interruption every predetermined time interval.

Figure 33:
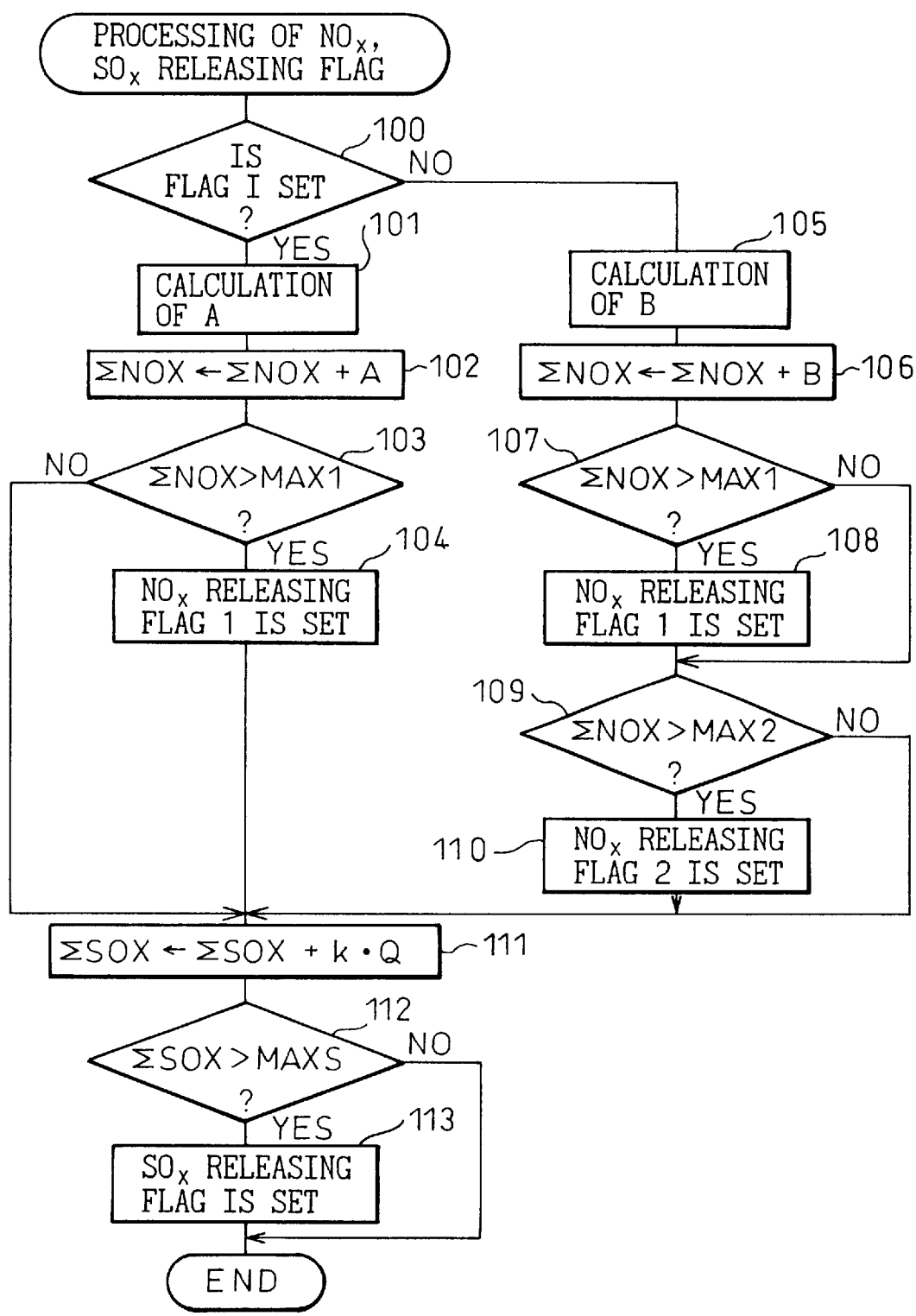
FIG. 33 is a flow chart of the processing for an $NO_x$ releasing flag and an $SO_x$ releasing flag.

Referring to FIG. 33, first, at step 100, it is judged if a flag I showing that the engine operating region is the first operating region I shown in FIG. 9 is set or not. When the flag I is set, that is, when the engine operating region is the first operating region I shown in FIG. 9, the routine proceeds to step 101, where the amount A of absorption of $NO_x$ per unit time is calculated from the map shown in FIG. 18A. Next, at step 102, A is added to the amount $\Sigma NOX$ of absorption of $NO_x$. Next, at step 103, it is determined if the amount $\Sigma NOX$ of absorption of $NO_x$ has exceeded a maximum allowable value MAX1. If ΣNOX>MAX1, the routine proceeds to step 104, where the $NO_x$ releasing flag showing that $NO_x$ should be released is set. Next, the routine proceeds to step 111.

Figure 18B:
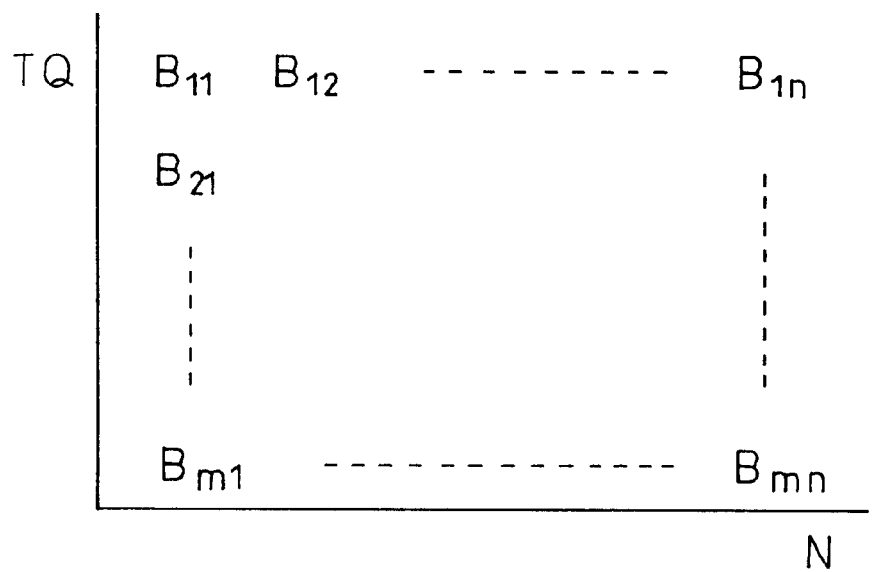

On the other hand, when it is determined at step 100 that the flag I has been reset, that is, when the operating state of the engine is the second operating region II of FIG. 9, the routine proceeds to step 105, where the amount B of absorption of $NO_x$ per unit time is calculated from the map shown in FIG. 18B. Next, at step 106, B is added to the amount ΣNOX of the absorption of $NO_x$. Next, at step 107, it is determined if the amount ΣNOX of the absorption of $NO_x$ has exceeded the maximum average value MAX1. When ΣNOX>MAX1, the routine proceeds to step 108, where the $NO_x$ releasing flag 1 showing that $NO_x$ should be released when the first combustion is being performed is set.

On the other hand, at step 109, it is determined if the amount ΣNOX of the absorption of $NO_x$ has exceeded the maximum average value MAX2. When ΣNOX>MAX2, the routine proceeds to step 110, where the $NO_x$ releasing flag 2 showing that $NO_x$ should be released when the second combustion is being performed is set. Next, the routine proceeds to step 111.

At step 111, the product k·Q obtained by multiplication of a constant k with the amount of injection Q is added to ΣSOX. The fuel contains a substantially fixed amount of sulfur S, therefore the amount of $SO_x$ absorbed in the $NO_x$ absorbent 25 can be expressed by k·Q. Therefore, the ΣSOX obtained by successively adding this k·Q shows the amount of $SO_x$ estimated to be absorbed in the $NO_x$ absorbent 25. At step 112, it is determined if this amount ΣSOX of $SO_x$ has exceeded a maximum allowable value MAXS. When ΣSOX>MAXS, the routine proceeds to step 113, where the $SO_x$ releasing flag is set.

Next, an explanation will be made of the operational control with reference to FIG. 34 and FIG. 35.

Figure 34:
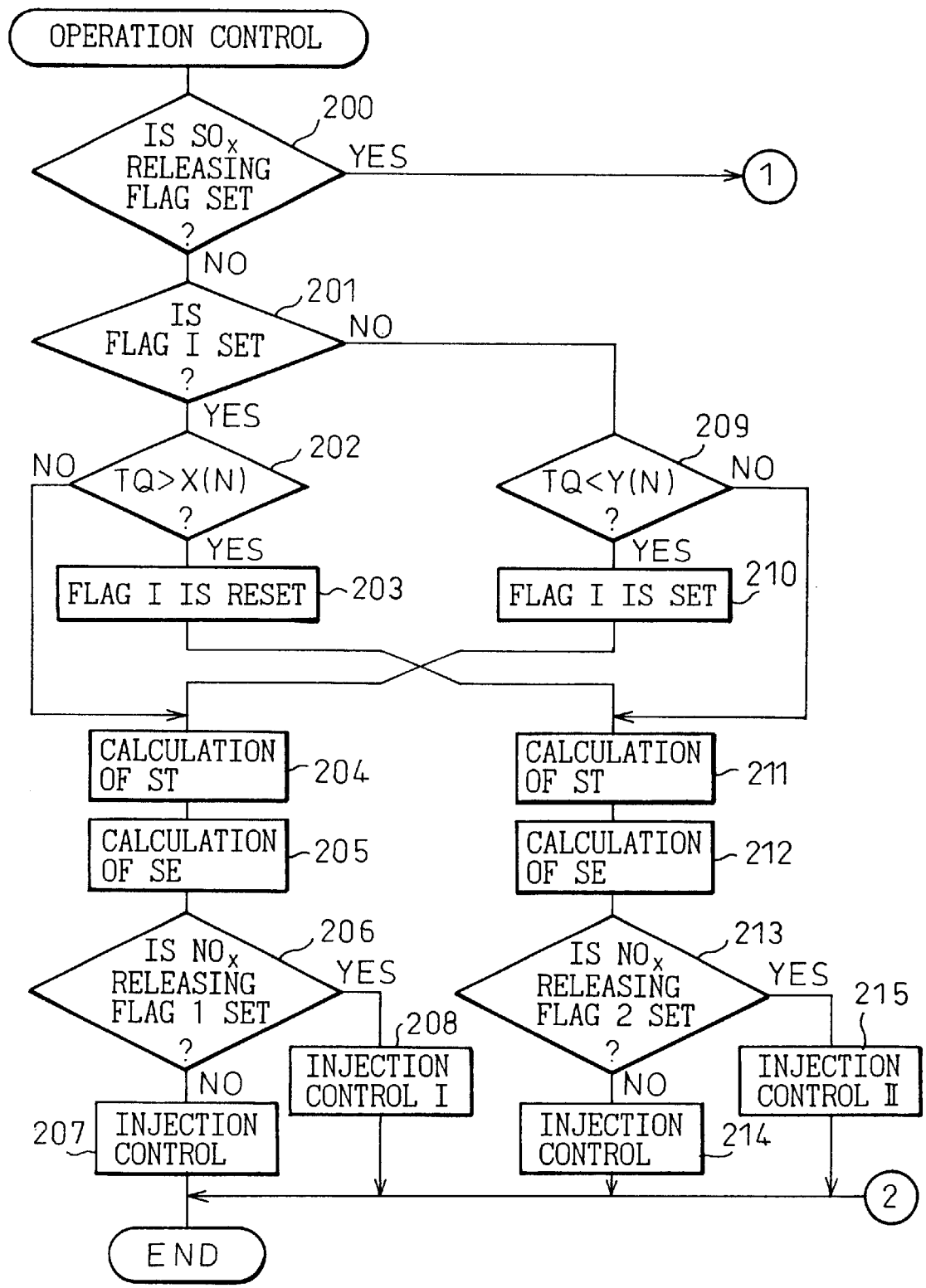
FIGS. 34 and 35 are flow charts of the control of the operation of the engine.
Figure 35:
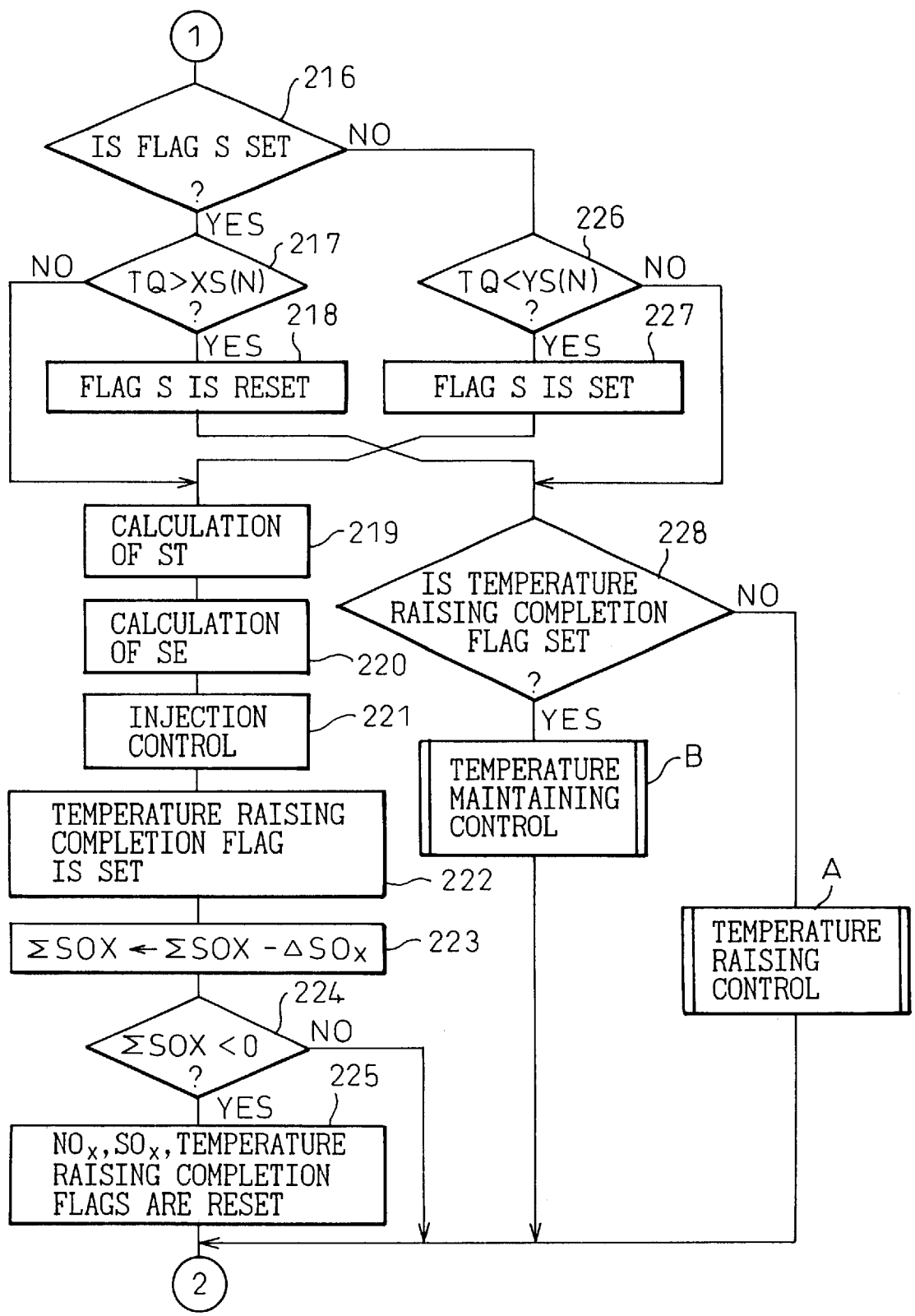

Referring to FIG. 34 and FIG. 35, first, at step 200, it is determined if the $SO_x$ releasing flag has been set. When the $SO_x$ releasing flag has not been set, the routine proceeds to step 201, where it is determined if a flag I showing that the operating state of the engine is the first operating region I shown in FIG. 9 is set or not. When the flag I has been set, that is, when the operating state of the engine is the first operating region I shown in FIG. 9, the routine proceeds to step 202, where it is determined if the required torque TQ has become larger than the first boundary X(N) shown in FIG. 9. When TQ≦X(N), the routine proceeds to step 204, where low temperature combustion is performed.

That is, at step 204, the target degree of opening ST of the throttle valve 20 is calculated from the map shown in FIG. 13A and the degree of opening of the throttle valve 20 is made this target degree of opening ST. Next, at step 205, the target degree of opening SE of the EGR control valve 31 is calculated from the map shown in FIG. 13B and the degree of opening of the EGR control valve 31 is made this target degree of opening SE. Next, at step 206, it is determined if the $NO_x$ releasing flag has been set. When the $NO_x$ releasing flag has not been set, the routine proceeds to step 207, where the amount of injection Q is calculated from the map shown in FIG. 12A, the injection start timing θS is calculated from the map shown in FIG. 12B, and the fuel is injected based on these calculated values.

On the other hand, when it is determined at step 206 that the $NO_x$ releasing flag 1 has been set, the routine proceeds to step 208, where the injection control I is performed. In this injection control I, the air-fuel ratio is made rich for a predetermined period, then the ΣNOX is made zero, and the $NO_x$ releasing flag 1 is reset. During this time, $NO_x$ is released from the $NO_x$ absorbent 25.

On the other hand, when it is determined at step 202 that TQ>X(N), the routine proceeds to step 203, where the flag I is reset, then the routine proceeds to step 211, where the second combustion is performed.

That is, at step 211, the target degree of opening ST of the throttle valve 20 is calculated from the map shown in FIG. 16A and the degree of opening of the throttle valve 20 is made this target degree of opening ST. Next, at step 212, the target degree of opening SE of the EGR control valve 31 is calculated from the map shown in FIG. 16B and the degree of opening of the EGR control valve 31 is made this target degree of opening SE. Next, at step 213, it is determined if the $NO_x$ releasing flag has been set. When the $NO_x$ releasing flag has not been set, the routine proceeds to step 214, where the amount of injection Q is calculated from the map shown in FIG. 15A, the injection start timing θS is calculated from the map shown in FIG. 15B, and the fuel is injected based on these calculated values.

On the other hand, when it is determined at step 213 that the $NO_x$ releasing flag 2 has been set, the routine proceeds to step 215, where the injection control II is performed. In this injection control II, auxiliary fuel is injected for a predetermined period in the expansion stroke or the first part of the exhaust stroke required for making the air-fuel ratio of the exhaust gas flowing into the $NO_x$ absorbent 25 rich, then the ΣNOX is made zero, and the $NO_x$ releasing flag 1 and the $NO_x$ releasing flag 2 are reset. During this time, $NO_x$ is released from the $NO_x$ absorbent 25.

When the flag I is reset, at the next processing cycle, the routine proceeds from step 201 to step 209, where it is determined if the required torque TQ has become lower than the second boundary Y(N) shown in FIG. 9. When TQ≧Y(N), the routine proceeds to step 211, where the second combustion is performed. On the other hand, when it is determined at step 209 that TQ<Y(N), the routine proceeds to step 210, where the flag I is set, then the routine proceeds to step 204, where low temperature combustion is performed.

On the other hand, when it is judged at step 200 that the $SO_x$ releasing flag has been set, the routine proceeds to step 216, where it is determined if a flag S indicating that the engine operating state is the first operating region I shown in FIG. 29 has been set. When the flag S has been set, that is, when the operating state of the engine is the first operating region I shown in FIG. 29, the routine proceeds to step 217, where it is determined if the required torque TQ has become larger than the first boundary XS(N) shown in FIG. 29. When TQ≦XS(N), the routine proceeds to step 219, where low temperature combustion is performed under a rich air-fuel ratio.

That is, at step 219, the target degree of opening ST of the throttle valve 20 is calculated from the map shown in FIG. 13A and the degree of opening of the throttle valve 20 is made the target degree of opening ST. Next, at step 220, the target degree of opening SE of the EGR control valve 31 is calculated from the map shown in FIG. 13B and the degree of opening of the EGR control valve 31 is made this target degree of opening SE. Next, at step 221, the amount of injection Q is calculated from the map shown in FIG. 30A, the injection start timing θS is calculated from the map shown in FIG. 30B, and the fuel is injected based on these calculated values. At this time, since the temperature of the $NO_x$ absorbent 25 is maintained at over 600° C. and the air-fuel ratio is made rich, the $SO_x$ is released from the $NO_x$ absorbent 25.

At this time, $NO_x$ is also released from the $NO_x$ absorbent 25.

Next, at step 222, the temperature raising completion flag showing that the $NO_x$ absorbent 25 has been raised to a temperature enabling release of $SO_x$ has been set. Next, at step 223, the amount $\Delta SO_x$ of release of $SO_x$ is subtracted from the amount $\Sigma SOX$ of $SO_x$. This amount $\Delta SO_x$ of release of $SO_x$ may be made a fixed value and may be changed in accordance with the engine operating state. Next, at step 224, it is determined if the amount $\Sigma SOX$ of $SO_x$ has become negative. When $\Sigma SOX<0$, the routine proceeds to step 225, where the $SO_x$ releasing flag, the $NO_x$ releasing flag 1, the $NO_x$ releasing flag 2, and the temperature raising completion flag are reset.

On the other hand, when it is determined at step 217 that TQ>XS(N), the routine proceeds to step 218, where the flag S is reset. Next, the routine proceeds to step 228, where it is determined if the temperature raising completion flag is set. When the temperature raising completion flag is not set, the routine proceeds to step A, where control is performed for raising the temperature of the $NO_x$ absorbent 25 under the second combustion. The control for raising the temperature is shown in FIG. 36.

Figure 36:
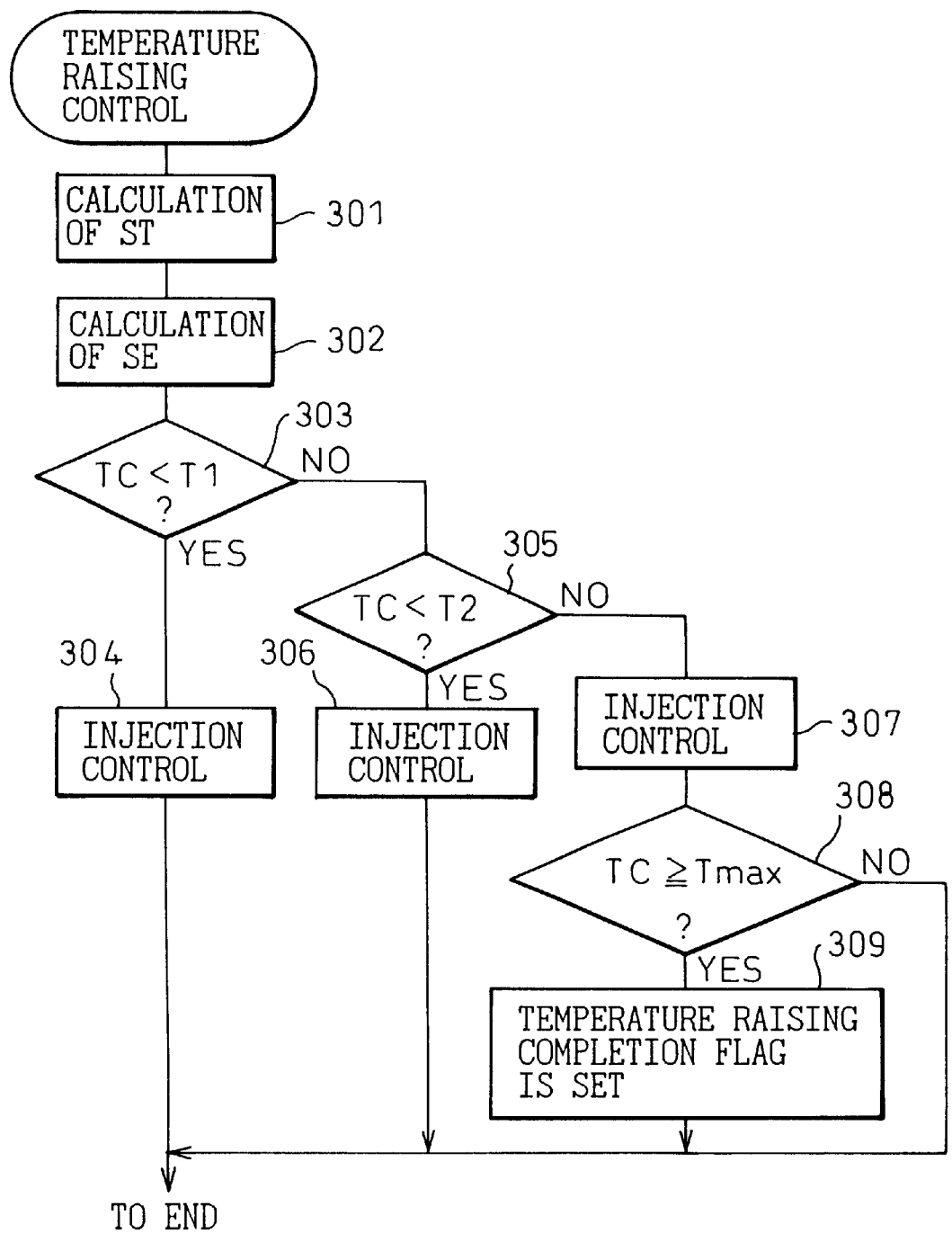
FIG. 36 is a flow chart of the control for raising the temperature.

Referring to FIG. 36, first, at step 301, the target degree of opening ST of the throttle valve 20 is calculated from the map shown in FIG. 32A and the degree of opening of the throttle valve 20 is made the target degree of opening ST. Next, at step 302, the target degree of opening SE of the EGR control valve 31 is calculated from the map shown in FIG. 32B and the degree of opening of the EGR control valve 31 is made this target degree of opening SE. Next, at step 303, it is determined if the temperature TC of the $NO_x$ absorbent 25 detected by the temperature sensor 37 is lower than the first temperature T1. When TC<TL, the routine proceeds to step 304, where injection is performed by the injection pattern determined based on (1) of FIG. 27.

On the other hand, when it is determined at step 303 that TC≧T1, the routine proceeds to step 305, where it is determined if the temperature TC of the $NO_x$ absorbent 25 detected by the temperature sensor 37 is lower than the second temperature T2. When TC<T2, the routine proceeds to step 306, where injection is performed by the injection pattern determined based on (2) of FIG. 27.

On the other hand, when it is determined at step 305 that TC≧T2, the routine proceeds to step 307, where injection is performed by the injection pattern determined based on (3) of FIG. 27. Next, at step 308, it is determined if the temperature TC of the $NO_x$ absorbent 25 detected by the temperature sensor 37 has become higher than the target temperature $T_{max}$. When TC≧$T_{max}$, the routine proceeds to step 309, where the temperature raising completion flag is set.

On the other hand, when it is determined at step 228 that the temperature raising completion flag is set, the routine proceeds to step B, where control is performed for maintaining the temperature so as to maintain the temperature of the $NO_x$ absorbent 25 at a temperature enabling release of $SO_x$. This control for maintaining the temperature is shown in FIG. 37.

Figure 37:
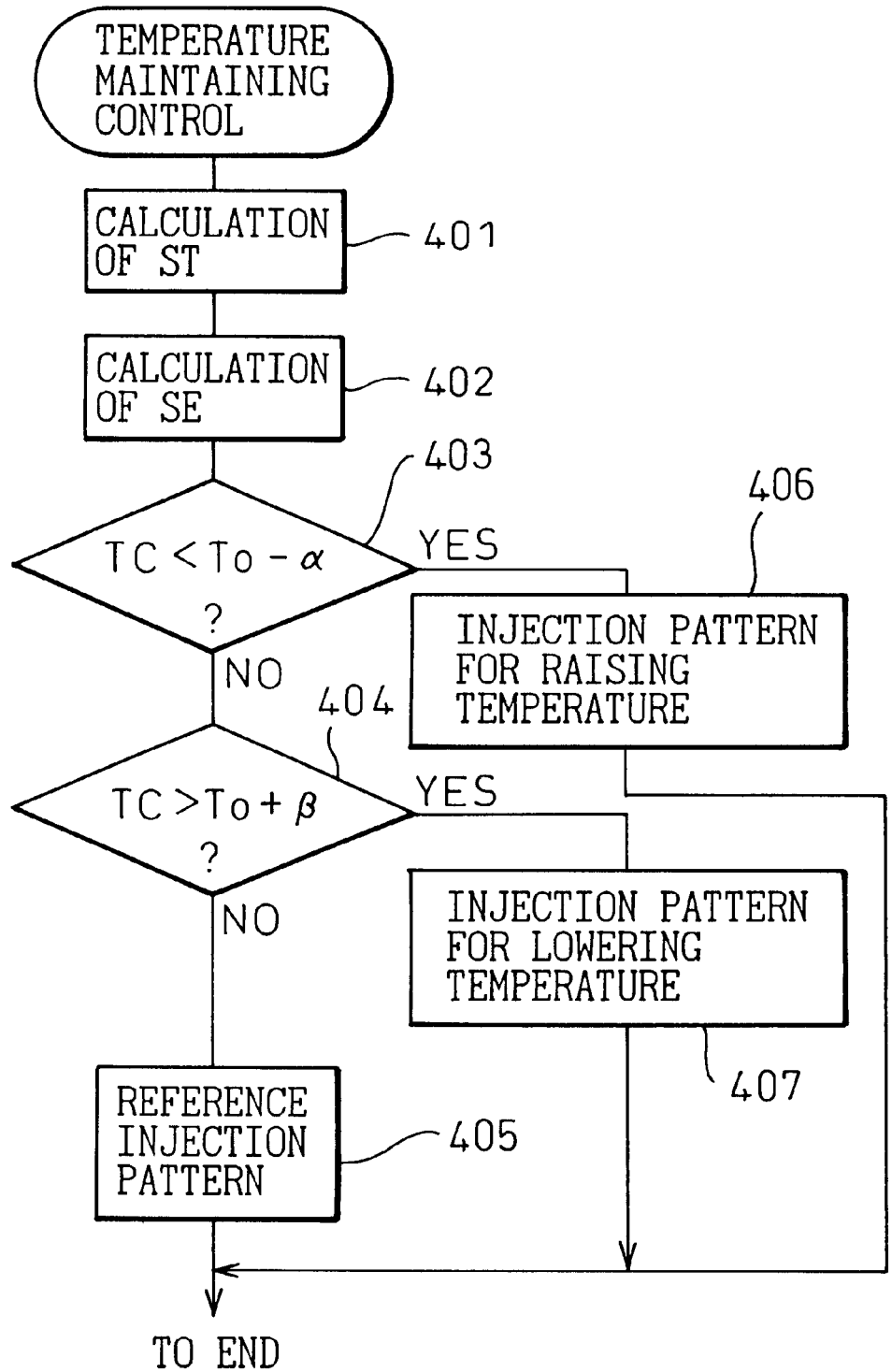
FIG. 37 is a flow chart of the control for maintaining the temperature.

Referring to FIG. 37, first, at step 401, the target degree of opening ST of the throttle valve 20 is calculated from the map shown in FIG. 32A and the degree of opening of the throttle valve 20 is made the target degree of opening ST. Next, at step 402, the target degree of opening SE of the EGR control valve 31 is calculated from the map shown in FIG. 32B and the degree of opening of the EGR control valve 31 is made this target degree of opening SE. Next, at step 403, it is determined if the temperature TC of the $NO_x$ absorbent 25 detected by the temperature sensor 37 is lower than a temperature ($T_0-\alpha$) lower than the target temperature $T_0$, for example, 650° C., by exactly the fixed value $\alpha$. When TC≧$T_0-\alpha$, the routine proceeds to step 404, where it is determined if the temperature TC of the $NO_x$ absorbent 25 detected by the temperature sensor 37 is higher than a temperature ($T_0-\beta$) higher than the target temperature $T_0$ by exactly a fixed value $\beta$. When TC≦$T_0+\beta$, the routine proceeds to step 405.

At step 405, injection is performed by the injection pattern shown in FIG. 25. On the other hand, when it is determined at step 403 that TC<$T_0-\alpha$, the routine proceeds to step 406 where injection is performed by the injection pattern for raising the temperature shown in FIG. 25. Further, when it is determined at step 404 that TC>$T_0+\beta$, the routine proceeds to step 407, where injection is performed by the injection pattern for reducing the temperature.

Figure 38:
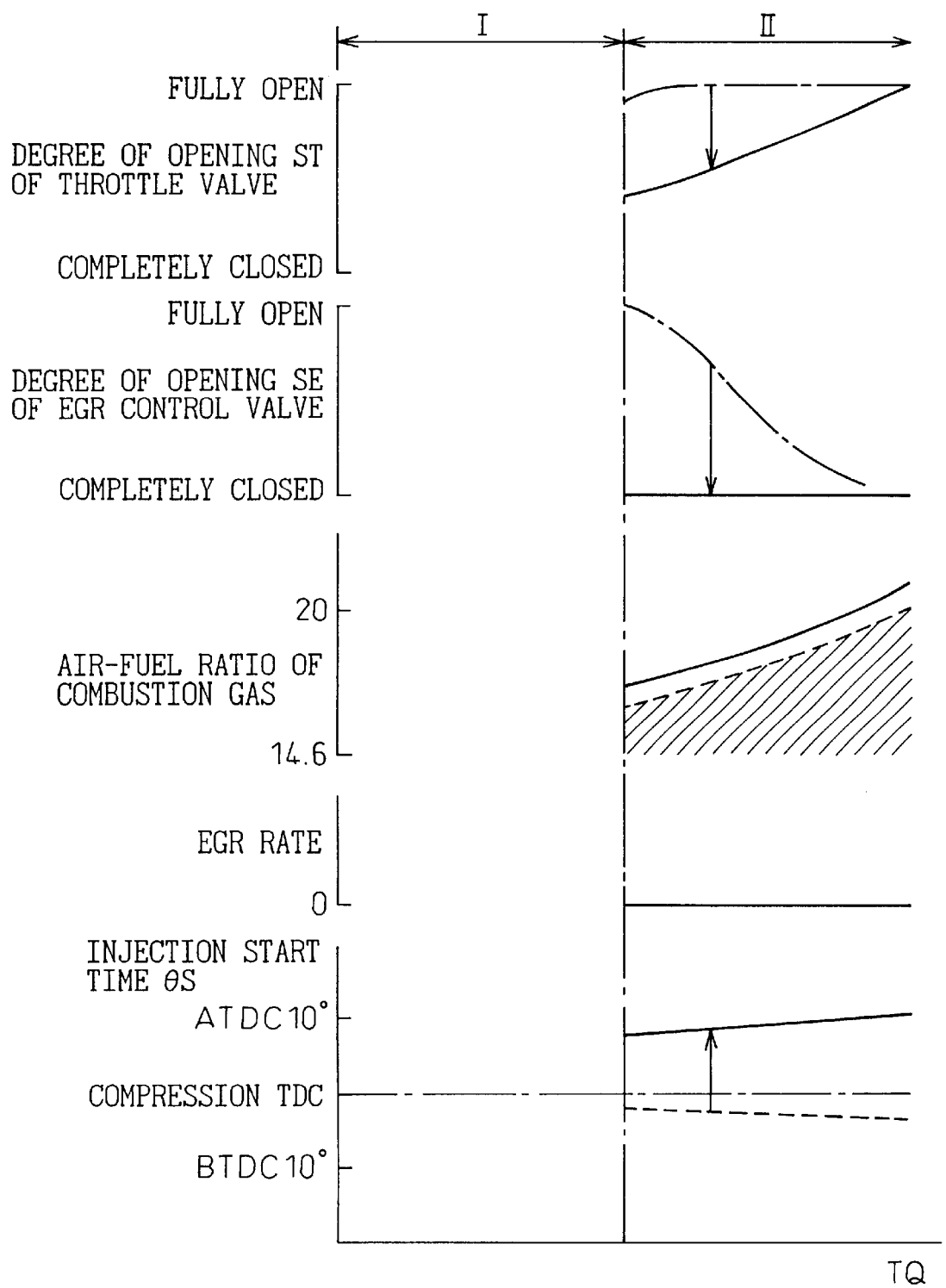
FIG. 38 is a view of the changes in the degrees of opening of the throttle valve etc. during control for releasing $SO_x$.

Next, an explanation will be given of an embodiment enabling $SO_x$ to be released from the $NO_x$ absorbent 25 even when the second combustion is being performed. FIG. 38 shows the degree of opening ST of the throttle valve 20, the degree of opening SE of the EGR control valve 31, the air-fuel ratio of the combustion gas of the main fuel in the combustion chamber 5, the EGR rate, and the injection start timing θS of the main fuel when releasing $SO_x$ from the $NO_x$ absorbent 25 when the second combustion is being performed. Note that in the degree of opening ST of the throttle valve 20 and the degree of opening SE of the EGR control valve 31 of FIG. 38, the dash-dot lines show the degrees of opening at the time of ordinary operation shown in FIG. 10 and the solid lines shown the degrees of opening at the time of release of $SO_x$. Further, in the air-fuel ratio of the combustion gas, the broken line shows the limit of production of smoke. Smoke is produced in the hatched region. Further, in the injection start timing θS of the main fuel, the broken line shows the timing at the time of ordinary operation and the solid line shows the timing at the time of release of $SO_x$.

As shown in FIG. 38, when $SO_x$ is to be released from the $NO_x$ absorbent 25, the EGR control valve 31 is completely closed, therefore the EGR rate becomes zero. Further, the injection start timing OS of the main fuel is delayed to after the top dead center of the compression stroke. At this time, the degree of opening ST of the throttle valve 20 is reduced so that the air-fuel ratio of the combustion gas of the main fuel becomes the target air-fuel ratio shown by the solid line slightly larger than the smoke limit. The target air-fuel ratio of the combustion gas shown by the solid line becomes smaller the lower the required torque TQ, therefore the degree of opening ST of the throttle valve 20 becomes smaller the lower the required torque TQ.

Figure 39:
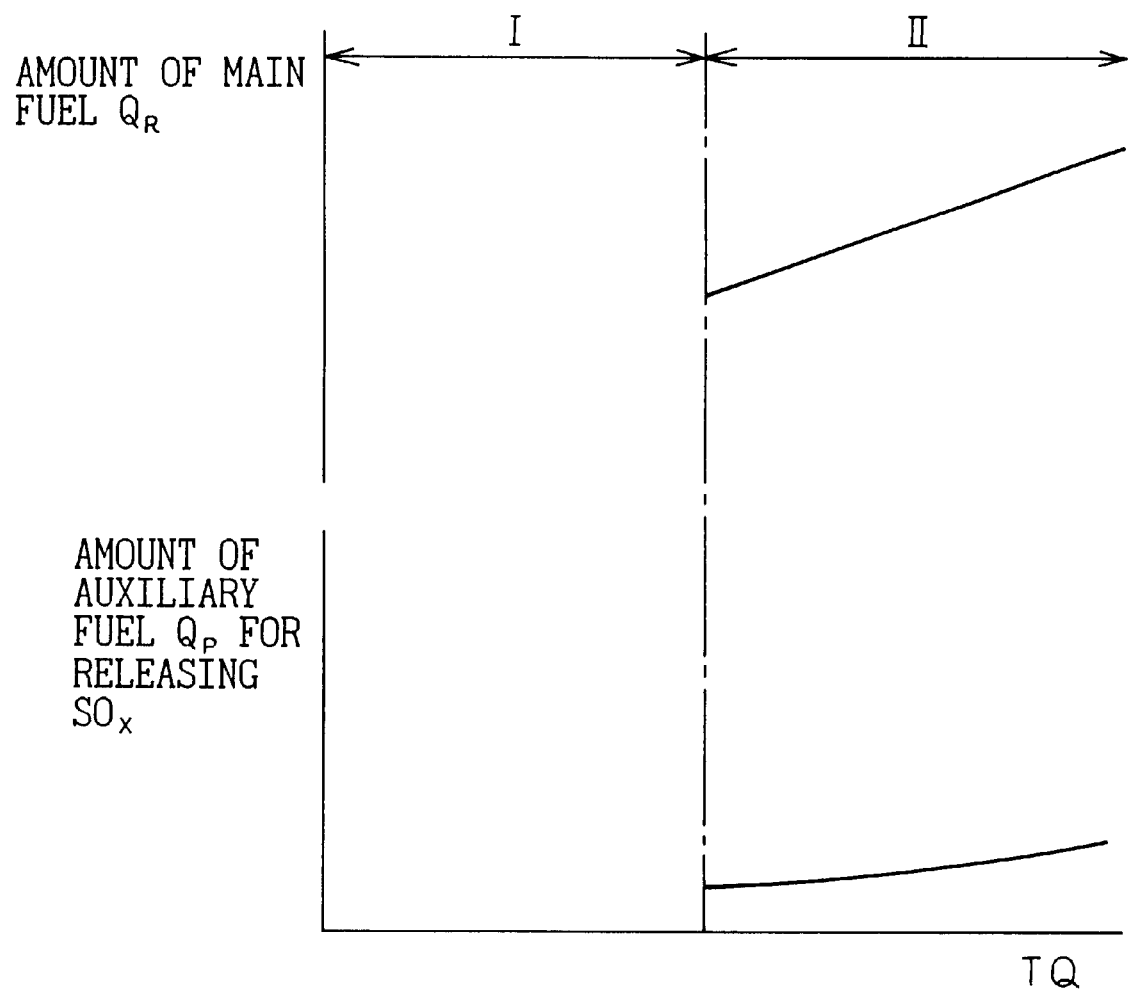
FIG. 39 is a view of the amounts of main fuel and auxiliary fuel.

Further, when $SO_x$ is to be released from the $NO_x$ absorbent 25, the auxiliary fuel $Q_p$ is injected during the expansion stroke or exhaust stroke so that the air-fuel ratio of the exhaust gas flowing into the $NO_x$ absorbent 25 becomes the stoichiometric air-fuel ratio or rich. In this embodiment of the present invention, auxiliary fuel $Q_p$ is injected during the expansion stroke right before the exhaust valve 9 opens so that the exhaust gas flowing into the $NO_x$ absorbent 25 becomes just slightly rich. That is, when $SO_x$ is to be released from the $NO_x$ absorbent 25, injection is performed by the fourth injection pattern $Q_R+Q_P$ shown by (III-1) or (III-2) or (III-3) of FIG. 22. As shown in FIG. 39, when $SO_x$ is to be released from the $NO_x$ absorbent 25, the amount of the auxiliary fuel $Q_p$ increases the higher the required torque TQ.

The degree of opening ST of the throttle valve 20 and the injection start timing θS of the main fuel when $SO_x$ is to be released from the $NO_x$ absorbent 25 are not functions of just the required torque TQ, but are functions of the required torque TQ and the engine rotational speed N. In this embodiment of the present invention, the degree of opening ST of the throttle valve 20 and the injection start timing θS of the main fuel when $SO_x$ is to be released from the $NO_x$ absorbent 25 are stored in advance in the ROM 42 in the form of maps as functions of the required torque TQ and the engine rotational speed N as shown in FIG. 40A and FIG. 40B.

On the other hand, when $NO_x$ is to be released from the $NO_x$ absorbent 25 when the second combustion is being performed, there is no need to particularly raise the temperature of the $NO_x$ absorbent 25. At this time, it is sufficient to make the air-fuel ratio of the exhaust gas flowing into the $NO_x$ absorbent 25 temporarily rich.

Figure 41:
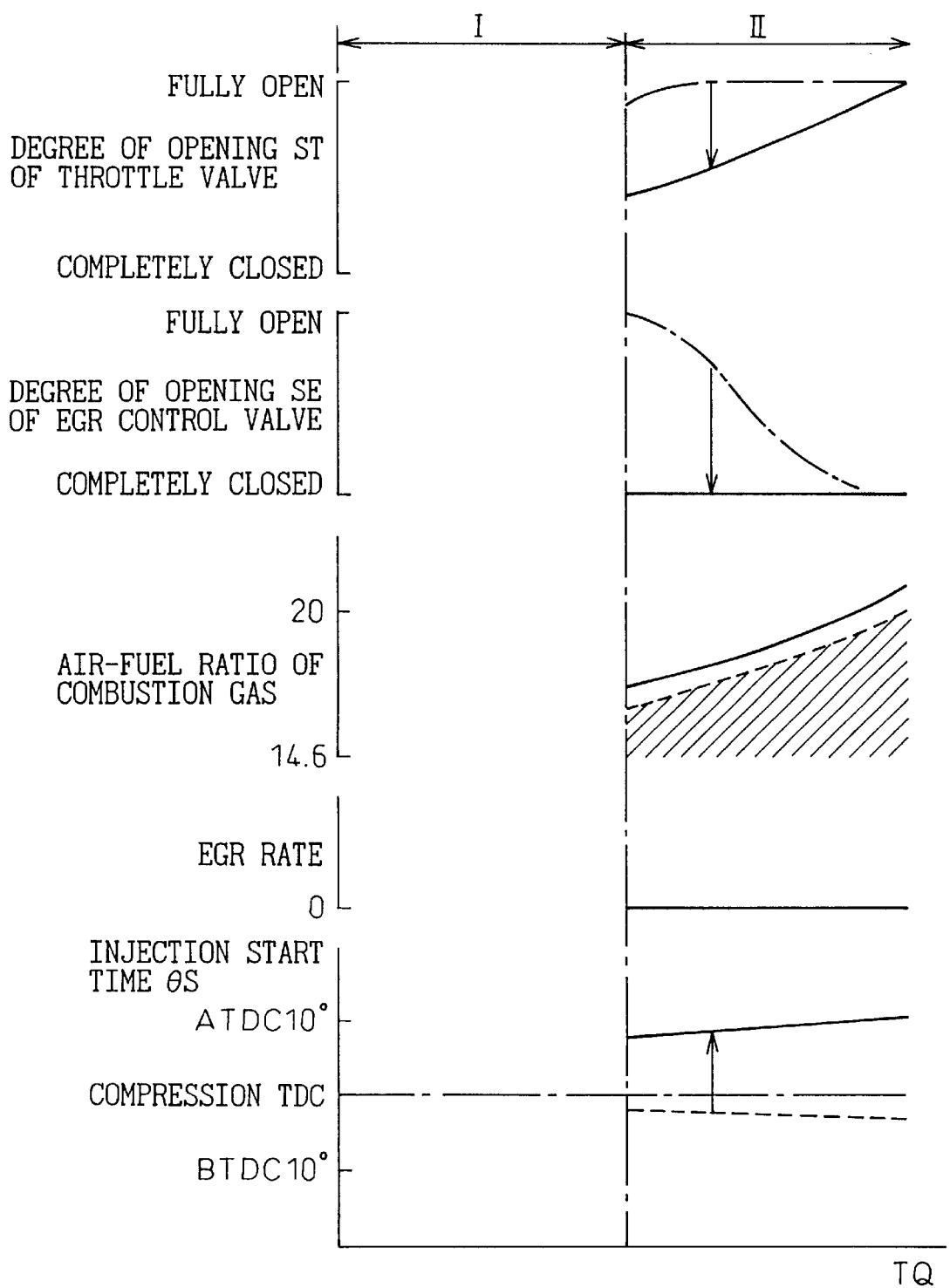
FIG. 41 is a view of the changes in the degrees of opening of the throttle valve etc. during control for releasing $NO_x$.

FIG. 41 shows the degree of opening ST of the throttle valve 20, the degree of opening SE of the EGR control valve 31, the air-fuel ratio of the combustion gas of the main fuel in the combustion chamber 5, the EGR rate, and the injection start timing OS of the main fuel when $NO_x$ is to be released from the $NO_x$ absorbent 25 when second combustion is being performed. Note that in the degree of opening ST of the throttle valve 20 and the degree of opening SE of the EGR control valve 31 in FIG. 41, the dash-dot lines show the degrees of opening at the time of ordinary operation shown in FIG. 10 and the solid lines show the degrees of opening at the time of release of $NO_x$. Further, in the air-fuel ratio of the combustion gas, the broken line shows the limit of production of smoke. Smoke is produced in the hatched region. Further, in the injection start timing θS of the main fuel, the broken line shows the timing at the time of ordinary operation while the solid line shows the timing at the time of release of $NO_x$.

As shown in FIG. 41, when $NO_x$ is to be released from the $NO_x$ absorbent 25, the EGR control valve 31 is completely closed and therefore the EGR rate becomes zero. Further, the injection start timing θS of the main fuel is delayed to after the top dead center of the compression stroke. At this time, the degree of opening ST of the throttle valve 20 is reduced so that the air-fuel ratio of the combustion gas of the main fuel becomes the target air-fuel ratio shown by the solid line slightly larger than the smoke limit. The degree of opening ST of the throttle valve 20 and the injection start timing θS of the main fuel shown in FIG. 41 are the same as the degree of opening ST of the throttle valve 20 and the injection start timing OS of the main fuel at the time of release of $SO_x$ shown in FIG. 38. Therefore, the degree of opening ST of the throttle valve 20 and the injection start timing θS of the main fuel at the time of release of $NO_x$ are calculated from the maps shown by FIG. 40A and FIG. 40B.

Figure 42:
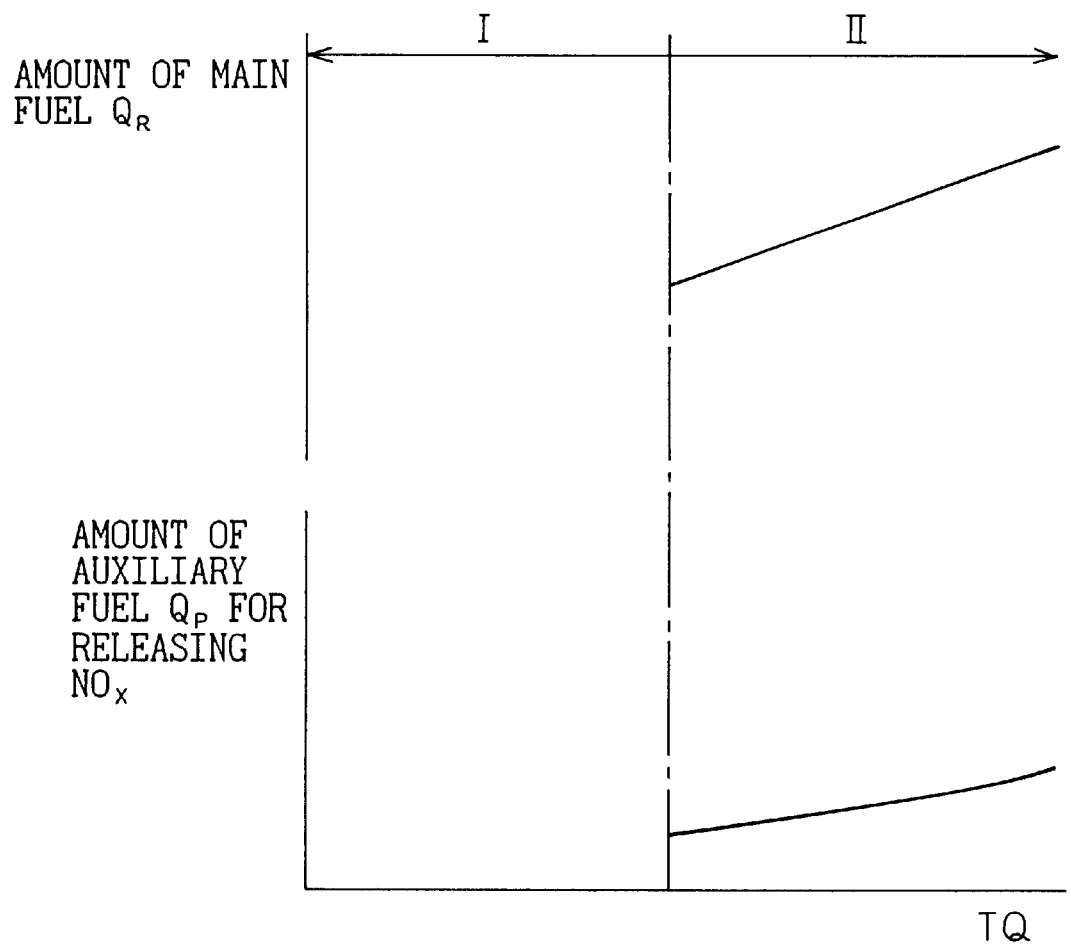
FIG. 42 is a view of the amounts of main fuel and auxiliary fuel.

Further, when $NO_x$ is to be released from the $NO_x$ absorbent 25, auxiliary fuel $Q_p$ is injected during the expansion stroke or exhaust stroke so that the air-fuel ratio of the exhaust gas flowing into the $NO_x$ absorbent 25 becomes rich. In this embodiment of the present invention, auxiliary fuel $Q_p$ is injected during the expansion stroke immediately before the exhaust valve 9 opens so that the exhaust gas flowing into the $NO_x$ absorbent 25 becomes rich. That is, when $NO_x$ is to be released from the $NO_x$ absorbent 25, injection is performed by the fourth injection pattern $Q_R+Q_p$ shown by (III-1), (III-2), or (III-3) in FIG. 22. AS shown in FIG. 42, the amount of auxiliary fuel $Q_p$ when $SO_x$ is to be released from the $NO_x$ absorbent 22 increases the higher the required torque TQ.

Next, an explanation will be made of the operational control in this embodiment with reference to FIG. 43 and FIG. 44.

Figure 43:
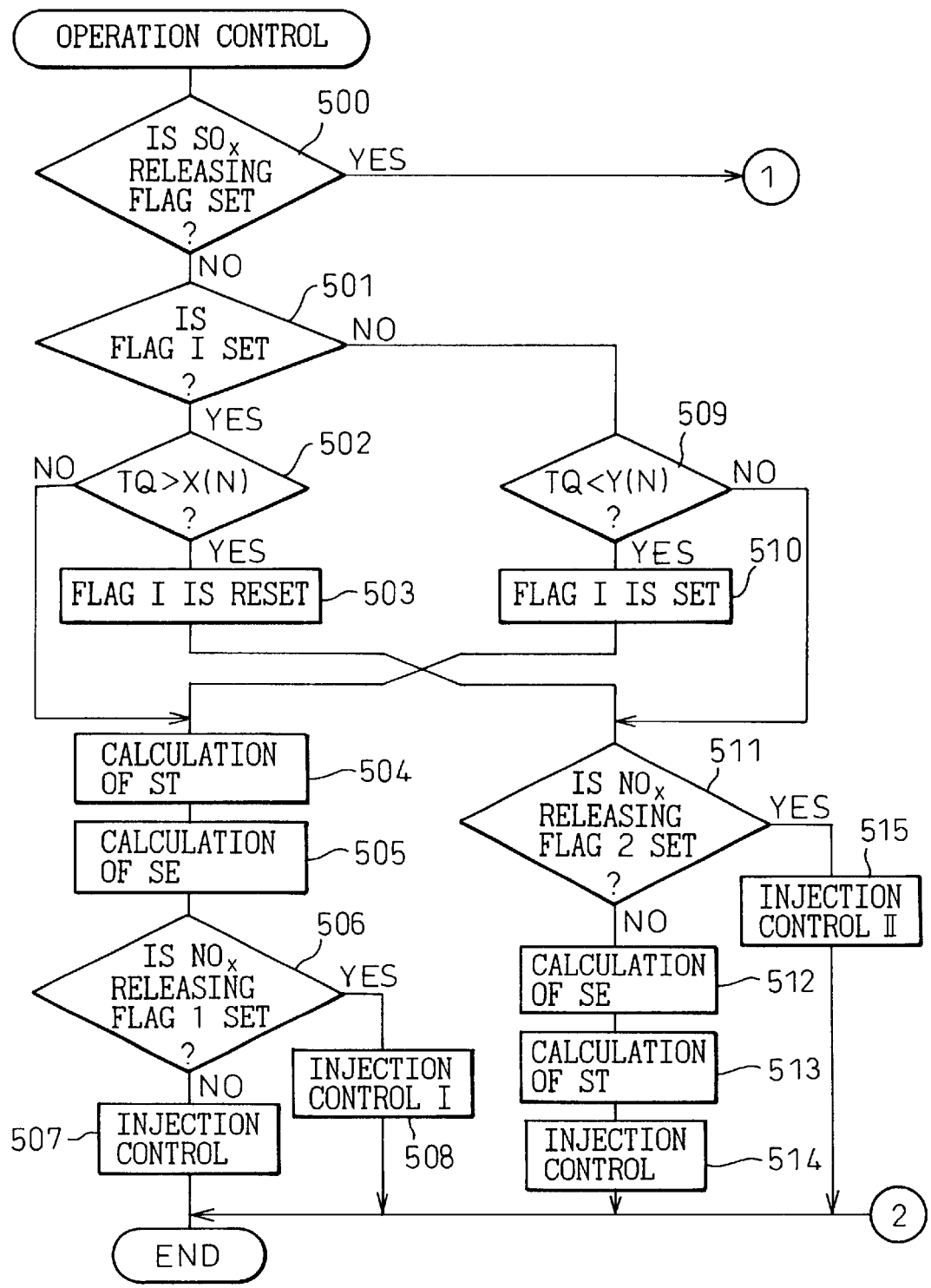
FIGS. 43 and 44 are flow charts of the control of the operation of the engine.
Figure 44:
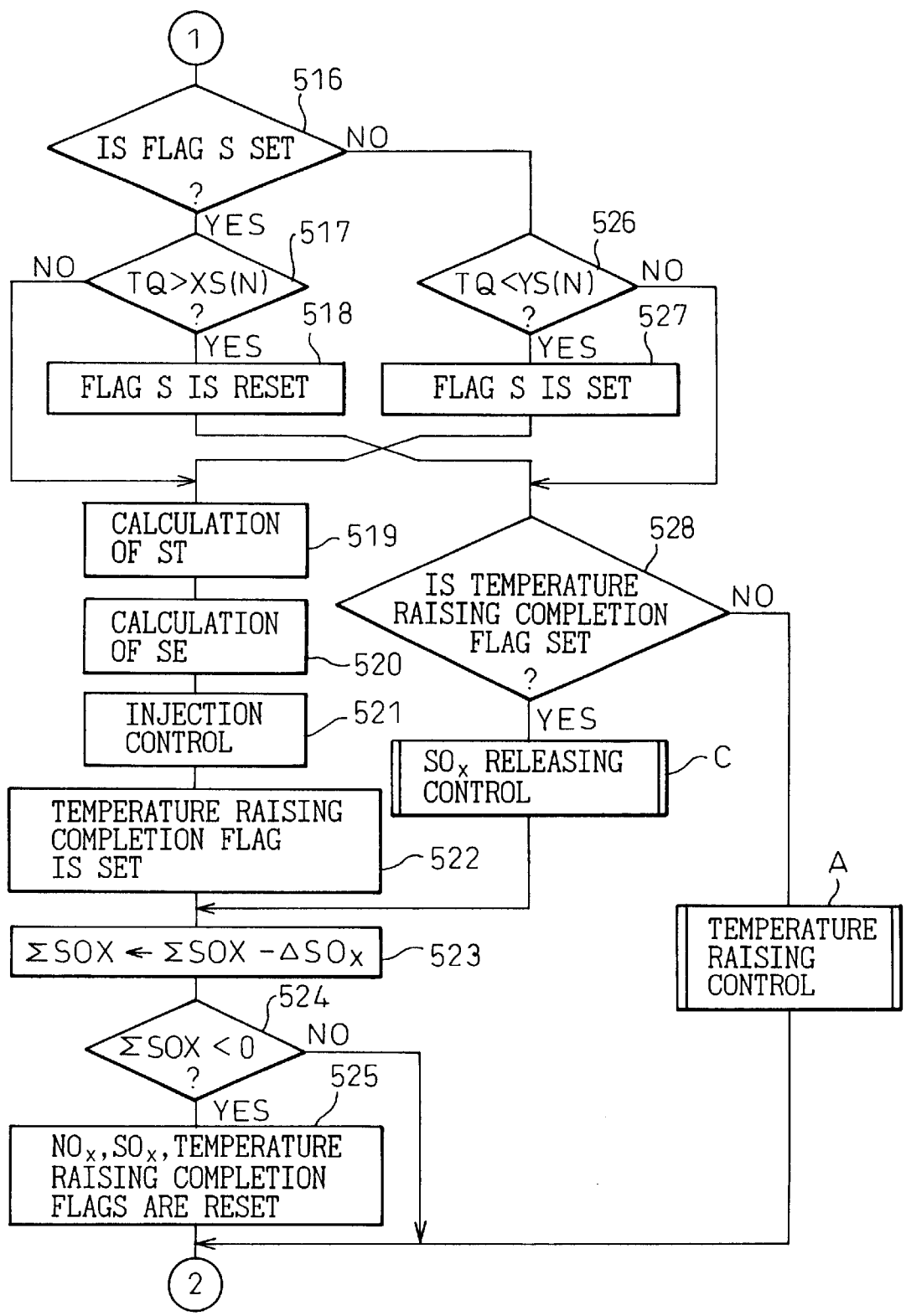

Referring to FIG. 43 and FIG. 44, first, at step 500, it is determined if the $SO_x$ releasing flag has been set. When the $SO_x$ releasing flag has not been set, the routine proceeds to step 501, where it is determined if a flag I indicating that the operating state of the engine is the first operating region I shown in FIG. 9 is set or not. When the flag I has been set, that is, when the operating state of the engine is the first operating region I shown in FIG. 9, the routine proceeds to step 502, where it is determined if the required torque TQ has become larger than the first boundary X(N) shown in FIG. 9. When TQ≦X(N), the routine proceeds to step 504, where low temperature combustion is performed.

That is, at step 504, the target degree of opening ST of the throttle valve 20 is calculated from the map shown in FIG. 13A and the degree of opening of the throttle valve 20 is made this target degree of opening ST. Next, at step 505, the target degree of opening SE of the EGR control valve 31 is calculated from the map shown in FIG. 13B and the degree of opening of the EGR control valve 31 is made this target degree of opening SE. Next, at step 506, it is determined if the $NO_x$ releasing flag has been set. When the $NO_x$ releasing flag has not been set, the routine proceeds to step 507, where the amount of injection Q is calculated from the map shown in FIG. 12A, the injection start timing θS of the main fuel is calculated from the map shown in FIG. 12B, and the fuel is injected based on these calculated values.

Figure 45:
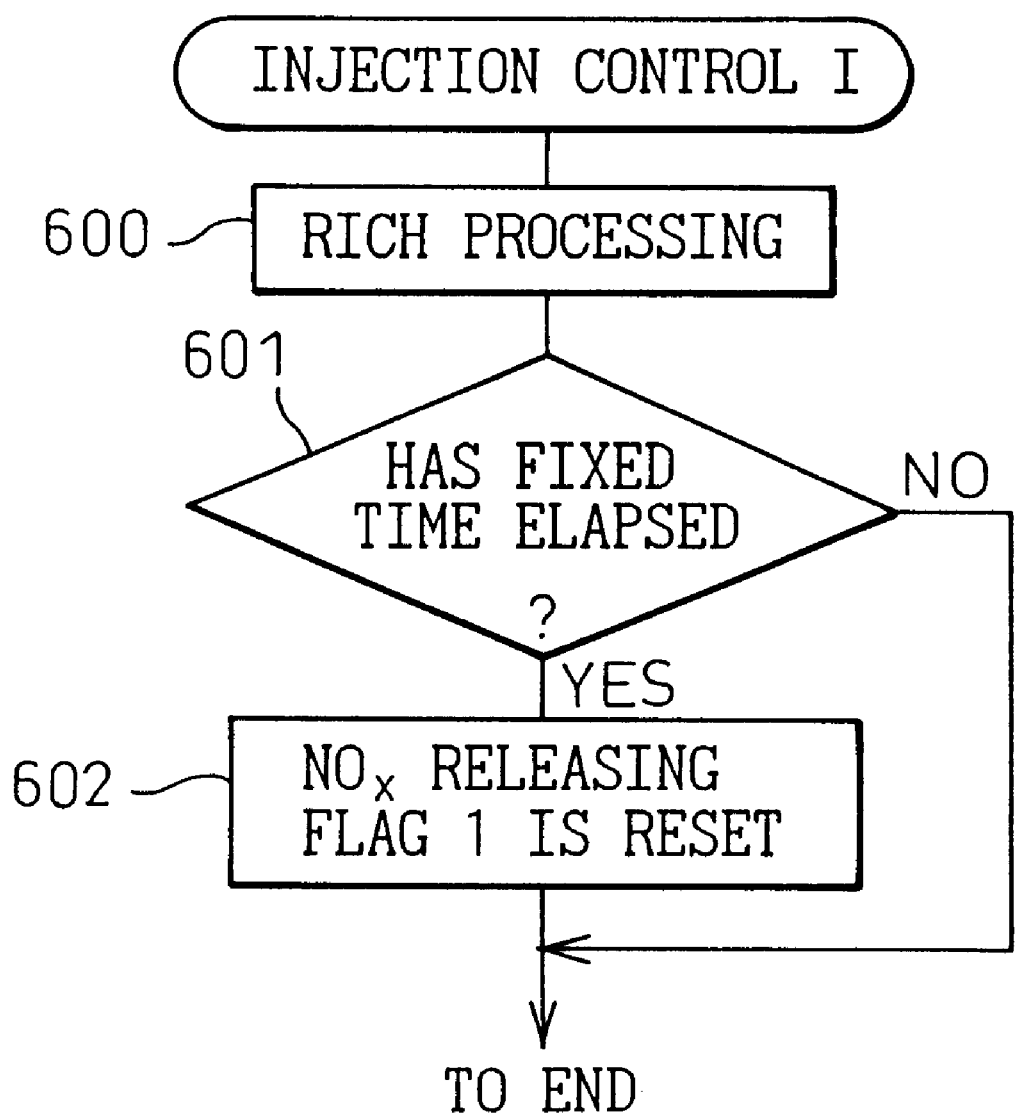
FIG. 45 is a flow chart for executing injection control I.

On the other hand, when it is determined at step 506 that the $NO_x$ releasing flag 1 has been set, the routine proceeds to step 508, where the injection control I is performed. This injection control I is shown in FIG. 45. Referring to FIG. 45, at step 600, the air-fuel ratio is made rich, then, at step 601, it is determined if a fixed period has elapsed from when the air-fuel ratio was made rich. When the fixed period has elapsed, the routine proceeds to step 602, where the $NO_x$ releasing flag 1 is reset, then ΣNOX is made zero. During this time, $NO_x$ is released from the $NO_x$ absorbent 25.

On the other hand, when it is determined at step 502 that TQ>X(N), the routine proceeds to step 503, where the flag I is reset, then the routine proceeds to step 511, where it is determined if the $NO_x$ releasing flag 2 has been set. When the $NO_x$ releasing flag 2 has not been set, the routine proceeds to step 512, where the second combustion is performed.

That is, at step 512, the target degree of opening ST of the throttle valve 20 is calculated from the map shown in FIG. 16A and the degree of opening of the throttle valve 20 is made this target degree of opening ST. Next, at step 513, the target degree of opening SE of the EGR control valve 31 is calculated from the map shown in FIG. 16B and the degree of opening of the EGR control valve 31 is made this target degree of opening SE. Next, at step 514, the amount of injection Q is calculated from the map shown in FIG. 15A, the injection start timing θS of the main fuel is calculated from the map shown in FIG. 15B, and the fuel is injected based on these calculated values.

Figure 46:
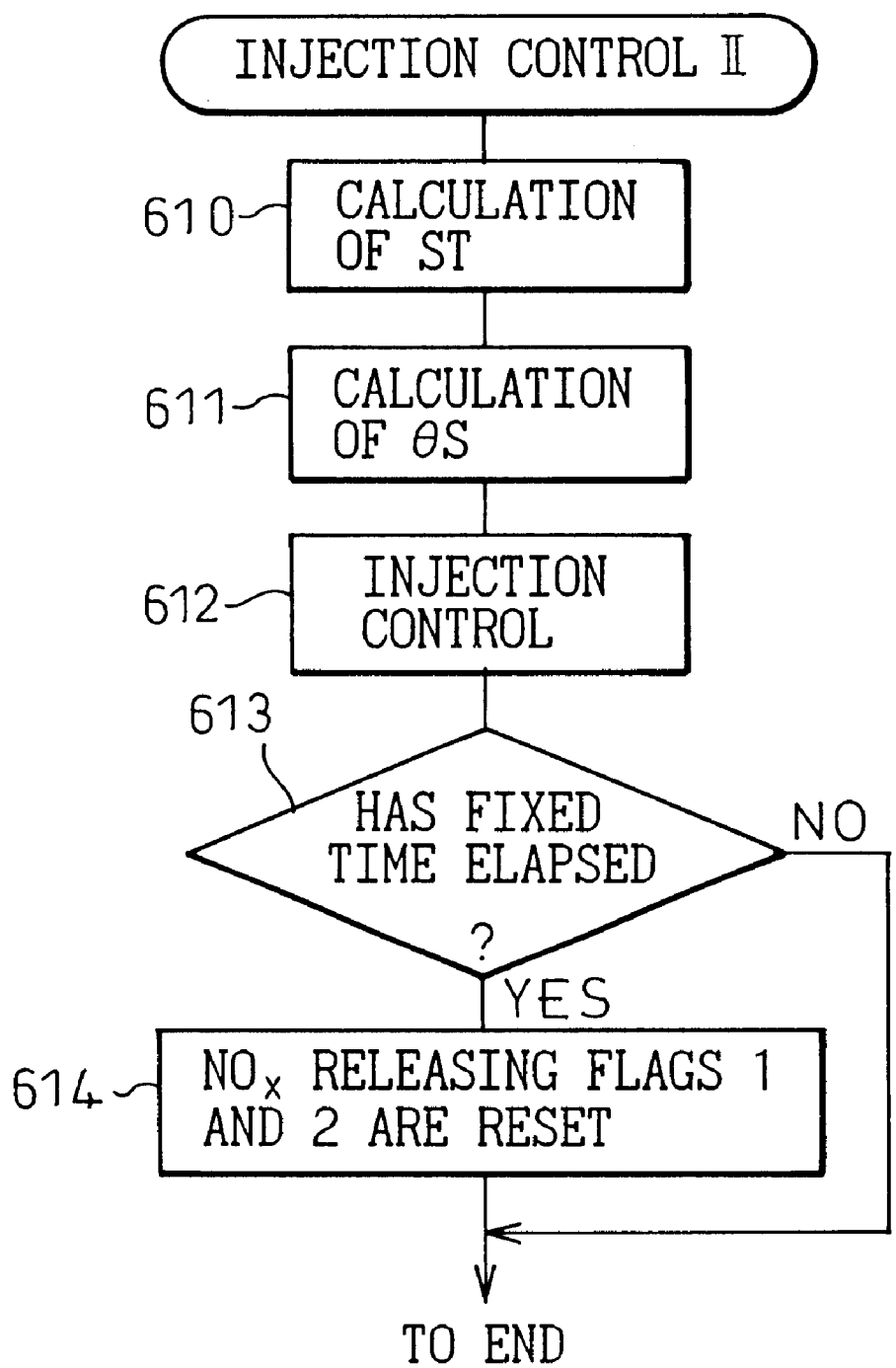
FIG. 46 is a flow chart for executing injection control II.

On the other hand, when it is determined at step 511 that the $NO_x$ releasing flag 2 has been set, the routine proceeds to step 515, where the injection control II is performed. This injection control II is shown in FIG. 46. Referring to FIG. 46, at step 610, the target degree of opening ST of the throttle valve 20 is calculated from the map shown in FIG. 40A and the degree of opening of the throttle valve 20 is made this target degree of opening ST. At this time, the EGR control valve 31 is completely closed. Next, at step 611, the injection start timing θS of the main fuel is calculated from the map shown in FIG. 40B. Next, at step 612, and the main fuel is injected at the injection start timing θS calculated at step 611, then the auxiliary fuel $Q_p$ is injected during the expansion stroke.

That is, at this time, the degree of opening of the throttle valve 20 is reduced, injection is performed by the fourth injection pattern shown in FIG. 22, and thereby the air-fuel ratio of the exhaust gas flowing into the $NO_x$ absorbent 25 is made rich. Next, at step 613, it is determined if a fixed time has elapsed from when the air-fuel ratio of the exhaust gas was made rich. When the fixed time has elapsed, the routine proceeds to step 614, where the $NO_x$ releasing flag and the $SO_x$ releasing flag are reset. At this time, simultaneously, ΣNOX is made zero.

When the flag I is reset, at the next processing cycle, the routine proceeds from step 501 to step 509, where it is determined if the required torque TQ has become lower than the second boundary Y(N) shown in FIG. 9. When TQ≧Y(N), the routine proceeds to step 511. On the other hand, when it is determined at step 509 that TQ<Y(N), the routine proceeds to step 510, where the flag I is set, then the routine proceeds to step 504, where low temperature combustion is performed.

On the other hand, when it is judged at step 500 that the $SO_x$ releasing flag has been set, the routine proceeds to step 516, where it is determined if a flag S indicating that the engine operating state is the first operating region I shown in FIG. 29 has been set. When the flag S has been set, that is, when the operating state of the engine is the first operating region I shown in FIG. 29, the routine proceeds to step 517, where it is determined if the required torque TQ has become larger than the first boundary XS(N) shown in FIG. 29. When TQ≦XS(N), the routine proceeds to step 519, where low temperature combustion is performed under a rich air-fuel ratio.

That is, at step 519, the target degree of opening ST of the throttle valve 20 is calculated from the map shown in FIG. 13A and the degree of opening of the throttle valve 20 is made the target degree of opening ST. Next, at step 520, the target degree of opening SE of the EGR control valve 31 is calculated from the map shown in FIG. 13B and the degree of opening of the EGR control valve 31 is made this target degree of opening SE. Next, at step 521, the amount of injection Q is calculated from the map shown in FIG. 30A, the injection start timing θS of the main fuel is calculated from the map shown in FIG. 30B, and the fuel is injected based on these calculated values. At this time, since the temperature of the $NO_x$ absorbent 25 is maintained at over 600° C. and the air-fuel ratio is made rich, the $SO_x$ is released from the $NO_x$ absorbent 25. At this time, $NO_x$ is also released from the $NO_x$ absorbent 25.

Next, at step 522, the temperature raising completion flag showing that the $NO_x$ absorbent 25 has been raised to a temperature enabling release of $SO_x$ has been set. Next, at step 523, the amount $\Delta SO_x$ of release of $SO_x$ is subtracted from the amount $\Sigma SOX$ of $SO_x$. This amount $\Delta SO_x$ of release of $SO_x$ may be made a fixed value and may be changed in accordance with the engine operating state. Next, at step 524, it is determined if the amount $\Sigma SOX$ of $SO_x$ has become negative. When $\Sigma SOX<0$, the routine proceeds to step 525, where the $SO_x$ releasing flag, the $NO_x$ releasing flag 1, the $NO_x$ releasing flag 2, and the temperature raising completion flag are reset.

On the other hand, when it is determined at step 517 that TQ>XS(N), the routine proceeds to step 518, where the flag S is reset. Next, the routine proceeds to step 528, where it is determined if the temperature raising completion flag is set.

When the temperature raising completion flag is not set, the routine proceeds to step A, where control is performed for raising the temperature of the $NO_x$ absorbent 25 under the second combustion shown in FIG. 36.

Figure 47:
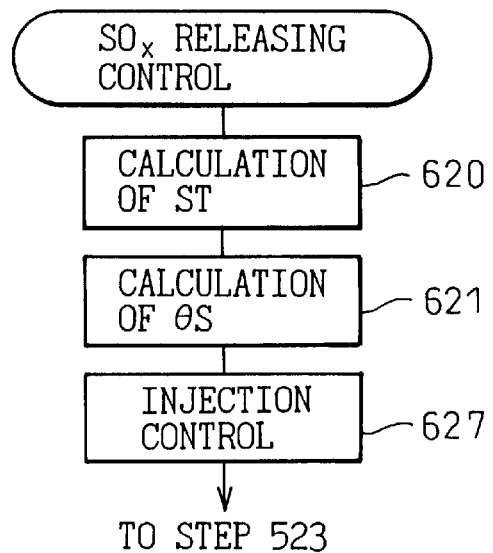
FIG. 47 is a flow chart for executing control for release of $SO_x$.

On the other hand, when it is determined at step 528 that the temperature raising completion flag is set, the routine proceeds to step C, where control is performed for releasing the $SO_x$ from the $NO_x$ absorbent 25. This control for releasing the $SO_x$ is shown in FIG. 47. That is, at step 620, the target degree of opening ST of the throttle valve 20 is calculated from the map shown in FIG. 32A and the degree of opening of the throttle valve 20 is made the target degree of opening ST. At this time, the EGR control valve 31 is completely closed. Next, at step 621, the injection start timing θS of the main fuel is calculated from the map shown in FIG. 32B. Next, at step 623, the main fuel is injected at the injection start timing θS calculated at step 622, then the auxiliary fuel $Q_p$ is injected during the expansion stroke.

That is, at this time, the degree of opening of the throttle valve 20 is reduced and injection is performed by the fourth injection pattern shown in FIG. 22, whereby the air-fuel ratio of the exhaust gas flowing into the $NO_x$ absorbent 25 is made just slightly rich. Next, the routine proceeds to step 523 of FIG. 44.

Figure 48:
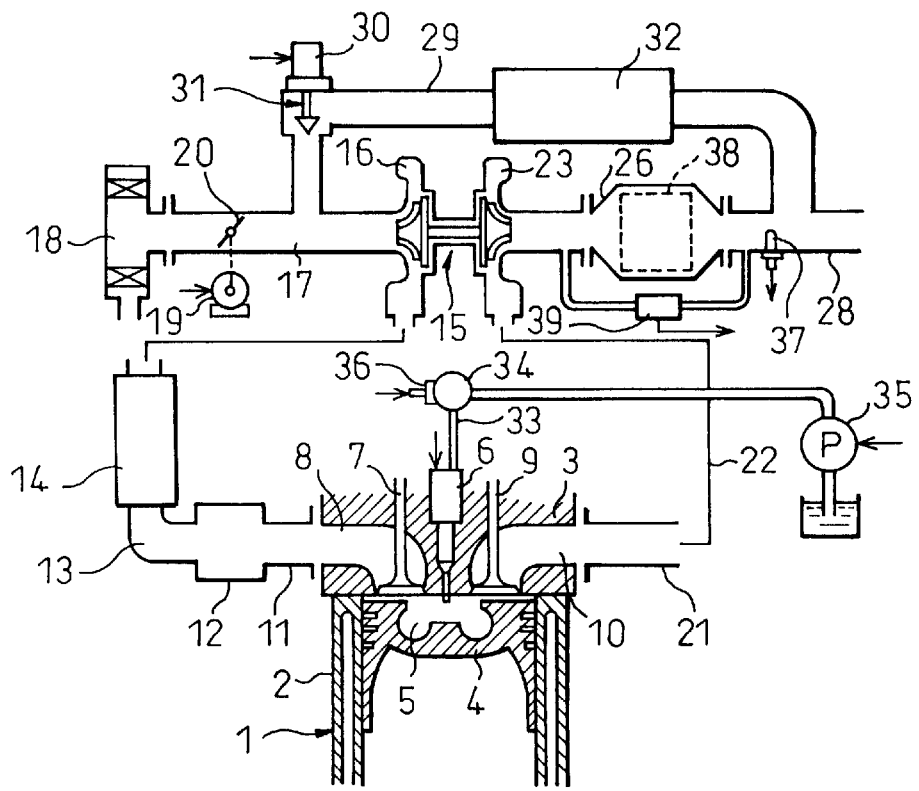
FIG. 48 is an overall view of another embodiment of a compression-ignition type internal combustion engine.

FIG. 48 shows another embodiment. In this embodiment, a particulate filter 38 for trapping particulate matter in the exhaust gas is arranged in a casing 26 and a differential pressure sensor 39 is provided for detecting the differential pressure before and after the particulate filter 38.

The particulate matter deposited on the particulate filter 38 naturally ignites when the temperature of the particulate filter 38 passes a fixed temperature. If it were possible to maintain the temperature of the particulate filter 38 after that to at least that fixed temperature, then it would be possible to burn all of the particulate matter deposited on the particulate filter 38. That is, in this embodiment, to burn all of the particulate matter deposited on the particulate filter 38, that is, when regenerating the particulate filter 38, it is necessary to maintain the temperature of the particulate filter 38 to at least the fixed temperature.

Therefore, in this embodiment, the auxiliary fuel $Q_V$ and $Q_p$ are injected in accordance with need when the second combustion is performed in the same way as in the first embodiment so as to hold the temperature of the particulate filter 38 at over a fixed temperature so as to regenerate the particulate filter 38. Note that in this embodiment, unlike in the first embodiment, combustion is performed under a lean air-fuel ratio even when regenerating the particulate filter 38.

Further, in this embodiment, the particulate filter 38 carries a precious metal such as platinum on it. When low temperature combustion is being performed, the large amount of unburned hydrocarbons exhausted from the combustion chamber 5 is oxidized by the particulate filter 38.

Next, an explanation will be given of the operational control while referring to FIG. 49 and FIG. 50.

Figure 49:
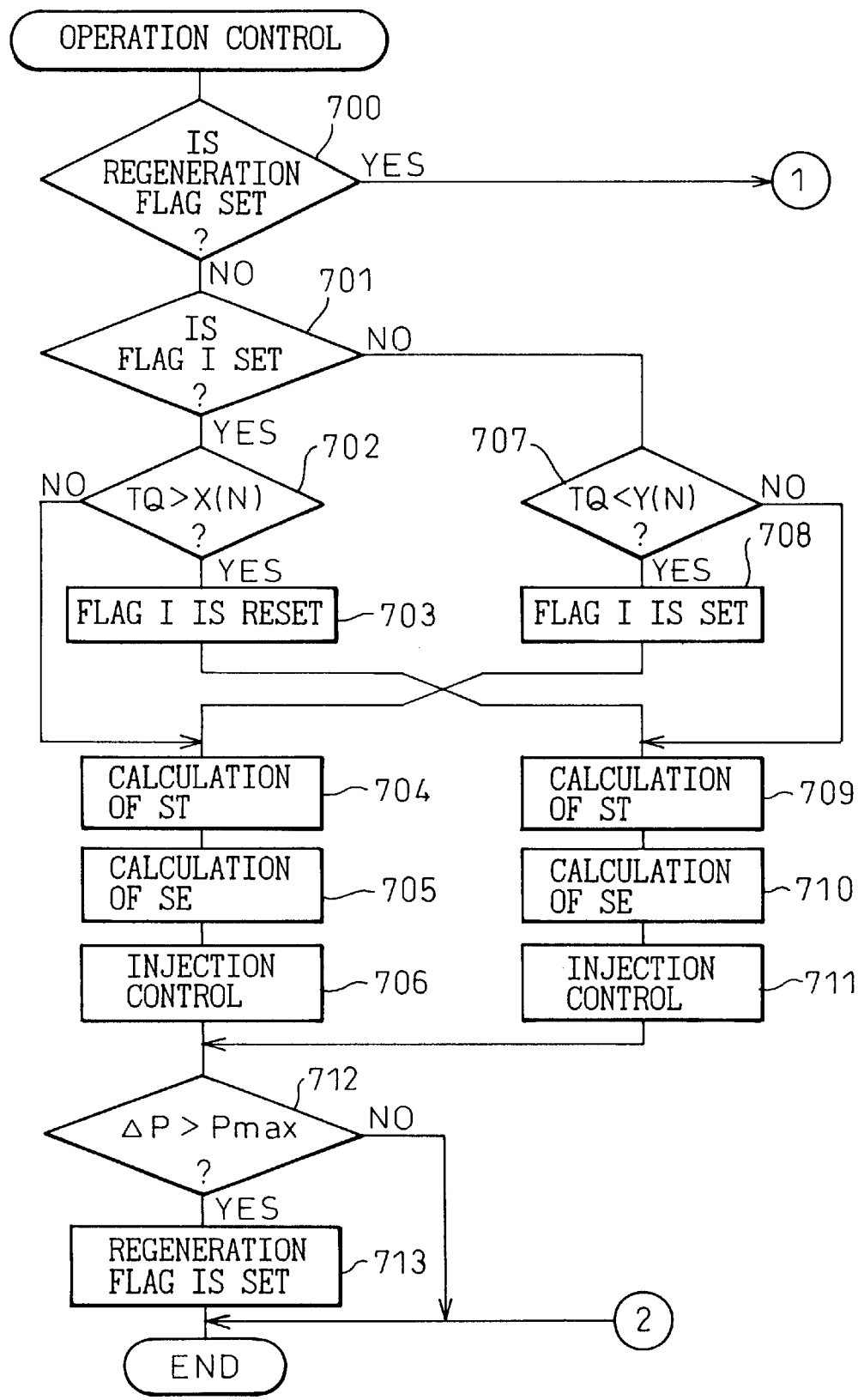
FIG. 49 and 50 are flow charts of the control of the operation of the engine.
Figure 50:
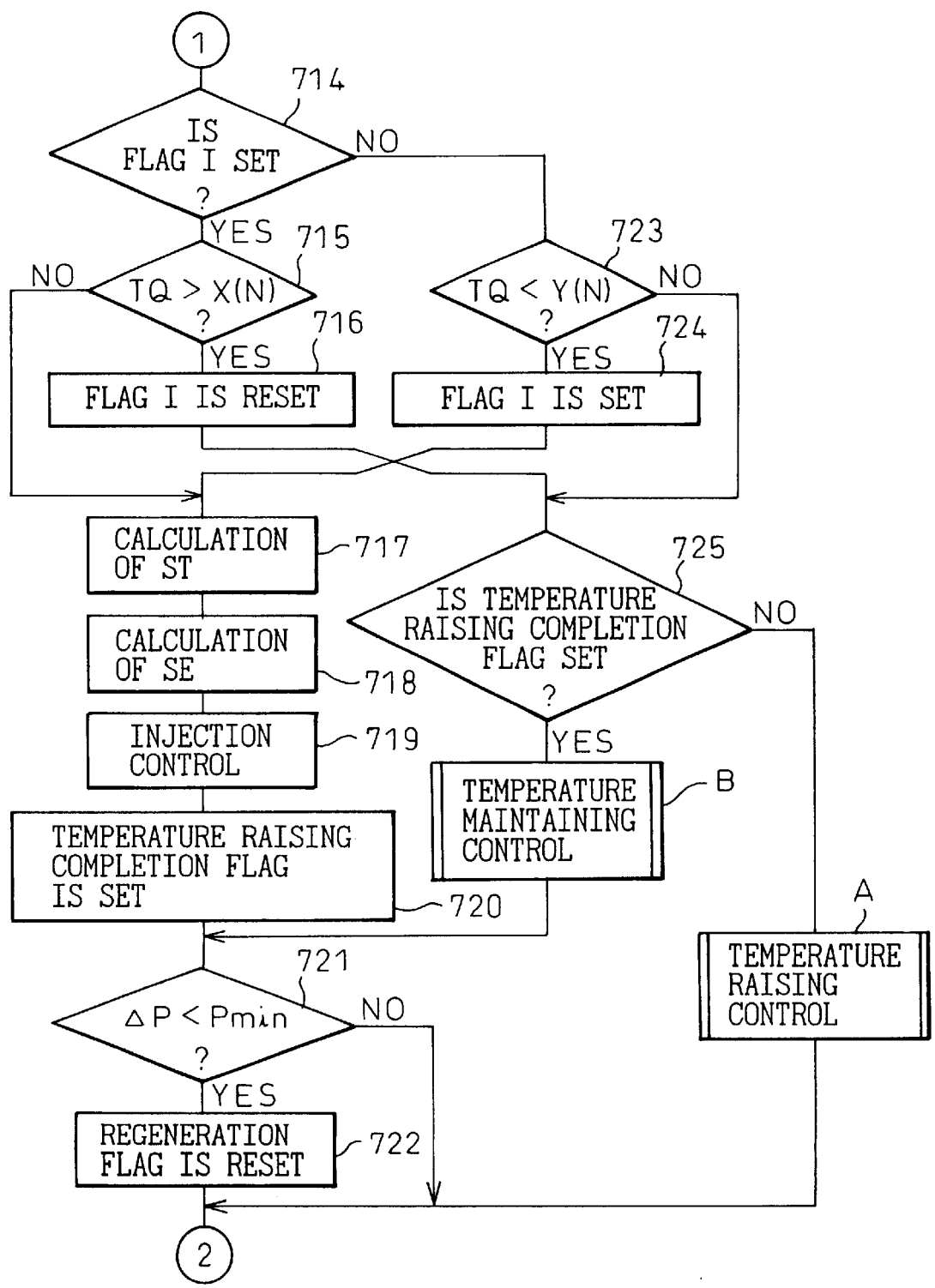

Referring to FIG. 49 and FIG. 50, first, at step 700, it is determined if a regeneration flag showing that the particulate filter 38 should be regenerated has been set. When the regeneration flag has not been set, the routine proceeds to step 701, where it is determined if the flag I showing that the operating state of the engine is the first operating region I shown in FIG. 9 has been set. When the flag I has been set, that is, when the operating state of the engine is the first operating region I, the routine proceeds to step 702, where it is determined if the required torque TQ has become larger than the first boundary X(N) shown in FIG. 9. When TQ≦X(N), the routine proceeds to step 704, where low temperature combustion is performed.

That is, at step 704, the target degree of opening ST of the throttle valve 20 is calculated from the map shown in FIG. 13A and the degree of opening of the throttle valve 20 is made that target degree of opening ST. Next, at step 705, the target degree of opening SE of the EGR control valve 31 is calculated from the map shown in FIG. 13B and the degree of opening of the EGR control valve 31 is made that target degree of opening SE. Next, at step 706, the amount of injection Q is calculated from the map shown in FIG. 12A, the injection start timing θS of the main fuel is calculated from the map shown in FIG. 12B, and fuel is injected based on these calculated values. Next, the routine proceeds to step 712.

On the other hand, when it is determined at step 702 that TQ>X(N), the routine proceeds to step 703, where the flag I is reset, then the routine proceeds to step 709, where the second combustion is performed.

That is, at step 709, the target degree of opening ST of the throttle valve 20 is calculated from the map shown in FIG. 16A and the degree of opening of the throttle valve 20 is made that target degree of opening ST. Next, at step 710, the target degree of opening SE of the EGR control valve 31 is calculated from the map shown in FIG. 16B and the degree of opening of the EGR control valve 31 is made that target degree of opening SE. Next, at step 711, the amount of injection Q is calculated from the map shown in FIG. 15A, the injection start timing θS of the main fuel is calculated from the map shown in FIG. 15B, and fuel is injected based on these calculated values. Next, the routine proceeds to step 712.

When the flag I is reset, at the next processing cycle, the routine proceeds from step 701 to step 707, where it is determined if the required torque TQ has become lower than the second boundary Y(N) shown in FIG. 9. When TQ≧Y(N), the routine proceeds to step 709, where the second combustion is performed. On the other hand, when it is determined at step 707 that TQ<Y(N), the routine proceeds to step 708, where the flag I is set, then the routine proceeds to step 704, where low temperature combustion is performed.

At step 712, it is determined if the differential pressure ΔP before and after the particulate filter 38 is more than the maximum allowable value $P_{max}$ based on the output signal of the differential pressure sensor 38, that is, if the amount of particulate matter deposited on the particulate filter 38 has exceeded a maximum allowable value. When ΔP>$P_{max}$, that is, when the amount of particulate matter deposited on the particulate filter 38 has exceeded the maximum allowable value, the routine proceeds to step 713, where the regeneration flag is set.

When the regeneration flag is set, at the next processing cycle, the routine proceeds from step 700 to step 714, where it is determined if the flag I showing that the operating state of the engine is the first operating region I shown in FIG. 9 has been set. When the flag I has been set, that is, when the operating state of the engine is the first operating region I shown in FIG. 9, the routine proceeds to step 715, where it is determined if the required torque TQ has become larger than the first boundary X(N) shown in FIG. 9. When TQ≦X(N), the routine proceeds to step 717, where low temperature combustion is performed.

That is, at step 717, the target degree of opening ST of the throttle valve 20 is calculated from the map shown in FIG. 13A and the degree of opening of the throttle valve 20 is made that target degree of opening ST. Next, at step 718, the target degree of opening SE of the EGR control valve 31 is calculated from the map shown in FIG. 13B and the degree of opening of the EGR control valve 31 is made that target degree of opening SE. Next, at step 719, the amount of injection Q is calculated from the map shown in FIG. 12A, the injection start timing θS of the main fuel is calculated from the map shown in FIG. 12B, and fuel is injected based on these calculated values. Next, the routine proceeds to step 720. At this time, low temperature combustion is performed under a lean air-fuel ratio and the temperature of the particulate filter 38 is maintained at a temperature enabling all of the deposited particulate matter to be burned.

At step 720, a temperature raising completion flag showing that the temperature of the $NO_x$ absorbent 25 has been raised to a temperature enabling the particulate matter to be burned is set. Next, at step 721, it is determined if the differential pressure ΔP before and after the particulate filter 38 has become lower than a minimum value $P_{min}$ based on the output signal of the differential pressure sensor 39, that is, if all of the particulate matter deposited on the particulate filter 38 has been burned. When ΔP<$P_{min}$, the routine proceeds to step 722, where the regeneration flag is reset.

On the other hand, when it is determined at step 715 that TQ>X(N), the routine proceeds to step 716, where the flag I is reset, then the routine proceeds to step 725, where it is determined if the temperature raising completion flag has been set. When the temperature raising completion flag has not been set, the routine proceeds to step A, where control is performed for raising the temperature of the $NO_x$ absorbent 25 shown in FIG. 36 under the second combustion.

On the other hand, when it is determined at step 725 that the temperature raising completion flag has been set, the routine proceeds to step B, where control for maintaining the temperature shown in FIG. 37 is performed to maintain the temperature of the $NO_x$ absorbent 25 at a temperature enabling the particulate matter to be burned. Next, the routine proceeds to step 721.

Note that it is also possible to arrange a catalyst having an oxidation function such as an oxidation catalyst or a three-way catalyst inside the exhaust passage upstream or downstream of the $NO_x$ absorbent 25 in the first embodiment and inside the exhaust passage upstream or downstream of the particulate filter 28 in the second embodiment.

According to the present invention, as explained above, it is possible to raise the temperature of an exhaust gas after-treatment device to a temperature required for the after-treatment of the exhaust gas and maintain it at the temperature necessary for after-treatment of the exhaust gas.

While the invention has been described by reference to specific embodiments chosen for purposes of illustration, it should be apparent that numerous modifications could be made thereto by those skilled in the art without departing from the basic concept and scope of the invention.

What is claimed is:

1. An internal combustion engine in which an amount of production of soot gradually increases and then peaks when an amount of inert gas in a combustion chamber increases and in which a further increase of the amount of inert gas in the combustion chamber results in a temperature of fuel and surrounding gas in the combustion chamber becoming lower than a temperature of production of soot and therefore almost no production of soot any longer, said engine comprising:

an after-treatment device arranged in an exhaust passage of the engine for removing harmful components in exhaust gas;

switching means for selectively switching between a first combustion where the amount of the inert gas in the combustion chamber is larger than the amount of inert gas where the amount of production of soot peaks and a second combustion where the amount of inert gas in the combustion chamber is smaller than the amount of inert gas where the amount of production of soot peaks;

judging means for judging if a temperature of the after-treatment device should be raised; and temperature control means for controlling a temperature of the after-treatment device when it is judged that the temperature of the after-treatment device should be raised so that the temperature of the after-treatment device becomes more than a predetermined temperature when the second combustion is being performed.

2. An internal combustion engine as set forth in claim 1, wherein when it is judged that the temperature of the after-treatment device should be raised, said temperature control means either delays an injection timing of main fuel or injects auxiliary fuel in addition to the main fuel when the second combustion is being performed.

3. An internal combustion engine as set forth in claim 2, wherein when it is judged that the temperature of the after-treatment device should be raised, said temperature control means controls at least one of an amount of retardation of the injection timing of the main fuel or an injection timing of the auxiliary fuel when the second combustion is being performed.

4. An internal combustion engine as set forth in claim 3, wherein said temperature control means causes to inject fuel, when the second combustion is being performed, by an injection pattern selected from a first injection pattern delaying the injection timing of the main fuel without injecting auxiliary fuel, a second injection pattern injecting auxiliary fuel before injection of the main fuel and delaying the injection timing of the main fuel, a third injection pattern injecting auxiliary fuel before injection of the main fuel and after injection of the main fuel and delaying the injection timing of the main fuel, and a fourth injection pattern injecting auxiliary fuel after injection of the main fuel and delaying the injection timing of the main fuel.

5. An internal combustion engine as set forth in claim 4, wherein, in the first injection pattern, the injection timing of the main fuel is delayed until after top dead center of the compression stroke.

6. An internal combustion engine as set forth in claim 4, wherein, in the second injection pattern, the auxiliary fuel is injected near top dead center of the suction stroke and the amount of retardation of the injection timing of the main fuel is made larger than the amount of retardation of the injection timing of the main fuel in the first injection pattern.

7. An internal combustion engine as set forth in claim 4, wherein, in the second injection pattern, the auxiliary fuel is injected during the compression stroke and the amount of retardation of the injection timing of the main fuel is made larger than the amount of retardation of the injection timing of the main fuel in the first injection pattern.

8. An internal combustion engine as set forth in claim 4, wherein, in the third injection pattern, first auxiliary fuel is injected near top dead center of the suction stroke, second auxiliary fuel is injected during the expansion stroke or exhaust stroke, and the amount of retardation of the injection timing of the main fuel is made larger than the amount of retardation of the injection timing of the main fuel in the first injection pattern.

9. An internal combustion engine as set forth in claim 4, wherein, in the fourth injection pattern, the injection timing of the main fuel is delayed until after the top dead center of the compression stroke and the auxiliary fuel is injected during the expansion stroke or exhaust stroke.

10. An internal combustion engine as set forth in claim 4, wherein the temperature control means selectively uses at least two injection patterns when the second combustion is being performed when the temperature of the after-treatment device should be maintained over a predetermined temperature.

11. An internal combustion engine as set forth in claim 4, wherein said temperature control means selectively uses the injection patterns in accordance with the temperature of the after-treatment device when the temperature of the after-treatment device should be raised when second combustion is being performed.

12. An internal combustion engine as set forth in claim 1, wherein an exhaust gas recirculation device is provided for recirculating exhaust gas exhausted from the combustion chamber into an intake passage of the engine and the inert gas comprises recirculated exhaust gas.

13. An internal combustion engine as set forth in claim 12, wherein an exhaust gas recirculation rate when the first combustion is being performed is over about 55 percent and the exhaust gas recirculation rate when the second combustion is being performed is not more than about 50 percent.

14. An internal combustion engine as set forth in claim 1, wherein an operating region of the engine is divided into a low load side first operating region and a high load side second operating region, the first combustion is performed in the first operating region, and the second combustion is performed in the second operating region.

15. An internal combustion engine as set forth in claim 1, wherein said after-treatment device comprises an $NO_x$ absorbent which absorbs $NO_x$ when an air-fuel ratio of exhaust gas flowing the $NO_x$ absorbent is lean and releases the $NO_x$ when the air-fuel ratio of the exhaust gas becomes the stoichiometric air-fuel ratio or rich and said $NO_x$ absorbent releases absorbed $SO_x$ when reaching an $SO_x$ release temperature determined by the $NO_x$ absorbent and the air-fuel ratio of the exhaust gas flowing into the $NO_x$ absorbent becomes the stoichiometric air-fuel ratio or rich.

16. An internal combustion engine as set forth in claim 15, wherein said judging means judges that the temperature of the $NO_x$ absorbent should be raised when $SO_x$ should be released from the $NO_x$ absorbent and, when said judging means judges that the temperature of the $NO_x$ absorbent should be raised, said temperature control means controls the temperature of the $NO_x$ absorbent so that the temperature of the $NO_x$ absorbent becomes more than a predetermined temperature when the second combustion is being performed.

17. An internal combustion engine as set forth in claim 16, wherein, when said judging means judges that the temperature of the $NO_x$ absorbent should be raised, an air fuel ratio is made the stoichiometric air-fuel ratio or rich when the first combustion is being performed.

18. An internal combustion engine as set forth in claim 16, wherein, when said judging means judges that the temperature of the $NO_x$ absorbent should be raised, the air fuel ratio of the exhaust gas flowing into the $NO_x$ absorbent is made the stoichiometric air-fuel ratio or rich when the second combustion is being performed.

19. An internal combustion engine as set forth in claim 15, wherein when $NO_x$ should be released from the $NO_x$ absorbent, the air-fuel ratio of the exhaust gas flowing into the $NO_x$ absorbent is made the stoichiometric air-fuel ratio or rich.

20. An internal combustion engine as set forth in claim 1, wherein said after-treatment device comprises a particulate filter for trapping particulate matter contained in the exhaust gas and the particulate matter trapped by the particulate filter is continuously burned when a temperature of the particulate filter becomes more than a predetermined temperature.

21. An internal combustion engine as set forth in claim 20, wherein said judging means judges that the temperature of the particulate filter should be raised when the particulate matter trapped by the particulate filter should be continuously burned and, when said judging means judges that the temperature of the particulate filter should be raised, the temperature control means controls the temperature of the particulate filter so that the particulate filter becomes more than a predetermined temperature when the second combustion is being performed.

* * * * *